United States Patent
Thomson

(10) Patent No.: US 12,499,874 B2
(45) Date of Patent: Dec. 16, 2025

(54) TRAINING SPEECH RECOGNITION SYSTEMS USING WORD SEQUENCES

(71) Applicant: Sorenson IP Holdings, LLC, Salt Lake City, UT (US)

(72) Inventor: David Thomson, Bountiful, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 18/538,957

(22) Filed: Dec. 13, 2023

(65) Prior Publication Data

US 2024/0127798 A1  Apr. 18, 2024

Related U.S. Application Data

(63) Continuation of application No. 16/997,587, filed on Aug. 19, 2020, now abandoned.

(51) Int. Cl.
*G10L 15/065* (2013.01)
*G06F 21/60* (2013.01)
(Continued)

(52) U.S. Cl.
CPC .......... *G10L 15/065* (2013.01); *G06F 21/602* (2013.01); *G10L 15/063* (2013.01);
(Continued)

(58) Field of Classification Search
CPC ...... G10L 15/065; G10L 25/51; G06F 21/602
See application file for complete search history.

(56) References Cited

U.S. PATENT DOCUMENTS

| 5,606,643 A | 2/1997 | Balasubramanian et al. |
| 5,649,060 A | 7/1997 | Ellozy et al. |

(Continued)

FOREIGN PATENT DOCUMENTS

| EP | 0555545 A1 | 8/1993 |
| EP | 0645757 A1 | 9/1995 |

(Continued)

OTHER PUBLICATIONS

Peter Hays, CEO, VTCSecure, LLC, Nov. 7, 2017, Notice of Ex Parte in CG Docket Nos. 03-123 and 10-51, 2 pgs.
(Continued)

*Primary Examiner* — Bryan S Blankenagel
(74) *Attorney, Agent, or Firm* — Maschoff Brennan

(57) ABSTRACT

A method may include obtaining a text string that is a transcription of audio data and selecting a sequence of words from the text string as a first word sequence. The method may further include encrypting the first word sequence and comparing the encrypted first word sequence to multiple encrypted word sequences. Each of the multiple encrypted word sequences may be associated with a corresponding one of multiple counters. The method may also include in response to the encrypted first word sequence corresponding to one of the multiple encrypted word sequences based on the comparison, incrementing a counter of the multiple counters associated with the one of the multiple encrypted word sequences and adapting a language model of an automatic transcription system using the multiple encrypted word sequences and the multiple counters.

18 Claims, 29 Drawing Sheets

(51) Int. Cl.
*G10L 15/06* (2013.01)
*G10L 15/19* (2013.01)
*G10L 25/51* (2013.01)
*H04L 9/08* (2006.01)

(52) U.S. Cl.
CPC .............. *G10L 15/19* (2013.01); *G10L 25/51* (2013.01); *H04L 9/0869* (2013.01)

(56) References Cited

U.S. PATENT DOCUMENTS

| | | |
|---|---|---|
| 5,724,405 A | 3/1998 | Engelke et al. |
| 5,855,000 A | 12/1998 | Waibel et al. |
| 5,883,986 A | 3/1999 | Kopec et al. |
| 6,122,613 A | 9/2000 | Baker |
| 6,208,964 B1 | 3/2001 | Sabourin |
| 6,208,970 B1 | 3/2001 | Ramanan |
| 6,366,882 B1 | 4/2002 | Bijl et al. |
| 6,374,221 B1 | 4/2002 | Haimi-Cohen |
| 6,385,582 B1 | 5/2002 | Iwata |
| 6,457,031 B1 | 9/2002 | Hanson |
| 6,535,848 B1 | 3/2003 | Ortega et al. |
| 6,704,709 B1 | 3/2004 | Kahn et al. |
| 6,728,677 B1 | 4/2004 | Kannan et al. |
| 6,813,603 B1 | 11/2004 | Groner et al. |
| 6,816,468 B1 | 11/2004 | Cruickshank |
| 6,832,189 B1 | 12/2004 | Kanevsky et al. |
| 6,947,896 B2 | 9/2005 | Hanson |
| 7,003,463 B1 | 2/2006 | Maes et al. |
| 7,016,844 B2 | 3/2006 | Othmer et al. |
| 7,130,790 B1 | 10/2006 | Flanagan et al. |
| 7,174,299 B2 | 2/2007 | Fujii et al. |
| 7,191,130 B1 | 3/2007 | Leggetter et al. |
| 7,191,135 B2 | 3/2007 | O'Hagan |
| 7,228,275 B1 | 6/2007 | Endo et al. |
| 7,236,932 B1 | 6/2007 | Grajski |
| 7,519,536 B2 | 4/2009 | Maes et al. |
| 7,606,718 B2 | 10/2009 | Cloran |
| 7,613,610 B1 | 11/2009 | Zimmerman et al. |
| 7,660,715 B1 | 2/2010 | Thambiratnam |
| 7,836,412 B1 | 11/2010 | Zimmerman |
| 7,844,454 B2 | 11/2010 | Coles et al. |
| 7,907,705 B1 | 3/2011 | Huff et al. |
| 7,913,155 B2 | 3/2011 | Basson et al. |
| 7,930,181 B1 | 4/2011 | Goffin et al. |
| 7,957,970 B1 | 6/2011 | Gorin et al. |
| 7,962,339 B2 | 6/2011 | Pieraccini et al. |
| 8,019,608 B2 | 9/2011 | Carraux et al. |
| 8,180,639 B2 | 5/2012 | Pieraccini et al. |
| 8,223,944 B2 | 7/2012 | Cloran et al. |
| 8,249,878 B2 | 8/2012 | Carraux et al. |
| 8,286,071 B1 | 10/2012 | Zimmerman et al. |
| 8,332,227 B2 | 12/2012 | Maes et al. |
| 8,332,231 B2 | 12/2012 | Cloran |
| 8,335,689 B2 | 12/2012 | Wittenstein et al. |
| 8,335,830 B2 | 12/2012 | Jablokov et al. |
| 8,370,143 B1 | 2/2013 | Coker |
| 8,379,801 B2 | 2/2013 | Romriell et al. |
| 8,407,052 B2 | 3/2013 | Hager |
| 8,484,042 B2 | 7/2013 | Cloran |
| 8,504,372 B2 | 8/2013 | Carraux et al. |
| 8,537,979 B1 | 9/2013 | Pollock |
| 8,605,682 B2 | 12/2013 | Efrati et al. |
| 8,626,520 B2 | 1/2014 | Cloran |
| 8,743,003 B2 | 6/2014 | De Lustrac et al. |
| 8,744,848 B2 | 6/2014 | Hoepfinger et al. |
| 8,781,510 B2 | 7/2014 | Gould et al. |
| 8,812,321 B2 | 8/2014 | Gilbert et al. |
| 8,868,425 B2 | 10/2014 | Maes et al. |
| 8,874,070 B2 | 10/2014 | Basore et al. |
| 8,892,447 B1 | 11/2014 | Srinivasan et al. |
| 8,898,065 B2 | 11/2014 | Newman et al. |
| 8,930,194 B2 | 1/2015 | Newman et al. |
| 9,002,713 B2 | 4/2015 | Ljolje et al. |
| 9,047,868 B1 | 6/2015 | O'Neill et al. |
| 9,058,813 B1 | 6/2015 | Blanksteen |
| 9,076,450 B1 | 7/2015 | Sadek et al. |
| 9,117,450 B2 | 8/2015 | Cook et al. |
| 9,153,231 B1 | 10/2015 | Salvador et al. |
| 9,183,843 B2 | 11/2015 | Fanty et al. |
| 9,191,789 B2 | 11/2015 | Pan |
| 9,197,745 B1 | 11/2015 | Chevrier et al. |
| 9,215,409 B2 | 12/2015 | Montero et al. |
| 9,245,522 B2 | 1/2016 | Hager |
| 9,247,052 B1 | 1/2016 | Walton |
| 9,318,110 B2 | 4/2016 | Roe |
| 9,324,324 B2 | 4/2016 | Knighton |
| 9,336,689 B2 | 5/2016 | Romriell et al. |
| 9,344,562 B2 | 5/2016 | Moore et al. |
| 9,374,536 B1 | 6/2016 | Nola et al. |
| 9,380,150 B1 | 6/2016 | Bullough et al. |
| 9,386,152 B2 | 7/2016 | Riahi et al. |
| 9,444,934 B2 | 9/2016 | Nelson et al. |
| 9,449,076 B2 | 9/2016 | Paek et al. |
| 9,460,719 B1 | 10/2016 | Antunes et al. |
| 9,502,033 B2 | 11/2016 | Carraux et al. |
| 9,514,747 B1 | 12/2016 | Bisani et al. |
| 9,525,830 B1 | 12/2016 | Roylance et al. |
| 9,535,891 B2 | 1/2017 | Raheja et al. |
| 9,548,048 B1 | 1/2017 | Solh et al. |
| 9,571,638 B1 | 2/2017 | Knighton et al. |
| 9,576,498 B1 | 2/2017 | Zimmerman et al. |
| 9,621,732 B2 | 4/2017 | Olligschlaeger |
| 9,628,620 B1 | 4/2017 | Rae et al. |
| 9,632,997 B1 | 4/2017 | Johnson et al. |
| 9,633,650 B2 * | 4/2017 | Achituv .................. G10L 15/01 |
| 9,633,657 B2 | 4/2017 | Svendsen et al. |
| 9,641,681 B2 | 5/2017 | Nuta et al. |
| 9,653,076 B2 | 5/2017 | Kim |
| 9,654,628 B2 | 5/2017 | Warren et al. |
| 9,697,835 B1 | 7/2017 | Kuo et al. |
| 9,704,111 B1 | 7/2017 | Antunes et al. |
| 9,710,819 B2 | 7/2017 | Cloran et al. |
| 9,715,876 B2 | 7/2017 | Hager |
| 9,761,241 B2 | 9/2017 | Maes et al. |
| 9,842,587 B2 | 12/2017 | Hakkani-Tur et al. |
| 9,858,256 B2 | 1/2018 | Hager |
| 9,886,956 B1 | 2/2018 | Antunes et al. |
| 9,922,654 B2 | 3/2018 | Chang et al. |
| 9,947,322 B2 | 4/2018 | Kang et al. |
| 9,953,653 B2 | 4/2018 | Newman et al. |
| 9,990,925 B2 | 6/2018 | Weinstein et al. |
| 10,032,455 B2 | 7/2018 | Newman et al. |
| 10,044,854 B2 | 8/2018 | Rae et al. |
| 10,049,669 B2 | 8/2018 | Newman et al. |
| 10,091,545 B1 | 10/2018 | Cwik |
| 10,134,425 B1 | 11/2018 | Johnson, Jr. |
| 10,176,809 B1 | 1/2019 | Pierard |
| 10,186,265 B1 | 1/2019 | Lockhart et al. |
| 10,388,272 B1 | 8/2019 | Thomson et al. |
| 10,970,414 B1 | 4/2021 | Lesner et al. |
| 2002/0006195 A1 | 1/2002 | Venkatesan et al. |
| 2002/0152071 A1 | 10/2002 | Chaiken et al. |
| 2003/0050777 A1 | 3/2003 | Walker, Jr. |
| 2004/0083105 A1 | 4/2004 | Jaroker |
| 2005/0026601 A1 | 2/2005 | Chuey |
| 2005/0049868 A1 | 3/2005 | Busayapongchai |
| 2005/0094777 A1 | 5/2005 | McClelland |
| 2005/0119897 A1 | 6/2005 | Bennett et al. |
| 2005/0226394 A1 | 10/2005 | Engelke et al. |
| 2005/0226398 A1 | 10/2005 | Bojeun |
| 2006/0072727 A1 | 4/2006 | Bantz et al. |
| 2006/0074623 A1 | 4/2006 | Tankhiwale |
| 2006/0089857 A1 | 4/2006 | Zimmerman et al. |
| 2007/0153989 A1 | 7/2007 | Howell et al. |
| 2007/0208570 A1 | 9/2007 | Bhardwaj et al. |
| 2007/0225970 A1 | 9/2007 | Kady et al. |
| 2007/0250315 A1 * | 10/2007 | Bennett .................. H04M 11/10 704/235 |
| 2008/0040111 A1 | 2/2008 | Miyamoto et al. |
| 2008/0049908 A1 | 2/2008 | Doulton |
| 2008/0133245 A1 | 6/2008 | Proulx et al. |
| 2009/0018833 A1 | 1/2009 | Kozat et al. |
| 2009/0037171 A1 | 2/2009 | McFarland et al. |

(56) References Cited

U.S. PATENT DOCUMENTS

| | | |
|---|---|---|
| 2009/0119190 A1 | 5/2009 | Realini |
| 2009/0177461 A1 | 7/2009 | Ehsani et al. |
| 2009/0187410 A1 | 7/2009 | Wilpon et al. |
| 2009/0248416 A1 | 10/2009 | Gorin et al. |
| 2009/0299743 A1 | 12/2009 | Rogers |
| 2010/0027765 A1 | 2/2010 | Schultz et al. |
| 2010/0063815 A1 | 3/2010 | Cloran et al. |
| 2010/0076752 A1 | 3/2010 | Zweig et al. |
| 2010/0076843 A1 | 3/2010 | Ashton |
| 2010/0121637 A1 | 5/2010 | Roy et al. |
| 2010/0138411 A1 | 6/2010 | Judy et al. |
| 2010/0145729 A1 | 6/2010 | Katz |
| 2010/0176920 A1 | 7/2010 | Kursawe et al. |
| 2010/0312556 A1 | 12/2010 | Ljolje et al. |
| 2010/0318355 A1 | 12/2010 | Li et al. |
| 2010/0323728 A1 | 12/2010 | Gould et al. |
| 2011/0087491 A1 | 4/2011 | Wittenstein et al. |
| 2011/0112833 A1 | 5/2011 | Frankel et al. |
| 2011/0123003 A1 | 5/2011 | Romriell et al. |
| 2011/0128953 A1 | 6/2011 | Wozniak et al. |
| 2011/0295603 A1 | 12/2011 | Meisel |
| 2012/0016671 A1 | 1/2012 | Jaggi et al. |
| 2012/0178064 A1 | 7/2012 | Katz |
| 2012/0214447 A1 | 8/2012 | Russell et al. |
| 2012/0245934 A1 | 9/2012 | Talwar et al. |
| 2012/0316882 A1 | 12/2012 | Fiumi |
| 2013/0018650 A1 | 1/2013 | Moore et al. |
| 2013/0035937 A1 | 2/2013 | Webb et al. |
| 2013/0060572 A1 | 3/2013 | Garland et al. |
| 2013/0132084 A1 | 5/2013 | Stonehocker et al. |
| 2013/0132086 A1 | 5/2013 | Xu et al. |
| 2013/0151250 A1 | 6/2013 | Van Blon |
| 2013/0317818 A1 | 11/2013 | Bigham et al. |
| 2014/0018045 A1 | 1/2014 | Tucker |
| 2014/0067390 A1 | 3/2014 | Webb |
| 2014/0163981 A1 | 6/2014 | Cook et al. |
| 2014/0207451 A1 | 7/2014 | Topiwala et al. |
| 2014/0278402 A1 | 9/2014 | Charugundla |
| 2014/0314220 A1 | 10/2014 | Charugundla |
| 2015/0058006 A1 | 2/2015 | Proux |
| 2015/0073790 A1 | 3/2015 | Steuble et al. |
| 2015/0094105 A1 | 4/2015 | Pan |
| 2015/0095026 A1 | 4/2015 | Bisani et al. |
| 2015/0106091 A1 | 4/2015 | Wetjen et al. |
| 2015/0130887 A1 | 5/2015 | Thelin et al. |
| 2015/0227579 A1 | 8/2015 | Cantarero et al. |
| 2015/0287408 A1 | 10/2015 | Svendsen et al. |
| 2015/0288815 A1 | 10/2015 | Charugundla |
| 2015/0332670 A1 | 11/2015 | Akbacak et al. |
| 2015/0341486 A1 | 11/2015 | Knighton |
| 2016/0012751 A1 | 1/2016 | Hirozawa |
| 2016/0062970 A1 | 3/2016 | Sadkin et al. |
| 2016/0078860 A1 | 3/2016 | Paulik et al. |
| 2016/0259779 A1 | 9/2016 | Labsky et al. |
| 2016/0306794 A1 | 10/2016 | Huang et al. |
| 2016/0379626 A1 | 12/2016 | Deisher et al. |
| 2017/0085506 A1 | 3/2017 | Gordon |
| 2017/0116993 A1 | 4/2017 | Miglietta et al. |
| 2017/0148433 A1 | 5/2017 | Catanzaro et al. |
| 2017/0187876 A1 | 6/2017 | Hayes et al. |
| 2017/0201613 A1 | 7/2017 | Engelke et al. |
| 2017/0206808 A1 | 7/2017 | Engelke et al. |
| 2017/0206888 A1 | 7/2017 | Engelke et al. |
| 2017/0206890 A1 | 7/2017 | Tapuhi et al. |
| 2017/0206914 A1 | 7/2017 | Engelke et al. |
| 2017/0208172 A1 | 7/2017 | Engelke et al. |
| 2017/0236527 A1 | 8/2017 | Dimitriadis et al. |
| 2017/0270929 A1 | 9/2017 | Aleksic et al. |
| 2017/0294186 A1 | 10/2017 | Pinto et al. |
| 2018/0013886 A1 | 1/2018 | Rae et al. |
| 2018/0034961 A1 | 2/2018 | Engelke et al. |
| 2018/0052823 A1 | 2/2018 | Scally et al. |
| 2018/0081869 A1 | 3/2018 | Hager |
| 2018/0197545 A1 | 7/2018 | Willett et al. |
| 2018/0270350 A1 | 9/2018 | Engelke et al. |
| 2019/0037072 A1 | 1/2019 | Engelke et al. |
| 2019/0057683 A1* | 2/2019 | Sak .......... G10L 15/22 |
| 2019/0312973 A1 | 10/2019 | Engelke et al. |
| 2019/0384931 A1 | 12/2019 | Lahav |
| 2020/0007679 A1 | 1/2020 | Engelke et al. |
| 2020/0020319 A1 | 1/2020 | Malhotra et al. |
| 2020/0153957 A1 | 5/2020 | Engelke et al. |
| 2020/0153958 A1 | 5/2020 | Engelke et al. |
| 2020/0175962 A1 | 6/2020 | Thomson et al. |
| 2020/0193981 A1 | 6/2020 | Ji et al. |
| 2020/0311113 A1 | 10/2020 | Gao et al. |
| 2020/0356363 A1 | 11/2020 | Dewitt et al. |
| 2021/0124802 A1 | 4/2021 | Wang et al. |
| 2021/0192072 A1 | 6/2021 | Roake et al. |
| 2023/0093437 A1 | 3/2023 | Domosi et al. |

FOREIGN PATENT DOCUMENTS

| | | |
|---|---|---|
| EP | 2587478 A2 | 9/2011 |
| EP | 2372707 A1 | 10/2011 |
| JP | 2011002656 A | 1/2011 |
| JP | 2015018238 A | 1/2015 |
| KR | 20170134115 A | 12/2017 |
| WO | 1998034217 A1 | 8/1998 |
| WO | 0225910 A2 | 3/2002 |
| WO | 2014022559 A1 | 2/2014 |
| WO | 2014049944 A1 | 4/2014 |
| WO | 2014176489 A2 | 10/2014 |
| WO | 2012165529 A1 | 2/2015 |
| WO | 2015073260 A1 | 5/2015 |
| WO | 2015131028 A1 | 9/2015 |
| WO | 2015148037 A1 | 10/2015 |
| WO | 2017054122 A1 | 4/2017 |

OTHER PUBLICATIONS

Lambert Mathias, Statistical Machine Translation and Automatic Speech Recognition under Uncertainty, Dissertation submitted to Johns Hopkins University, Dec. 2007, 131 pages.

Mike Wald, Captioning for Deaf and Hard of Hearing People by Editing Automatic Speech Recognition in Real Time, ICCHP'06 Proceedings of the 10th International Conference on Computers Helping People with Special Needs, Jul. 2006, pp. 683-690, Linz, Austria.

Jeff Adams, Kenneth Basye, Alok Parlikar, Andrew Fletcher, & Jangwon Kim, Automated Speech Recognition for Captioned Telephone Conversations, Faculty Works, Nov. 3, 2017, pp. 1-12.

Lasecki et al., Real-Time Captioning by Groups of Non-Experts, Rochester Institute of Technology, Oct. 2012, USA.

Benjamin Lecouteux, Georges Linares, Stanislas Oger, Integrating imperfect transcripts into speech recognition systems for building high-quality corpora, ScienceDirect, Jun. 2011.

Maarten Van Gompel et al., Efficient n-gram, Skipgram and Flexgram Modelling with Colibri Core, Journal of Open Research Software, vol. 4, Aug. 2, 2016, p. 3.

International Search Report and Written Opinion received in International Application No. PCT/US2019/062872, dated Feb. 7, 2020.

U.S. Appl. No. 16/537,196, filed Aug. 9, 2019.
U.S. Appl. No. 16/842,231, filed Apr. 7, 2020.
U.S. Appl. No. 16/858,201, filed Apr. 24, 2020.
U.S. Appl. No. 16/911,691, filed Jun. 25, 2020.

International Search Report and Written Opinion, as issued in connection with International Patent Application No. PCT/US2021/045263, dated Nov. 22, 2021.

* cited by examiner

302 — The big red hog
304 — The big red dog jumps through hoops.
*FIG. 3A*
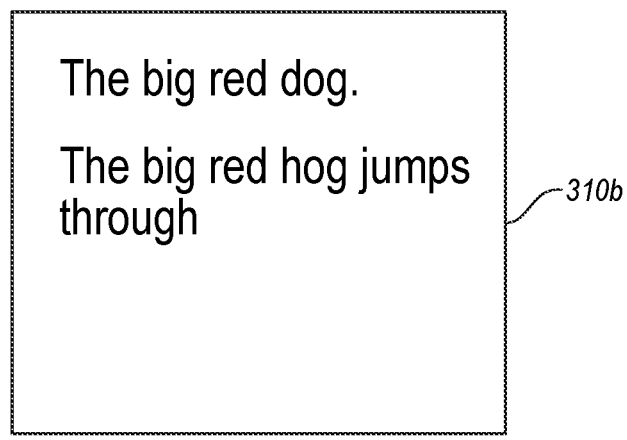
*FIG. 3B*
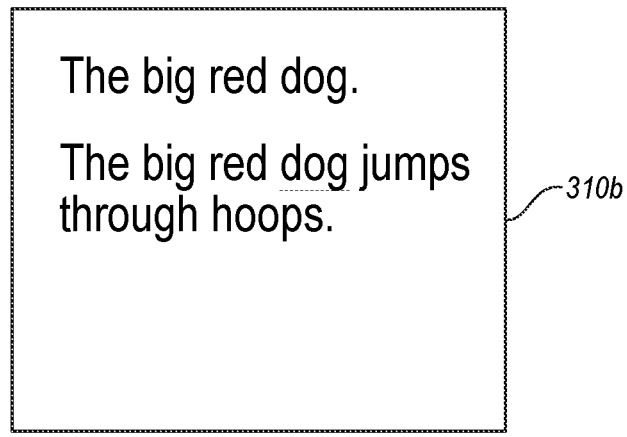
*FIG. 3C*

TRAINING SPEECH RECOGNITION SYSTEMS USING WORD SEQUENCES

CROSS-REFERENCE TO RELATED APPLICATION

This application is a continuation of U.S. patent application Ser. No. 16/997,587, filed on Aug. 19, 2020, the disclosure of which is incorporated herein by reference in its entirety.

FIELD

The embodiments discussed herein are related to training speech recognition systems using word sequences.

BACKGROUND

Transcriptions of audio communications between people may assist people that are hard-of-hearing or deaf to participate in the audio communications. Transcription of audio communications may be generated with assistance of humans or may be generated without human assistance using automatic speech recognition ("ASR") systems. After generation, the transcriptions may be provided to a device for display.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a method may include obtaining a text string that is a transcription of audio data and selecting a sequence of words from the text string as a first word sequence. The method may further include encrypting the first word sequence and comparing the encrypted first word sequence to multiple encrypted word sequences. Each of the multiple encrypted word sequences may be associated with a corresponding one of multiple counters. The method may also include in response to the encrypted first word sequence corresponding to one of the multiple encrypted word sequences based on the comparison, incrementing a counter of the multiple counters associated with the one of the multiple encrypted word sequences and adapting a language model of an automatic transcription system using the multiple encrypted word sequences and the multiple counters.

BRIEF DESCRIPTION OF THE DRAWINGS

Example embodiments will be described and explained with additional specificity and detail through the use of the accompanying drawings in which:

FIG. 3A illustrates example text strings;

FIGS. 3B and 3C illustrate an example presentation of transcriptions on a device;

DESCRIPTION OF EMBODIMENTS

Figure 1:
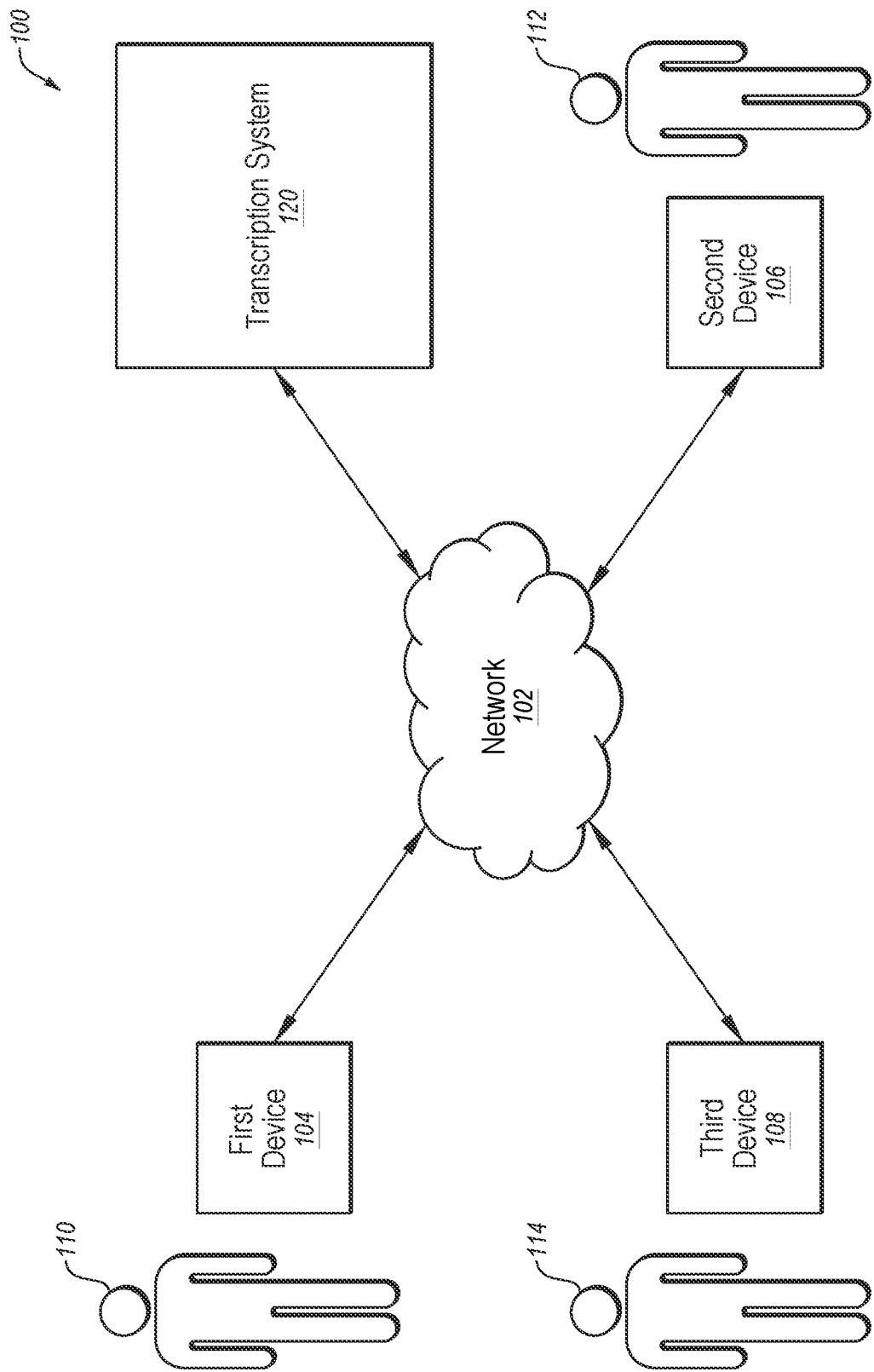
FIG. 1 illustrates an example environment for transcription of communications.

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device for display to a user of the device. The transcription may assist the user to better understand what is being said during the communication session.

For example, a user may be hard of hearing and participating in a phone call. Because the user is hard of hearing, the user may not understand everything being said during the phone call from the audio of the phone. However, the audio may be provided to a transcription system. The transcription system may generate a transcription of the audio in real-time during the phone call and provide the transcription to a device of the user. The device may present the transcription to the user. Having a transcription of the audio may assist the hard of hearing user to better understand the audio and thereby better participate in the phone call.

Presenting transcriptions that are inaccurate or that lag behind the audio of the communication session may reduce the benefit of the transcription. Thus, the systems and methods described in some embodiments may be directed to reducing the inaccuracy of transcriptions and a time required to generate transcriptions. Additionally, the systems and methods described in some embodiments may be directed to reducing costs to generate transcriptions. Reduction of costs may make transcriptions available to more people. In some embodiments, the systems and methods described in this disclosure may reduce inaccuracy, time, and/or costs by incorporating a fully automatic speech recognition (ASR) system into a transcription system.

In some embodiments, systems and methods in this disclosure may be configured to select between different transcription systems and/or methods. Alternatively or additionally, systems and methods in this disclosure may be configured to switch between different transcription systems and/or methods during a communication session. The selection of different systems and/or methods and switching between different systems and/or methods, may, in some embodiments, reduce costs, reduce latency, or provide other benefits.

In some embodiments, systems and methods in this disclosure may be configured to combine or fuse multiple transcriptions into a single transcription that is provided to a device for display to a user. Fusing multiple transcriptions may assist a transcription system to produce a more accurate transcription with fewer errors. In some embodiments, the multiple transcriptions may be generated by different systems and/or methods. For example, a transcription system may include an automatic ASR system and a revoicing system. Each of the automatic ASR system and the revoicing system may generate a transcription of audio of a communication session. The transcriptions from each of the automatic ASR system and the revoicing system may be fused together to generate a finalized transcription that may be provided to a device for display.

Thus, the systems and methods described in this disclosure may result in the improved display of transcriptions at a user device. Furthermore, the systems and methods described in this disclosure may improve technology with respect to audio transcriptions and real-time generation and display of audio transcriptions. Additionally, the systems and methods described in this disclosure may improve technology with respect to automatic speech recognition along with other technologies.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, a third device 108, and a transcription system 120 that may include a first transcription unit 122, a second transcription unit 124, and a third transcription unit 126.

The network 102 may be configured to communicatively couple the first device 104, the second device 106, the third device 108, and the transcription system 120. In some embodiments, the network 102 may be any network or configuration of networks configured to send and receive communications between systems and devices. In some embodiments, the network 102 may include a conventional type network, a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

As an example, the network 102 may include a POTS network that may couple the first device 104 and the second device 106, and a wired/optical network and a wireless network that may couple the first device 104 and the transcription system 120. In these and other embodiments, the network 102 may not be a conjoined network. For example, the network 102 may represent separate networks and the elements in the environment 100 may route data between the separate networks. In short, the elements in the environment 100 may be coupled together such that data may be transferred by the network 102 using any known method or system.

Each of the first device 104, the second device 106, and the third device 108 may be any electronic or digital computing device. For example, each of the first device 104, the second device 106, and the third device 108 may include a desktop computer, a laptop computer, a smartphone, a mobile phone, a video phone, a tablet computer, a TV or other display screen, a telephone, a speakerphone, a VoIP phone, a smart speaker, a phone console, a caption device, a captioning telephone, a communication system in a vehicle, a wearable device such as a watch or pair of glasses configured for communication, or any other computing device that may be used for communication between users of the first device 104, the second device 106, and the third device 108.

In some embodiments, each of the first device 104, the second device 106, and the third device 108 may include memory and at least one processor, which are configured to perform operations as described in this disclosure, among other operations. In some embodiments, each of the first device 104, the second device 106, and the third device 108 may include computer-readable instructions that are configured to be executed by each of the first device 104, the second device 106, and the third device 108 to perform operations described in this disclosure.

In some embodiments, each of the first device 104, the second device 106, and the third device 108 may be configured to establish communication sessions with other devices. For example, each of the first device 104, the second device 106, and the third device 108 may be configured to establish an outgoing communication session, such as a telephone call, video call, or other communication session, with another device over a telephone line or network. For example, each of the first device 104, the second device 106, and the third device 108 may communicate over a WiFi network, wireless cellular network, a wired Ethernet network, an optical network, or a POTS line.

In some embodiments, each of the first device 104, the second device 106, and the third device 108 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the first device 104 may be configured to obtain first audio from a first user 110. The first audio may include a first voice of the first user 110. The first voice of the first user 110 may be words spoken by the first user. For example, the first device 104 may obtain the first audio from a microphone of the first device 104 or from another device that is communicatively coupled to the first device 104.

In some embodiments, the second device 106 may be configured to obtain second audio from a second user 112. The second audio may include a second voice of the second user 112. The second voice of the second user 112 may be words spoken by the second user. In some embodiments, the second device 106 may obtain the second audio from a microphone of the second device 106 or from another device communicatively coupled to the second device 106. During a communication session, the first device 104 may provide the first audio to the second device 106. Alternatively or additionally, the second device 106 may provide the second audio to the first device 104. Thus, during a communication session, both the first device 104 and the second device 106 may obtain both the first audio from the first user 110 and the second audio from the second user 112.

In some embodiments, the transcription system 120 may be configured to generate a transcription of audio, such as audio from a communication session. The audio may be received from any of the first device 104, the second device 106, and the third device 108 in the environment 100. The transcription system 120 may provide the transcription of the audio to one or more devices, including one or more of the first device 104, the second device 106, and the third device 108. This disclosure describes various configurations of the transcription system 120 and various methods performed by the transcription system 120 to generate or direct generation of transcriptions of audio.

The transcription system 120 may generate the transcription of the audio substantially in real-time, such that the transcription may be presented during a communication session that generates the audio. For example, the transcription of the audio may be generated and presented such that the transcription lags the audio by 1, 2, 3, 4, 5, 7, 10, 15, or 20 seconds or by less than a second.

The transcription system 120 may include any configuration of hardware, such as processors, servers, and storage servers, such as database servers, that are networked together and configured to perform one or more task. For example, the transcription system 120 may include one or multiple computing systems, such as multiple servers that each include memory and at least one processor.

In some embodiments, the transcription system 120 may be configured to generate or direct generation of the transcription of audio using one or more automatic speech recognition (ASR) systems. The term "ASR system" as used in this disclosure may include a compilation of hardware, software, and/or data, such as trained models, that are configured to recognize speech in audio and generate a transcription of the audio based on the recognized speech. For example, in some embodiments, an ASR system may be a compilation of software and data models. In these and other embodiments, multiple ASR systems may be included on a computer system, such as a server, and may include the computer system. In these and other embodiments, the multiple ASR systems may share or jointly access software and data models on the computer system. Alternatively or additionally, an ASR system may be a compilation of hardware, software, and data models.

The ASR systems used by the transcription system 120 may be configured to operate in one or more locations. The locations may include the transcription system 120, the first device 104, the second device 106, the third device 108, another electronic computing device, or at an ASR service that is coupled to the transcription system 120 by way of the network 102. The ASR service may include a service that provides transcriptions of audio. Example ASR services include services provided by Google®, Microsoft®, and IBM®, among others.

In some embodiments, the ASR systems described in this disclosure may be separated into one of two categories: speaker-dependent ASR systems and speaker-independent ASR systems. In some embodiments, a speaker-dependent ASR system may use a speaker-dependent speech model. A speaker-dependent speech model may be specific to a particular person or a group of people. For example, a speaker-dependent ASR system configured to transcribe a communication session between the first user 110 and the second user 112 may include a speaker-dependent speech model that may be specifically trained using speech patterns for either or both the first user 110 and the second user 112.

In some embodiments, a speaker-independent ASR system may be trained on a speaker-independent speech model. A speaker-independent speech model may be trained for general speech and not specifically trained using speech patterns of the people for which the speech model is employed. For example, a speaker-independent ASR system configured to transcribe a communication session between the first user 110 and the second user 112 may include a speaker-independent speech model that may not be specifically trained using speech patterns for the first user 110 or the second user 112. In these and other embodiments, the speaker-independent speech model may be trained using speech patterns of users of the transcription system 120 other than the first user 110 and the second user 112.

Figure 13:
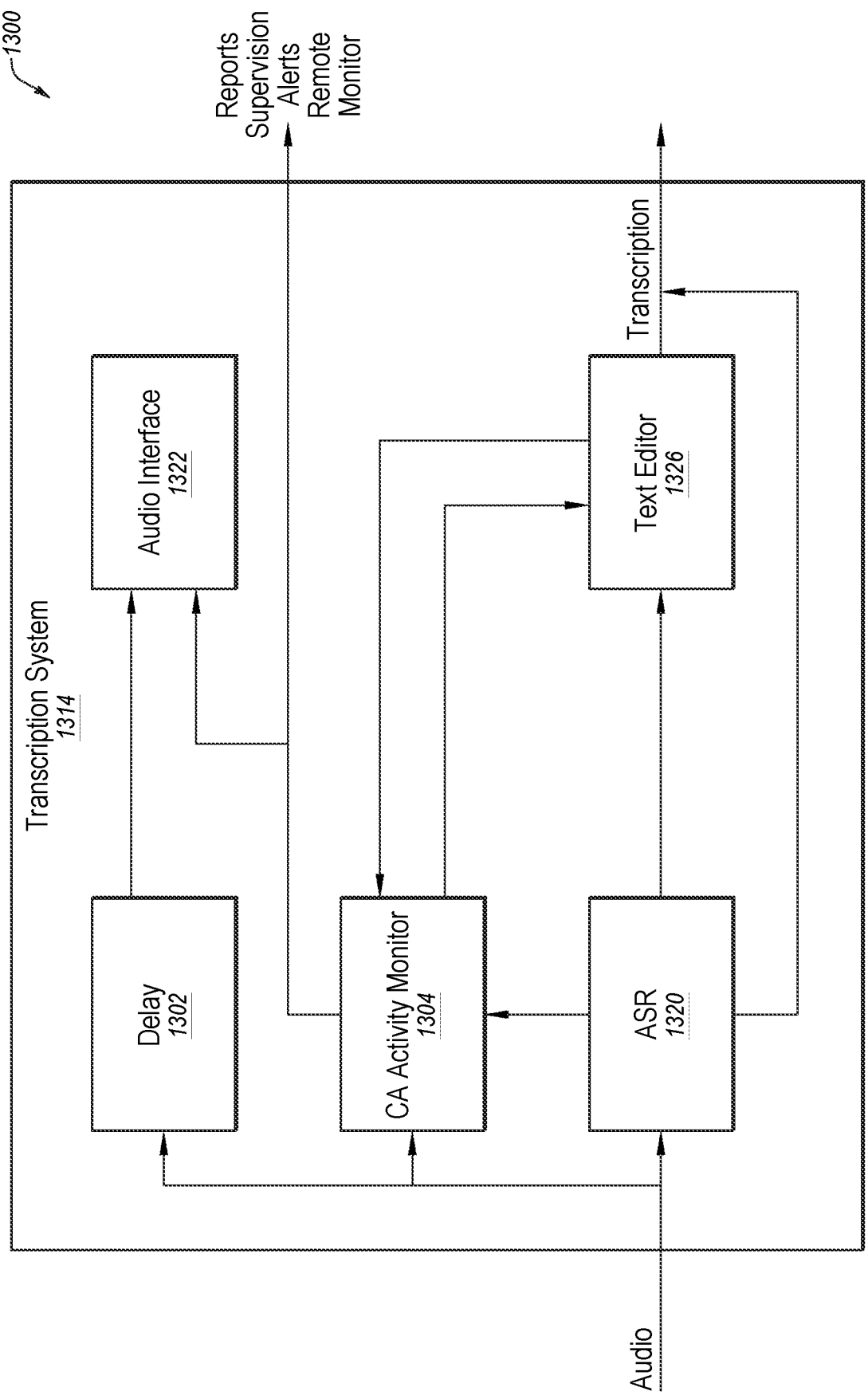
FIG. 13 illustrates another example environment for transcription of communications.
Figure 14:
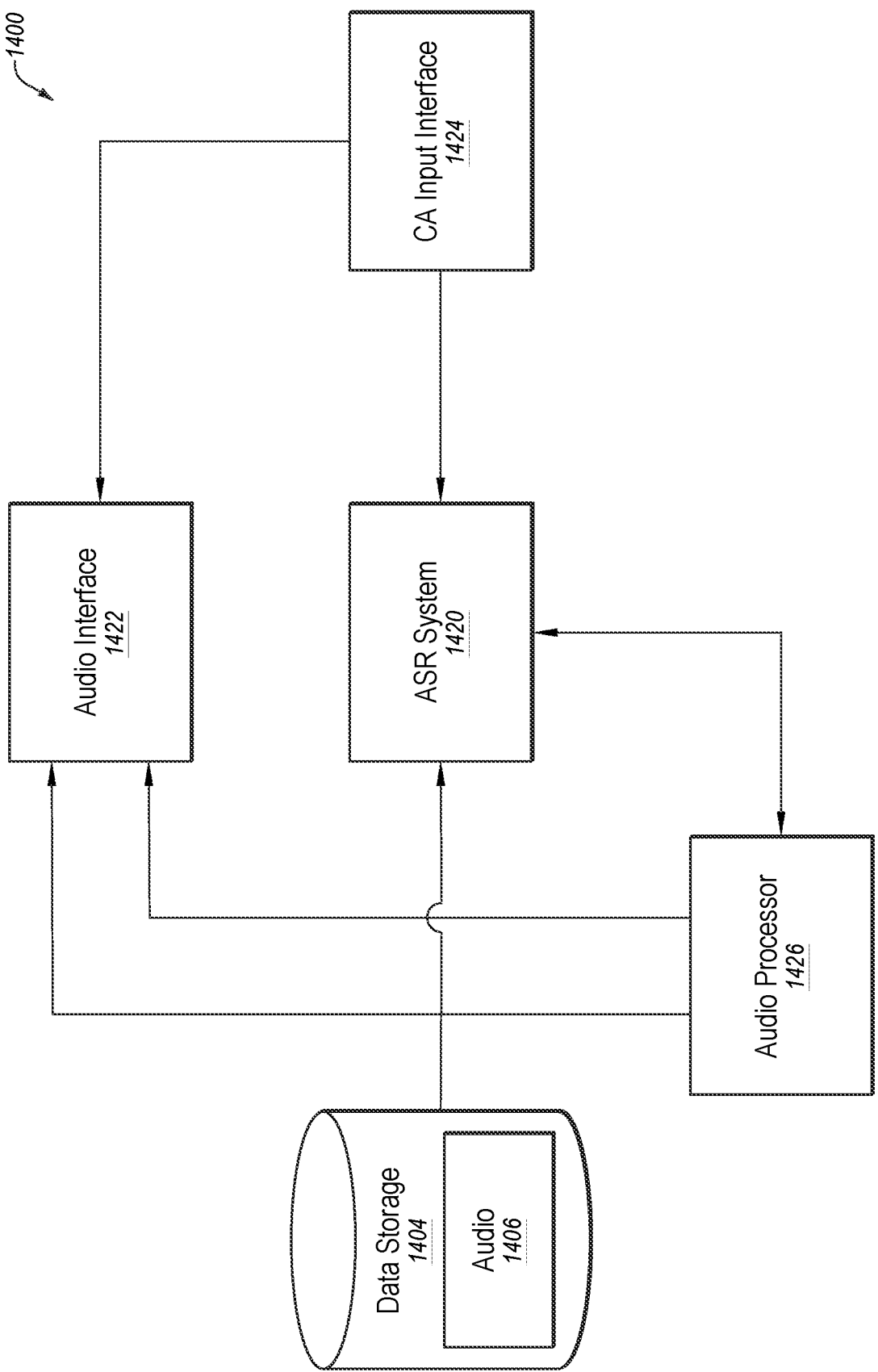
FIG. 14 illustrates another example environment for transcription of communications.

In some embodiments, the audio used by the ASR systems may be revoiced audio. Revoiced audio may include audio that has been received by the transcription system 120 and gone through a revoicing process. The revoicing process may include the transcription system 120 obtaining audio from either one or both of the first device 104 and the second device 106. The audio may be broadcast by a captioning agent (CA) client for a captioning agent (CA). The CA client may broadcast or direct broadcasting of the audio using a speaker. The CA listens to the broadcast audio and speaks the words that are included in the broadcast audio. The CA client may be configured to capture or direct capturing of the speech of the CA. For example, the CA client may use or direct use of a microphone to capture the speech of the CA to generate revoiced audio. In this disclosure, the use of the term audio generally may refer to both audio that results from a communication session between devices without revoicing and revoiced audio. FIGS. 13 and 14 of the present disclosure, among others, describe various systems and methods that may be used to evaluate a CA and or relate to activities that may be performed by a CA that do not relate to generating a transcription in real-time or substantially in real-time during a communication session.

In some embodiments, revoiced audio may be provided to a speaker-independent ASR system. In these and other embodiments, the speaker-independent ASR system may not be specifically trained using speech patterns of the CA revoicing the audio. Alternatively or additionally, revoiced audio may be provided to a speaker-dependent ASR system.

In these and other embodiments, the speaker-dependent ASR system may be specifically trained using speech patterns of the CA revoicing the audio.

In some embodiments, a transcription generated from revoiced audio may be referred to in this disclosure as a revoiced transcription. Alternatively or additionally, when a transcription is generated from audio that is not revoiced the transcription may be referred to in this disclosure as a non-revoiced transcription.

In some embodiments, the transcription system 120 may be configured to determine an accuracy of the transcriptions generated by the transcription system 120. The accuracy may be estimated for an entire communication session, a portion of a communication session, a phrase, or a word. In these and other embodiments, the term "accuracy" may be used generically to refer to one or more metrics of a transcription or of the process of generating a transcription. For example, the term accuracy may represent one or more metrics including values or estimates for: accuracy, quality, error counts, accuracy percentages, error rates, error rate percentages, confidence, likelihood, likelihood ratio, log likelihood ratio, word score, phrase score, probability of an error, word probability, rating, ranking, and various other metrics related to transcriptions or the generation of transcriptions. Additionally, any of the above terms may be used in this disclosure interchangeably unless noted otherwise or understood from the context of the description. For example, an embodiment that describes the metric of confidence is used to make a decision or may rely on other of the metrics described above to make the decision. Thus, the use of a specific term outside of the term accuracy should not be limiting, but rather as an example metric that may be used from multiple potential metrics.

For example, accuracy percentage of a transcription may equal accuracy of tokens in the transcription multiplied by 100% and divided by the number of tokens in the transcription. In these and other embodiments, the accuracy percentage may be 100% minus the percentage error rate. As another example, accuracy may equal one minus the error rate when error and accuracy are expressed in decimals. Thus, a description for estimating or utilizing one form of accuracy is to be understood to also be a description for estimating or utilizing another form of accuracy, since accuracy and error rates are merely different expressions of the same phenomenon. As another example, an agreement rate may be substantially equivalent to a disagreement rate, since they are complementary. For example, an agreement rate may be expressed as one (or 100%) minus the disagreement rate. In another example, where a method is described for using an agreement rate to form an estimate or selection, then a disagreement rate may be similarly used.

In some embodiments, the estimated or predicted accuracy may be based on past accuracy estimates. For example, past accuracy estimates may include the estimated and/or calculated accuracy for a previous period of time (e.g., for the past 1, 5, 10, 20, 30, or 60 seconds), since the beginning of the communication session, or during at least part of a previous communication session with the same transcription party. In these and other embodiments, the predicted accuracy may be based on the past accuracy estimates. Alternatively or additionally, the predicted accuracy may be the past accuracy estimates. For example, if the past accuracy estimates an accuracy of 95%, the predicted accuracy going forward may equal the past accuracy estimates and may be 95%. Generally, when discussing a predicted accuracy in this disclosure, the predicted accuracy may be the past accuracy or may be a determination that is based on the past accuracy. Thus, the use of the term "predict," "predicted," or "prediction" does not imply that additional calculations are performed with respect to previous estimates or determinations of accuracy. Additionally, as discussed, the term accuracy may represent one or more metrics and the use of the term "predict," "predicted," or "prediction" with respect to any metric should be interpreted as discussed above. Additionally, the use of the term "predict," "predicted," or "prediction" with respect to any quantity, method, variable, or other element in this disclosure should be interpreted as discussed above and does not imply that additional calculations are performed to determine the prediction. For example, where a prediction is described with reference to metrics such as availability of transcription units, conversation topic, characteristics and types of users or CAs, cost of service, traffic volumes, business or operations measures such as a global metric, spoken language, an estimate based on past or current values may be equivalently used.

In some embodiments, various factors with respect to ASR systems used by the transcription system 120 to generate transcriptions may affect the accuracy and latency of the transcriptions. Measurements of one or more of these various factors may be used as features in determining estimates for accuracy and latency. For example, the measurements may be an example of features discussed with respect to FIG. 16 that may be considered when selecting a word for each position of the strings of the index value for inclusion in a final transcription, features used to select between ASR systems as described with respect to FIG. 21, and features used to train ASR models as described with respect to FIGS. 7-12, etc.

In one example, a factor that may affect the accuracy of a transcription may include a configuration of an ASR system. The configuration of an ASR system may include the configuration of various models included in an ASR system including features models, transform models, acoustic models, language models, pronunciation models, confidence models, among other models used in ASR systems. For example, FIGS. 7-12 of the present disclosure, among others, describe systems and methods that may relate to generation of a language model. More particularly, FIGS. 7-10 may describe how to collect n-grams from audio of a communication session between the first device 104 and the second device 106 that may be used to generate a language model that may be used by an ASR system of the transcription system 120. As another example, FIGS. 11 and 12 may describe systems and methods related to how the different models of an ASR system may be trained.

Figure 21:
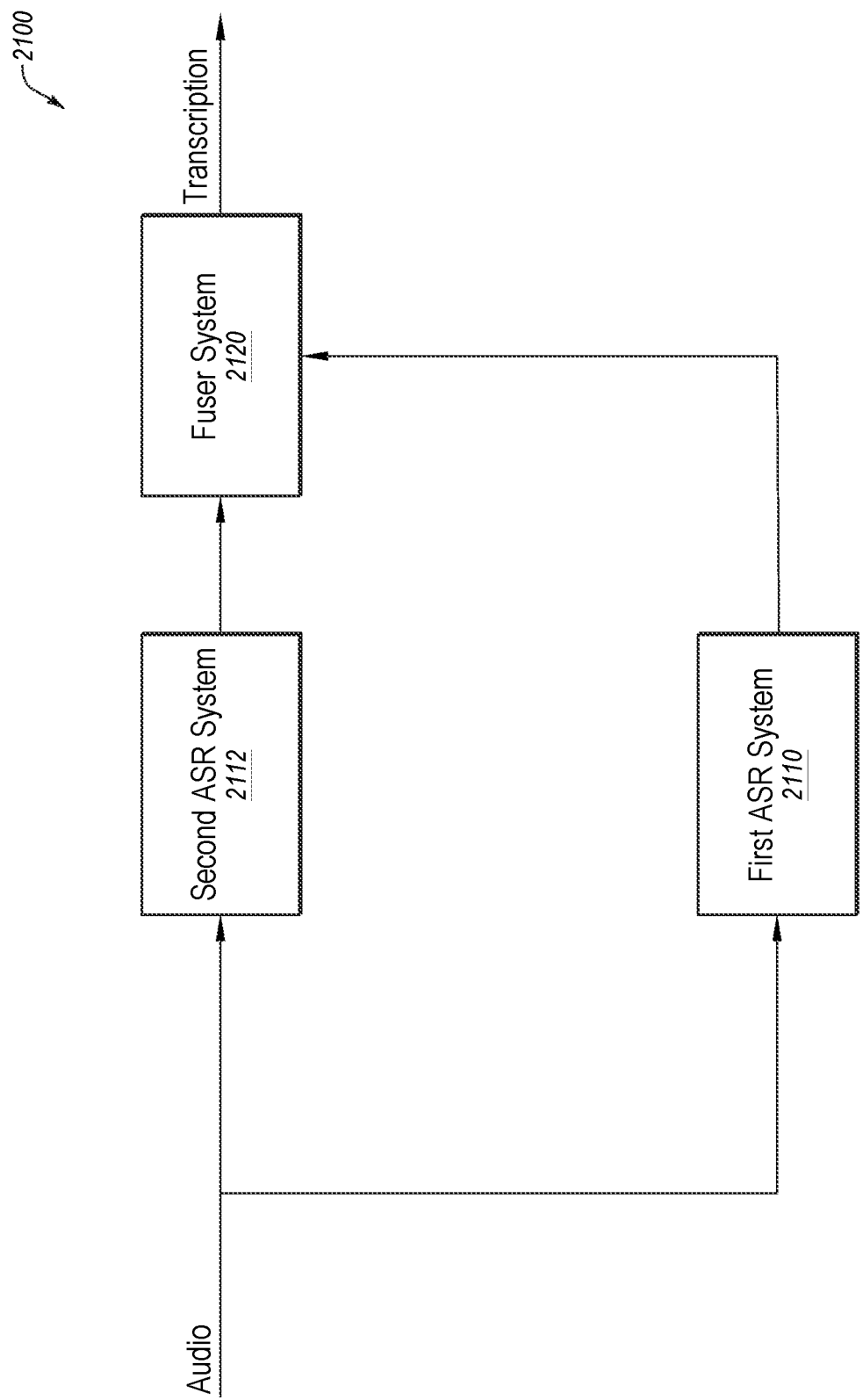
FIG. 21 illustrates another example environment for transcription of communications.
Figure 22:
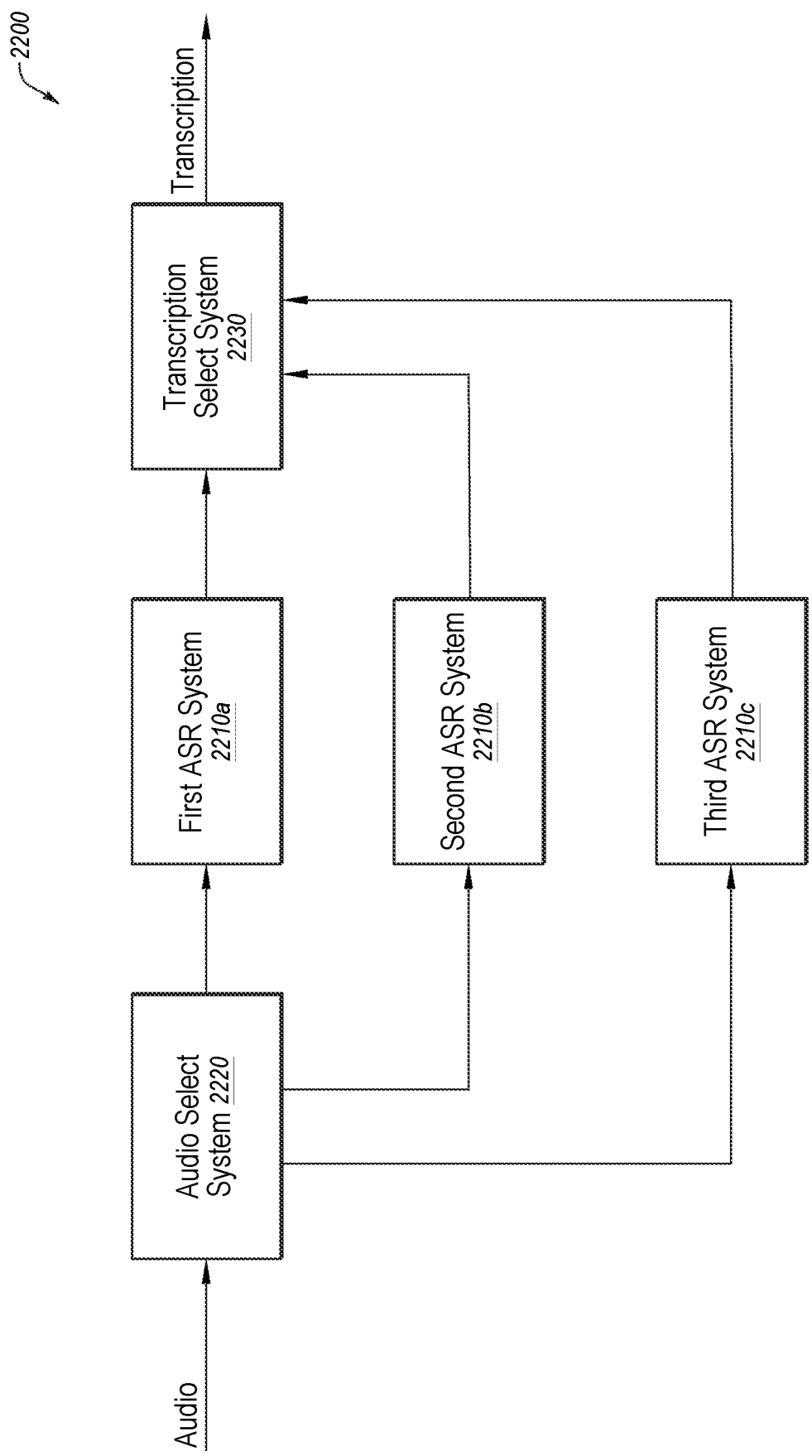
FIG. 22 illustrates another example environment for transcription of communications.

As another example, a factor that may affect the accuracy of a transcription may include a type of an ASR system used for the transcription. FIGS. 21 and 22 of the present disclosure, among others, describe various systems and methods that may be used to select between different types of ASR systems that may be used by the transcription system 120 to generate transcriptions of audio. The different types of ASR systems may affect an accuracy of the transcriptions generated by the transcription system 120. In these and other embodiments, some of the systems and methods may relate to selecting between an ASR system that generates revoiced transcriptions and an ASR system that generates non-revoiced transcriptions.

Additionally, a factor that may affect the accuracy of a transcription may include a number of ASR systems used to generate a transcription. FIGS. 16-19 of the present disclosure, among others, describe various systems and methods that may use multiple ASR systems to generate a transcription. For example, the multiple ASR systems may each generate a transcription that may be fused together to generate a single transcription. The fusion of multiple transcriptions may affect an accuracy of the transcription generated by the transcription system 120. For example, some of the systems and methods may relate to how to align words from the multiple ASR systems during the fusing process.

Figure 15:
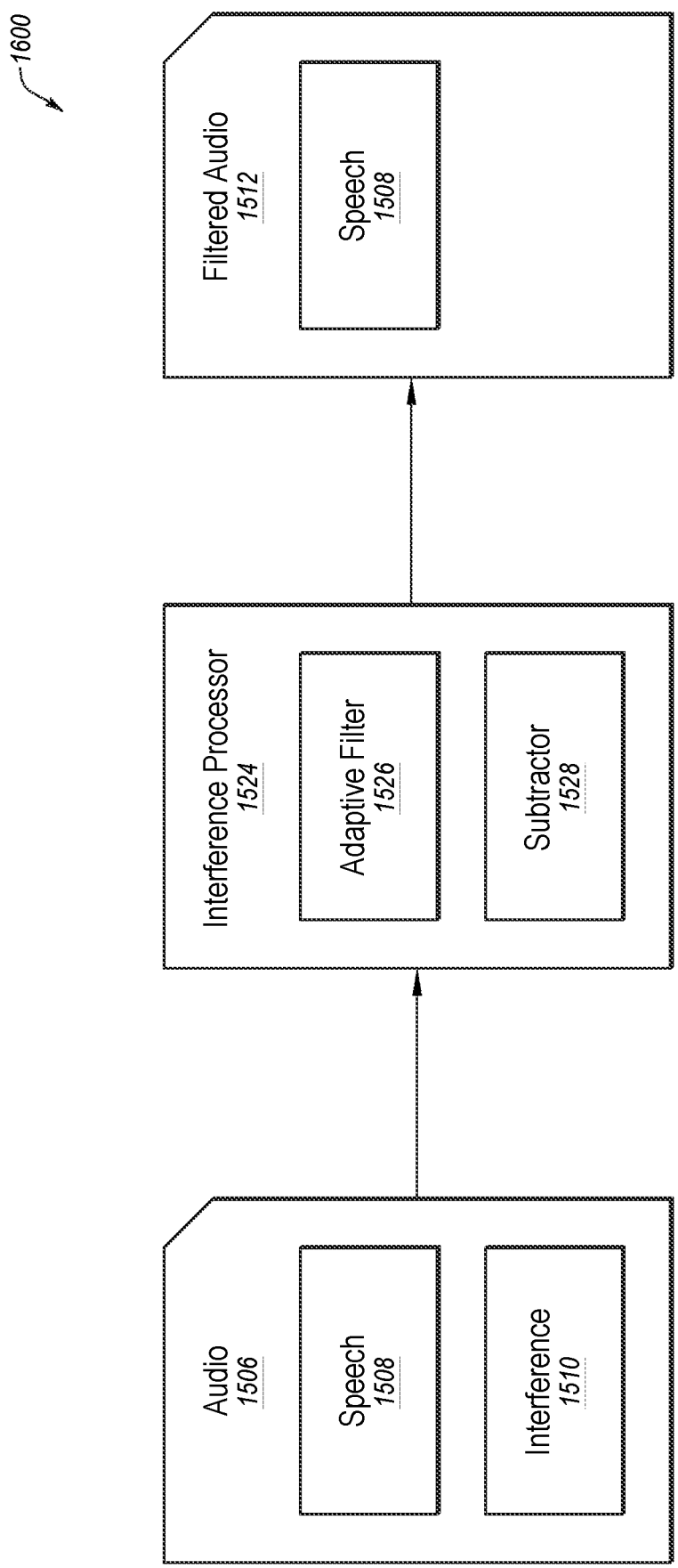
FIG. 15 illustrates an example environment to filter audio.
Figure 16:
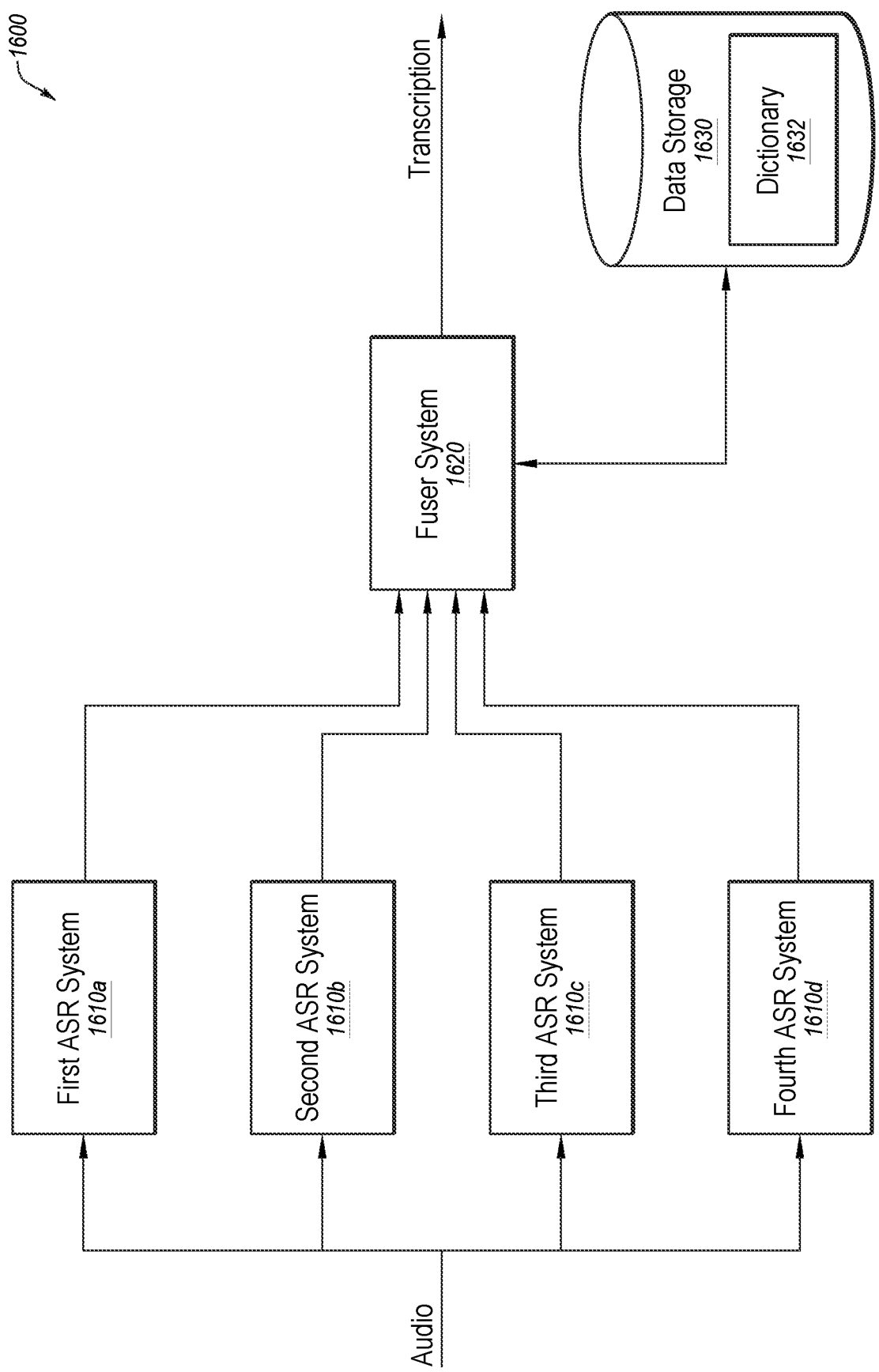
FIG. 16 illustrates an example environment for obtaining transcriptions.

Furthermore, a factor that may affect the accuracy of a transcription may include the audio from which the transcription is generated. FIGS. 15 and 16 of the present disclosure, among others, describe various systems and methods that may be used to configure the audio provided to the transcription system 120 from which the transcription is generated. The configuration of the audio may affect an accuracy of the transcription generated by the transcription system 120.

Another factor that may affect the accuracy of a transcription may include network and/or system problems within the environment 100. For example, a network problem between the first device 104 and the transcription system 120 may degrade the audio provided to the transcription system 120. The degraded audio may affect the transcription generated from the degraded audio.

As another example, a network problem may exist within the transcription system 120. For example, the transcription system 120 may include ASR systems that are network together. In these and other embodiments, the audio of a communication session may be obtained at a first system of the transcription system 120 and provided over a network to a second system of the transcription system 120 that includes an ASR system. Network problems in the network connecting the first and second systems of the transcription system 120 may degrade the audio. Alternately or additionally, the network issues between components in the environment 100 may affect the text being routed to a device, such as the first device 104.

In these and other embodiments, a device and/or system that provides data may provide an indication of an amount of the data being provided. For example, a length of the audio, checksum, number of words transmitted, or other validation information may be provided along with the data. As such, a receiving device may verify that the data being received has not been degraded. If the data is degraded, the data may be requested again or other actions may be taken.

Another factor that may affect the accuracy of a transcription may include system problems within the environment 100. For example, an ASR system in the transcription system 120 may not be functioning properly or may not be able to provide transcriptions. For example, one or more systems within the transcription system 120 may communicate with an ASR system using an application programming interface (API) of the ASR system. In these and other embodiments, in response to sending audio to an API, a system of the transcription system 120 and/or another device, such as the first device 104 may expect to receive text in response to sending the audio. In response to not receiving text when sending audio, an indication may be provided that no text is being received or an insufficient amount of text is being received. As another example, a revoicing ASR system may not have an available CA to revoice audio. In these and other embodiments, the revoicing ASR system may provide an indication that no transcription may be made available.

In some embodiments, the indication may be used to make decisions regarding accuracy of the transcription. Alternately or additionally, when the audio of multiple ASR systems is being combined and one of the ASR systems is not providing the audio, the combining system may use the indication regarding no text being received to make decisions regarding generating additional transcriptions.

As another example, an indication regarding a status of an ASR system may be provided to a user device, such as the first device 104. In these and other embodiments, the first device 104 may provide an indication of a status of an ASR system to the first user 110. The first device 104 may also solicit information from the first user 110. For example, the first device 104 may indicate the status of an ASR system and request that the first user 110 provide input regarding selecting another ASR system to provide transcriptions. For example, if a revoicing ASR system is unavailable, the first device 104 may request an indication from the first user 110 regarding using a non-revoicing ASR system for transcribing a current and/or future communication session.

Other factors may also affect the accuracy of a transcription generated by the transcription system 120. For example, a difficulty of the audio to transcribe may affect the accuracy of the transcription. Alternately or additionally, other factors than those described in this disclosure may also affect the accuracy of a transcription generated by the transcription system 120. For example, a discussion of how ASR system models may affect accuracy of a transcription and other factors that may affect accuracy of a transcription is discussed in U.S. patent application Ser. No. 16/209,524 entitled "TRAINING OF SPEECH RECOGNITION SYSTEMS" filed on Dec. 4, 2018, which is incorporated herein by reference in its entirety.

In some embodiments, the difficulty of audio may be an indication of how difficult the audio may be for an ASR to generate a transcription of the audio and/or how difficult the audio may be for a human associated with the language in the audio to understand and/or comprehend.

In some embodiments, difficulty of audio may be determined based on one or more features regarding the devices participating in the communication session, the networks being used during the communication session, the ASR systems used during the communication session, outputs of the ASR systems used during the communication session, and features that may be used to estimate ASR accuracy, among other features regarding the audio. As an example, features that may be used to determine difficultly of audio are discussed in U.S. patent application Ser. No. 16/209,524. For example, Table 5 of U.S. patent application Ser. No. 16/209,524 describes various features that may be used to determine difficultly of audio.

In some embodiments, the difficulty of audio may be determined using a machine learning model trained to determine difficulty of audio. In these and other embodiments, the machine learning model may be trained by analyzing features of multiple audio files that have a classification regarding the difficulty of the audio in the audio files. The machine learning model may learn those features that are associated with each classification of audio difficulty. After training, the machine learning model may apply a difficulty classification to audio based on the features provided to the machine learning model.

In some embodiments, the determined difficulty of audio may be used to normalize an accuracy score. For example, an accuracy of 90% for a less difficult audio may be ranked below an accuracy of 85% for more difficult audio. Alternately or additionally, determined difficultly may be part of a report that is provided regarding accuracy to give context regarding the reported accuracy.

In some embodiments, in response to low accuracy, an indication regarding the low accuracy may be provided to systems within the environment 100. For example, an indication of low accuracy may be provided to system operations within the transcription system 120 along with other devices, such as the devices participating in the communication session.

In some embodiments, an initial transcription provided by the transcription system 120 may not be completely accurate. In these and other embodiments, one or more corrections may be made to the transcription. FIGS. 2-6 of the present disclosure, among others, describe various systems and methods that may be used to correct transcriptions generated by the transcription system 120. For example, in some embodiments, after providing a transcription, the transcription system 120 may determine a correction in the transcription and provide the correction to the first device 104. FIGS. 2 and 3a-3c may disclose how corrections are defined and/or how the corrections are presented on a device, such as the first device 104.

In addition to accuracy, various other factors may affect an experience of a user obtaining transcriptions from the transcription system 120. For example, a time difference between when a word from audio of a communication session is audible presented to a user and when the word is visually presented to the user may affect an experience of a user. The time difference between when a word from audio of a communication session is audible presented to a user and when the word is visually presented to the user may be referred to in this disclosure as latency of the transcription. FIGS. 21 and 22 of the present disclosure, among others, describe various systems and methods that may have an effect on latency.

Figure 20:
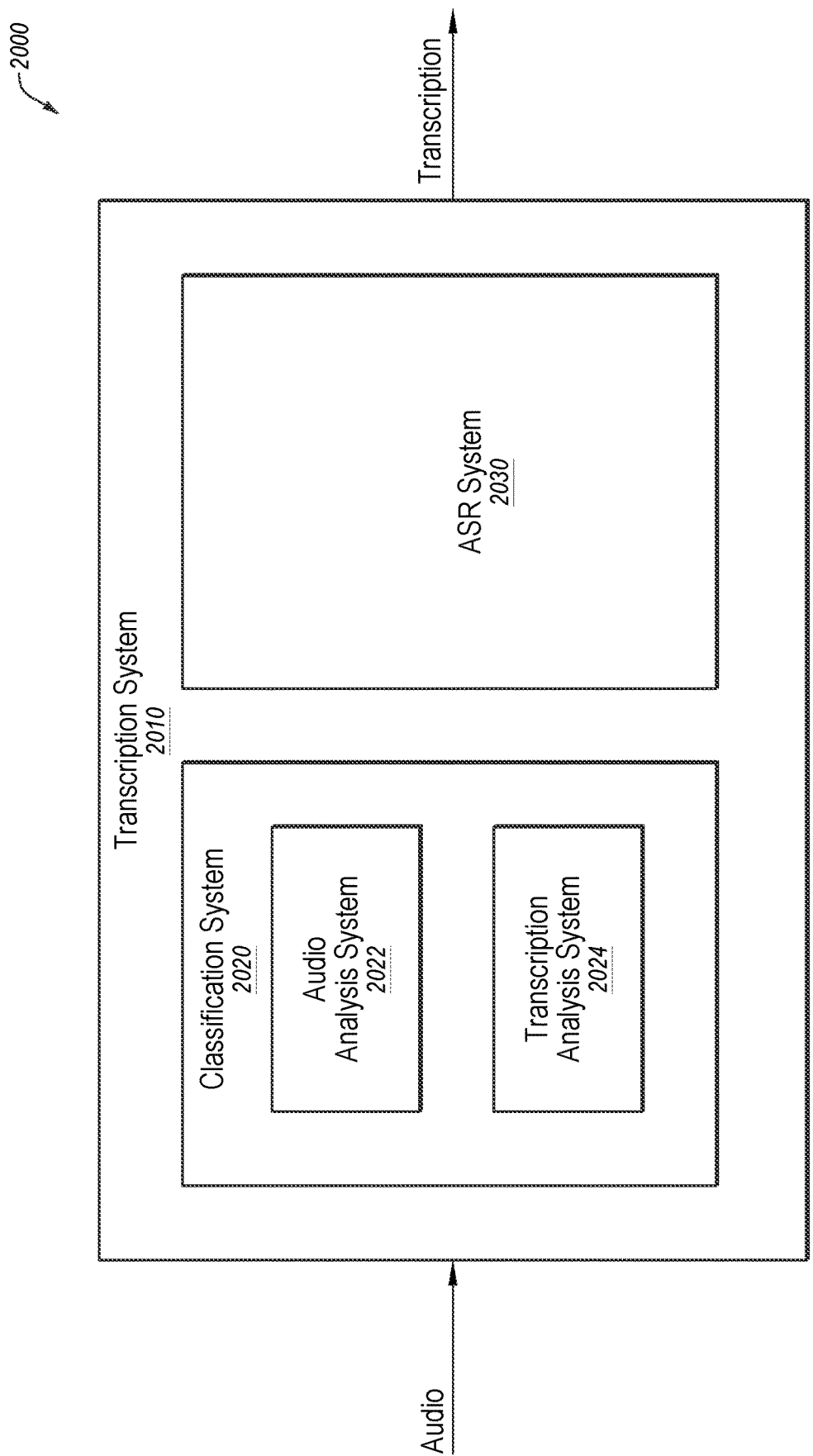
FIG. 20 illustrates an example environment for classifying audio.

Furthermore, in some embodiments, the transcription system 120 may be configured to detect audio that should not be transcribed. Detecting and not transcribing audio that should not be transcribed may make ASR systems available for transcriptions that would otherwise be transcribing audio not meant for transcriptions and thus may improve an experience of a user obtaining transcriptions from the transcription system 120. FIG. 20 of the present disclosure, among others, describe various systems and methods that may be used to detect audio that should not be transcribed.

With respect to the environment 100 of FIG. 1, any combination of the above embodiments and other embodiments may be implemented in the environment 100. For example, ASR systems in the transcription system 120 may be trained using systems and methods disclosed in FIGS. 7-12. The ASR systems may be used together as described in FIGS. 16-19. In these and other embodiments, one or more of the ASR systems may use revoiced audio from a CA that is evaluated as described in FIGS. 15 and 16. Alternately or additionally, one or more corrections with respect to the transcriptions generated by the ASR systems may be generated and presented as described in FIGS. 2-6. In these and other embodiments, the latency of the ASR systems may be adjusted as described in FIGS. 21 and 23.

Other embodiments may also be combined with the embodiments discussed in FIGS. 1-26. For example, in some embodiments, a device that is receiving transcriptions from the transcription system 120, such as the first device 104, may be configured to determine that the device is traveling in a vehicle. In these and other embodiments, the device may indicate to the transcription system 120 that the device is traveling in a vehicle. As a result, the transcription system 120 may stop sending transcriptions to the device. Alternately or additionally, the device may continue to receive transcriptions but may be configured to stop presenting the transcriptions. In these and other embodiments, the transcriptions may be available for review after the communication sessions or the device determines that the vehicle is no longer moving. Alternately or additionally, the transcription system 120 may be configured to change the ASR system that is provided transcriptions when the device is traveling in the vehicle. For example, the transcription system 120 may use an ASR system that does not provide transcriptions as fast as other ASR systems since the transcriptions may not be presented in real-time.

As another example, the transcription system 120 may be configured to identify between voices of multiple speakers from audio from a single device. For example, the transcription system 120 may be configured to obtain audio that originates at the second device 106 during a communication session between the first device 104 and the second device 106. The transcription system 120 may obtain the audio from the first device 104 and be configured to provide the transcription to the first device 104. In some embodiments, the transcription system 120 may also be configured to analyze the audio to determine a difference between different voices of multiple speakers in the audio. As a result, the transcription system 120 may be able to provide an indication of the origin of the audio that is being transcribe to the first device 104. For example, when a first speaker of the multiple speakers is speaking, the first device 104 may present an indication that the transcription corresponds to the first speaker. When a second speaker of the multiple speakers is speaking, the first device 104 may present an indication that the transcription corresponds to the second speaker.

In some embodiments, the transcription system 120 may be configured to not transcribe the audio from more than a single speaker. For example, in response to audio including voices from multiple speakers, the transcription system 120 may transcribe from a first speaker and ignore the audio from a second speaker. As a result, following the example from previous paragraph, the first device 104 would obtain the audio from the multiple speakers but a transcription of only the first speaker. In these and other embodiments, the transcription system 120 may determine the voice to transcribe based on the voice that first identified during the communication session. Alternately or additionally, the transcription system 120 may determine the voice to transcribe based on the voice that is present in the audio more than the other voices of the multiple voices. As such, the voice being transcribed may change during the communication session as the voice that is included more in the audio changes. Alternately or additionally, the transcription system 120 may determine the voice to transcribe based on a voice previously associated with the second device 106 as determined from previous communication sessions between the first device 104 and the second device 106.

In some embodiments, the audio may include multiples voices that occur in overlapping time periods. In these and other embodiments, the transcription system 120 may be configured to separate the voices in the audio. The transcription system 120 may generate a transcription for each of the voices in the audio. The transcription system 120 may provide the transcription for each of the voices to the first device 104 for presentation. Alternately or additionally, the transcription system 120 may generate a transcription for one of the separate voices and not others of the voices.

In some embodiments, a communication session may include more than just two devices. For example, a communication session may include the first device 104, the second device 106, and the third device 108. Alternately or additionally, a communication session may include any number of devices. In these and other embodiments, the transcription system 120 may be configured to obtain the audio of the communication session. The audio may include voices from the first user 110, the second user 112, and the third user 114. The transcription system 120 may obtain the audio from one of the first device 104, the second device 106, and the third device 108. Alternately or additionally, the transcription system 120 may obtain the audio from another system, such as a web-based system that is hosting the communication system or some other system that has access to the audio.

In some embodiments, the transcription system 120 may be configured to transcribe the voices of all of the speakers in the audio. In some embodiments, the transcription system 120 may be configured to identify the voices of the speakers such that the transcription may include an identifier for words spoken by a speaker. The identifier may include the name of the speaker. In these and other embodiments, the transcription system 120 may identify the voices based on an origin of the voice and/or identification of the separate voices participating in the communication session. Alternately or additionally, the transcription system 120 may be configured to translate the transcription to a different language than the language in the audio. In these and other embodiments, the transcription system 120 may use any of the embodiments described in or incorporated into this disclosure.

For example, in some embodiments, a device that obtains the transcriptions may be configured to send the transcriptions via another communication media. For example, the device may be configured to send the transcriptions via email, text, and/or social media, among other communication mediums. In these and other embodiments, sending the transcriptions may be automatic based on predefined rules established by a user of the device or by the device. Alternately or additionally, the transcriptions may be used by other programs of the device. For example, a personal assistant program on the device may use the transcription to set reminders and adjust calendar items, among functions.

As another example, the audio may not be from a communication system between devices. In these and other embodiments, the audio may originate from audio being broadcast over a television. For example, audio from a broadcast of a sporting event, political event, other event, news, movie, recorded audio or video, or some other program may be provided to the transcription system 120. In these and other embodiments, a broadcasting system may provide the audio to the transcription system 120. The transcription system 120 may be configured to generate the transcription and provide the transcription to broadcasting system. The broadcasting system may broadcast the audio for presentation with the broadcast by a remote device that receives the broadcast. In these and other embodiments, any combination of the features, systems, methods, and/or embodiments described in this disclosure may be used to generate the transcription.

Figure 2:
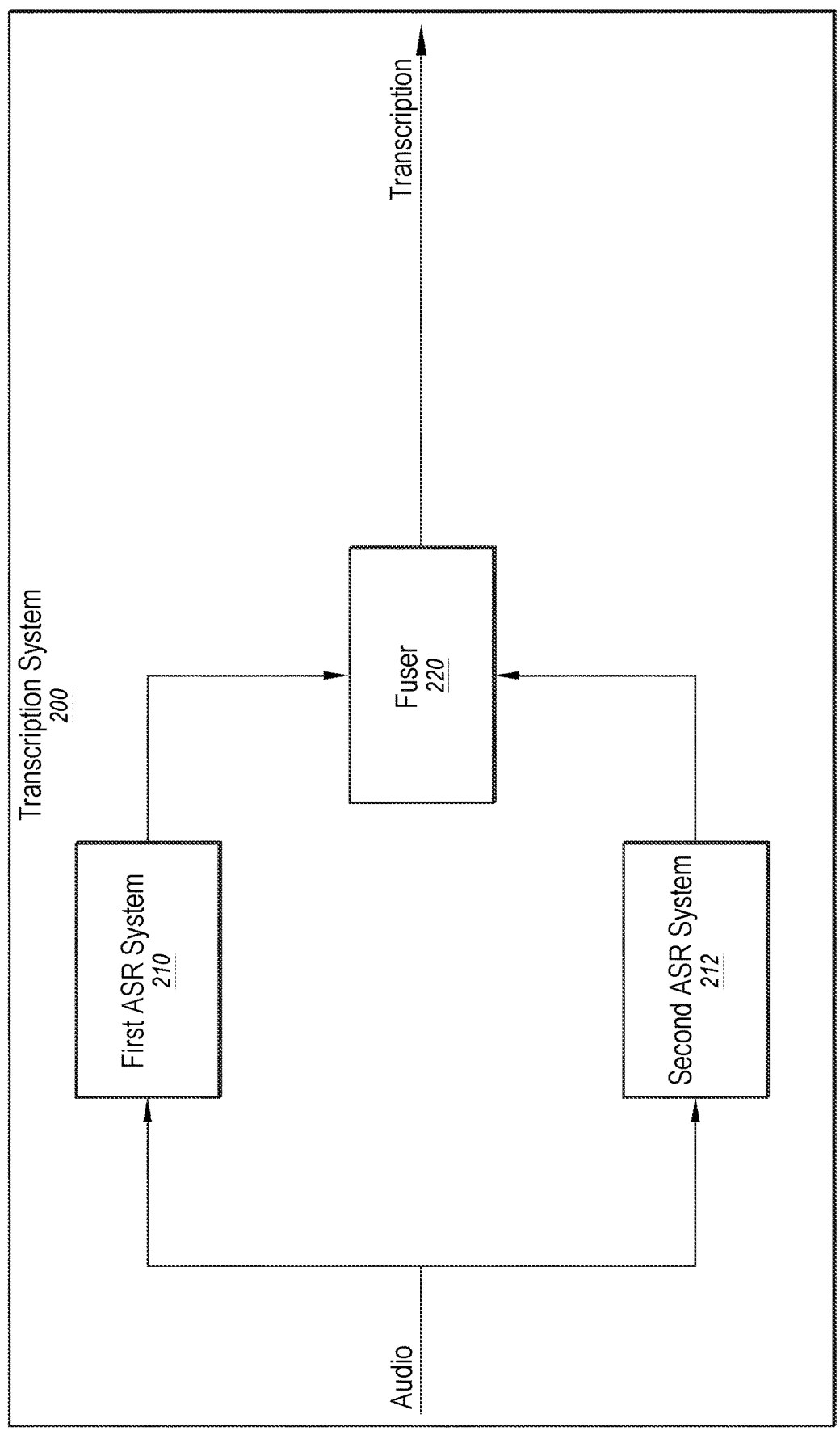
FIG. 2 illustrates an example environment for obtaining transcription corrections.

FIG. 2 illustrates an example transcription system 200 for obtaining transcription corrections. The transcription system 200 may be arranged in accordance with at least one embodiment described in the present disclosure. The transcription system 200 may include a first ASR system 210, a second ASR system 212, and a fuser system 220.

The first ASR system 210 may be an example of an ASR system described with respect to FIG. 1, thus no further explanation is provided with respect to FIG. 2. The second ASR system 212 may also be an example of an ASR system described with respect to FIG. 1, thus no further explanation is provided with respect to FIG. 2. In some embodiments, the first ASR system 210 may be configured to obtain audio and generate a first transcription. The first transcription may be provided to the fuser system 220. The second ASR system 212 may be configured to obtain the audio and generate a second transcription. The second transcription may be provided to the fuser system 220. The audio may be any type of audio. For example, the audio may be part of a communication session between two devices as discussed with respect to FIG. 1.

In some embodiments, the first transcription and/or the second transcription, referred to together with respect to FIG. 2 as "the transcriptions," may include text strings. For example, the audio used to generate the transcriptions may include multiple phrase, sentences, and other portions of speech. In these and other embodiments, the transcriptions may include text strings that may correspond to the different portions of speech of the audio. In these and other embodiments, as the first ASR system 210 and the second ASR system 212 generate the transcriptions for each of the portions of speech, the first ASR system 210 and the second ASR system 212 may generate partial text strings before generating finalized text strings. The partial text strings may represent an initial interpretation of the audio. Alternately or additionally, the partial text strings may represent a section of the portion of speech. For example, a partial text string may represent multiple words at the beginning of a sentence. In these and other embodiments, the first ASR system 210 and the second ASR system 212 may be configured to generate the partial text strings after receiving a section of a portion of speech and before receiving the entirety of the portion of speech. After receiving the entirety of the portion of speech, the first ASR system 210 and the second ASR system 212 may generate finalized text strings for the portion of speech. In these and other embodiments, multiple partial text strings may be generated for a portion of speech before the final text string is generated. In these and other embodiments, the partial text strings may increase in word count as more of the portion of speech is received by the first ASR system 210 and the second ASR system 212. In some embodiments, the words may not remain constant among the partial text strings generated by the same ASR system. For example, a first word at a first location may be included in a first text string and a second word at the first location may be included in a second text string that is generated after the first text string. In these and other embodiments, the first word may be different from the second word. After a text string is finalized, the finalized text string may not be changed by an ASR system. The ASR system may maintain the finalized text string for the portion of speech.

FIG. 3A illustrates example text strings, including a first text string 302 and a second text string 304. The first text string 302 and the second text string 304 may be arranged accordingly to some of the embodiments described in this disclosure.

As illustrated, the first text string 302 may include the word "hog" in a fourth word location. In these and other embodiments, the first text string 302 may be generated by an ASR system before the second text string 304 is generated. As illustrated, the second text string 304 may include the word "dog" in the fourth word location. In this example, the word "hog" may be an incorrect transcription of the speech. The speech may include the word "dog" in the fourth word location and not the word "hog." In this example, the first text string 302 may be directed to a device and presented by the device. As such, the incorrect word "hog" may have been presented by the device to a user. In some embodiments, to correct the word "hog," a replacement word, such as the correct word "dog" may be provided to the device as a correction for the word "hog."

Returning to the discussion of FIG. 2, the fuser system 220 may be configured to obtain the first transcription and the second transcription. The fuser system 220 may be configured to fuse the first transcription and the second transcription to generate a fused transcription. To fuse the first transcription and the second transcription, the fuser system 220 may be configured to align a first text string of the first transcription that corresponds to a second text string of the second transcription. After aligning the first and second text strings, the fuser system 220 may select a word from one of the first and second text strings for each of the word locations in the first and second text strings to include in the fused transcription. More discussion regarding how the fuser system 220 selects between words from the first and second text strings is discussed with respect to FIGS. 16-19.

In some embodiments, a word selected by the fuser system 220 for the fused transcription may change. For example, a word location may include a first word that is directed to a device. Subsequently, the fuser system 220 may select a second word for the word location. In response to determining that the second word is different from the first word at the word location, the fuser system 220 may be configured to make a determination regarding selecting the second word as a replacement word and make a determination regarding directing the replacement word to the device to replace the first word in the word location.

The fuser system 220 may be configured to select the second word as a replacement word based on a comparison of a first accuracy score of the first word and a second accuracy score of the second word. An accuracy score of a word may be based on any factor used to determine an accuracy of a word as described in this disclosure. For example, an accuracy score may be a confidence score assigned to a word by an ASR system. Alternately or additionally, the accuracy score may be based on one or more of the following alone or in any combination: an accuracy percentage, error rates, error rate percentages, confidence, likelihood, likelihood ratio, log likelihood ratio, word score, phrase score, probability of an error, word probability, quality, and various other metrics with respect to a word, a phrase, or a transcription.

In some embodiments, the fuser system 220 may be configured to select the second word as a replacement word based on a difference between the second accuracy score and the first accuracy score satisfying an accuracy score threshold. The accuracy score threshold may be greater than zero. Thus, the second accuracy score being larger than the first accuracy score may not indicate that the second word is selected as a replacement word. For example, the accuracy score threshold may be selected such that an expected benefit of sending the correction is equal to or greater than a cost for a user to re-read and process the correction to a transcription. In some embodiments, the accuracy score threshold may be determined based on one or more factors. The factors may include which ASR system generated the first word and the second word; information about a user of the device that receives the transcription, such as age, gender, cognitive abilities, education, and reading skills, among other information of the user; and factors used to determine the accuracy scores, among other factors. It should be noted that in some embodiments, a replacement word may result in replacing an incorrect word with a correct word or may result in replacing a correct word with an incorrect word.

An example of an accuracy score threshold may be zero, where the replacement word may be sent if the second accuracy score is larger than the first accuracy score. In another example, the accuracy score threshold may be 1%, 2%, 5%, 10%, or 20% or some other percentage between 1% and 20% or some greater percentage. In another example, in a first trial, one or more sets of questions presented to test subjects may measure the impact of a correction on the subjects' comprehension (the ability to understand what was read and/or heard) and/or recall (the ability to remember what was read and/or heard) on at least a portion of a conversation. In a second trial, a similar quiz may be used to measure the impact of word errors on the subjects' comprehension and/or recall. The accuracy score threshold may be set to a value such that the average impact of a correction, as measured in the first trial, equals the accuracy score threshold multiplied by the average impact of a word error, as measured in the second trial.

As an example, transcriptions may be presented to test subjects and it may be determined that a 5% correction rate lowers comprehension by 0.2%, aside from any effect corrections may have on error rate. Transcriptions may also be presented with varying error rates to test subjects. In these and other embodiments, it may be determined that an additional 5% in word error rate lowers comprehension by 10%. In these and other embodiments, the accuracy score threshold t may be set so that the expected impact of the correction (0.2% impact per 5% corrections) equals the expected impact of the difference in error rate (10% impact per 5% errors) multiplied by the accuracy score threshold. Mathematically, $(0.2\%/5\%)=(10\%/5\%)*t$, so that $t=0.2/10=2\%$. In this example, if the replacement word is at least 2% more likely to be correct than the word in the original transcription, the replacement word may be sent. Alternately or additionally, transcriptions may be presented to test subjects using a variety of thresholds. In these and other embodiments, a threshold may be selected that increases comprehension, recall, results on a satisfaction survey, user ratings, and/or other forms of feedback or measures of user experience. Alternately or additionally, a user interface may obtain input from a user to select an accuracy score threshold or provide input such as choosing "more corrections" or "fewer corrections" that may be used to adjust the accuracy score threshold selection.

In some embodiments, in response to the accuracy score threshold being based on which ASR system generates the first word and the second word, the accuracy score threshold may vary. For example, the accuracy score threshold for the first word and the second word may be larger when the first word and the second word are generated by different ASR systems. In these and other embodiments, the accuracy score threshold for the first word and the second word may be smaller when the first word is generated by the same ASR system.

In some embodiments, the fuser system 220 may be configured to select the second word as a replacement word based on a significance score of the first word and/or the second word. For example, the significance score may indicate an effect the second word may have on a meaning of the transcription that includes the second word. For example, if the second word is "the," the second word may not have a large effect on the meaning of a sentence. For example, a sentence of "I'll pay you a fifteen dollars" and a sentence of "I'll pay you the fifteen dollars," the change of the word "a" to the word "the" does not change the meaning of the sentence. As such, the effect of the word "the" on the meaning of the sentence is low. In contrast, a sentence of "I'll pay you fifteen dollars" and a sentence of "I'll pay you fifty dollars," the change of the word "fifteen" to the word "fifty" changes the meaning of the sentence. As such, the effect of the word "fifty" on the meaning of the sentence is high. Alternately or additionally, the decision to select the second word as a replacement word may be based on a combined significance score of the first word and second word, such as the sum or maximum of the significance score for the first word and the significance score for the second word.

A significance value of a word may be determined using one or more methods. For example, every word in a language may be assigned a significance value. Alternately or additionally, a significance value of a word may be based on a word frequency that indicates how often the word appears in transcriptions. In these and other embodiments, a word frequency may be transformed into a significance value with a mathematical transformation such as significance value=1/p, where p is the probability that the word matches a word randomly selected from a block of text. For example, if, out of a collection of text gathered from various sources, the word "the" constitutes 5% of the total number of words and "study" appears only 0.05% of the time, then the significance of "the" may be 1/0.05=20 and the significance of "study" may be 1/0.0005=2000. Thus, study may have a higher significance score. In these and other embodiments, the significance value may equal=log(1/p) or some other mathematical adjustment.

As another example, the significance value of a word may be based on the significance value assigned to a class of words that include the word. For example, words may be broken into classes such as articles, pronouns, nouns, negations, numbers, verbs, etc. Each of the classes may be given a value and each word in the class may be assigned the corresponding value. As an example, the article class may have a low value and the negation class may have a higher value. As another example, a conditional probability or likelihood score of a language model for a particular word in context of surrounding words may be used as the significance value.

In some embodiments, the fuser system 220 may be configured to select the second word as a replacement word based on a significance score of the first word, a significance score of the second word, a combined significance score (such as sum, difference, absolute difference, average, or maximum) of both words, or a score that reflects the magnitude of the change in meaning, satisfying a significance threshold. The significance threshold may be selected to avoid sending words that may have less of an effect on a meaning of the transcription, such as words that are articles. The significance threshold may be selected based on factors such as those used to select the accuracy score threshold.

In some embodiments, the fuser system 220 may be configured to select the second word as a replacement word based on a significance score of the first and/or second word satisfying a significance threshold and based on a difference between the second accuracy score and the first accuracy score satisfying the accuracy score threshold. Alternately or additionally, the significance score and the accuracy score of the second word may be mathematically combined. In these and other embodiments, the determination to select the second word as the replacement word may be based on the combined significance score and the accuracy score of the second word being compared to a threshold. Alternately or additionally, the determination to select the second word as the replacement word may be based on a difference between a combined significance score and the accuracy score of the second word and a combined significance score and an accuracy score of the first word being compared to a threshold.

In some embodiments, the fuser system 220 may select the second word as a replacement word. In response to selecting the second word as a replacement word, the fuser system 220 may send the second word to a device to replace the first word. In these and other embodiments, the fuser system 220 may also send additional words that may not have qualified as replacement words, with the second word. For example, a third word may not be selected as a replacement word based on a significance score and/or an accuracy score of the third word. In these and other embodiments, the third word may have an accuracy score that is greater than a fourth word in a same location as the third word. However, the difference between the accuracy score of the third word and the accuracy score of the fourth word may not satisfy the accuracy score threshold. In these and other embodiments, in response to the fuser system 220 sending the second word as a replacement word, the fuser system 220 may send the third word. In these and other embodiments, the fuser system 220 may send other words that may have accuracy scores higher than accuracy scores of corresponding words where the difference does not satisfy the accuracy score threshold.

In some embodiments, the fuser system 220 may also be configured to send words as replacement words that may have accuracy scores higher than accuracy scores of corresponding words where the difference does not satisfy the accuracy score threshold in response to a number of the words being larger than a threshold. For example, if the threshold is two and there are three words that meet the criteria of accuracy scores higher than accuracy scores of corresponding words where the difference does not satisfy the accuracy score threshold, the fuser system 220 may send all three words as replacement words. In these and other embodiments, the fuser system 220 may be configured to send the words as replacement words that may have accuracy scores higher than accuracy scores of corresponding words where the difference does not satisfy the accuracy score threshold in response to a number of the words being larger than a threshold and the number of words occurring within a particular interval. The particular interval may be 5, 10, 15, or 20 seconds, a number of words (including words that are not candidates for replacement), a length of a sentence that includes the words, the words being included in the same sentence, within a same paragraph, or some other interval.

In some embodiments, the fuser system 220 may not send the second word in response to just the selection of the replacement word. In these and other embodiments, the fuser system 220 may send the second word as a replacement word in response the selection of the second word as a replacement word and in response to one or more factors.

For example, the fuser system 220 may consider a time lapse from sending a previous replacement word. In these and other embodiments, in response to a time interval from sending a previous replacement word satisfying a time threshold, the fuser system 220 may send the second word as the replacement word. For example, if the time threshold is three seconds and a previous replacement word was sent one second ago, the fuser system 220 may not send the second word as a replacement word until after three seconds has occurred since sending the previous replacement word. The time threshold may be selected based on studies that may indicate how often words may be replaced in a transcription without annoying a user and/or degrading or substantially degrading an ability of a user to comprehend the transcription.

As another example, the fuser system 220 may consider how many replacement words are to be sent. In these and other embodiments, in response to a number of replacement words satisfying a word count threshold, the fuser system 220 may send the second word as a replacement word. For example, if the word count threshold is three, the fuser system 220 may not send the second word as a replacement word until three replacement words have been identified. The word count threshold may be selected based on studies that may indicate how replacing words in a group in a transcription annoys a user and/or degrades or substantially degrades an ability of a user to comprehend the transcription. In these and other embodiments, the word count threshold may be considered in addition to a time difference threshold. In these and other embodiments, a number of replacement words being accumulated within a time difference threshold may be sent to a device.

Modifications, additions, or omissions may be made to the transcription system 200 without departing from the scope of the present disclosure. For example, in some embodiments, the transcription system 200 may not include the fuser system 220. In these and other embodiments, a correction system may compare the outputs of the first ASR system 210 and the second ASR system 212. The correction system may determine replacement words in a manner analogous to the fuser system 220.

As another example, the transcription system 200 may not include the fuser system 220 and the second ASR system 212. In these and other embodiments, the transcription system 200 may include a correction system. The correction system may look for changes in words in the same location with respect to two partial text strings and/or with respect to a partial text string and a final text string. In these and other embodiments, the correction system may select replacement words in a manner analogous to the fuser system 220.

As another example, in some embodiments, the transcription system 200 may obtain audio from a device and provide the audio to the first ASR system 210. In these and other embodiments, the first ASR system 210 may be remote from the second ASR system 212. The first ASR system 210 may generate a first transcription and provide the first transcription to the device. The device may send the first transcription and the audio to the second ASR system 212 and a correction system. The second ASR system 212 may generate a second transcription. The correction system may compare the first transcription and the second transcription and determine replacement words as discussed with respect to FIG. 2. Alternately or additionally, the second ASR system 212 and the correction system may be part of the device. In these and other embodiments, the correction system may determine replacement words.

FIGS. 3B and 3C illustrate an example presentation of transcriptions on a device. The example presentation may be arranged in accordance with at least one embodiment described in the present disclosure. FIG. 3B illustrates a display 310b with first words at a first time. FIG. 3C illustrates the display 310b with second words at a second time that is subsequent to the first time. The display 310b at the first time and at the second time may be the same display with a different configuration of words. The display 310b may be part of a device, such as part of the first device 104 of FIG. 1.

The display 310b at the first time in FIG. 3B may be presenting a first text string. The first text string may include the word "hog," which may be an error word. The display 310b at the second time in FIG. 3C may be presenting a second text string. The second text string may include a replacement word "dog" that replaces the word "hog." The replacement word may be a correction of the word "hog" in the first text string. As illustrated, the display 310b in FIG. 3C may provide an indication of the correction. The indication may be by underlining; highlighting; bolding; and/or font size, color, or type change; among other indications.

In some embodiments, a replacement word may change a number of characters presented on a line. If the number of characters change such that the total number of characters is too many for a line, one or more words on the line may shift to a subsequent line. The shifting of words may cause a cascading effect that may affect multiple lines. To help to prevent shifting of words between lines when a replacement word is presented, a device may adjust how the words are presented on a display. For example, in some embodiments, in response to one or more words on the line shifting to a subsequent line, a device may create a new line for the one or more words.

As another example, to help to prevent shifting of words between lines when a replacement word is presented, the device may be configured to decrease the font size of the text on the line so that no words shift to a subsequent line.

As another example, to help to prevent shifting of words between lines when a replacement word is presented, the device may be configured to leave extra spaces at the end of each line so that there is room for some expansion for replacement words.

As another example, to help to prevent shifting of words between lines when a replacement word is presented when the replacement words results in fewer characters in a line, the words from the subsequent line may not be shifted up onto the line. For example, when a word is replaced with a shorter word, space may be added after the shorter word so that other words on the same line remain in place. In another example, when one or more words are replaced with one or more words that occupy less space, space may be added to the end of the line.

In some embodiments, the device may use any combination of the above examples to adjust how the words are presented on a display to help to prevent shifting of words between lines when a replacement word is presented. Modifications, additions, or omissions may be made to FIGS. 3b and 3c without departing from the scope of the present disclosure.

Figure 4A:
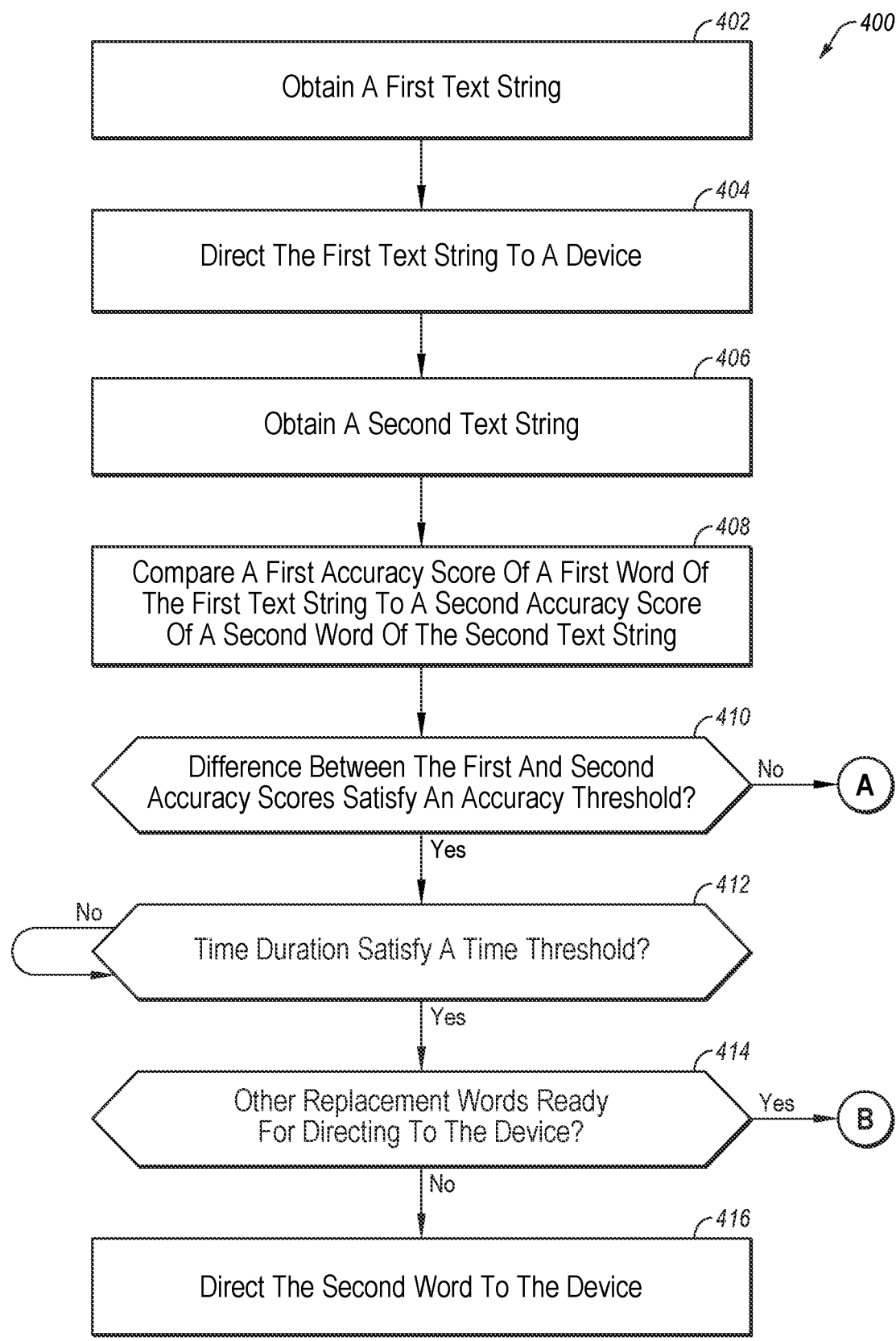
FIGS. 4A and 4B illustrate a flowchart of an example method to correct transcriptions.
Figure 4B:
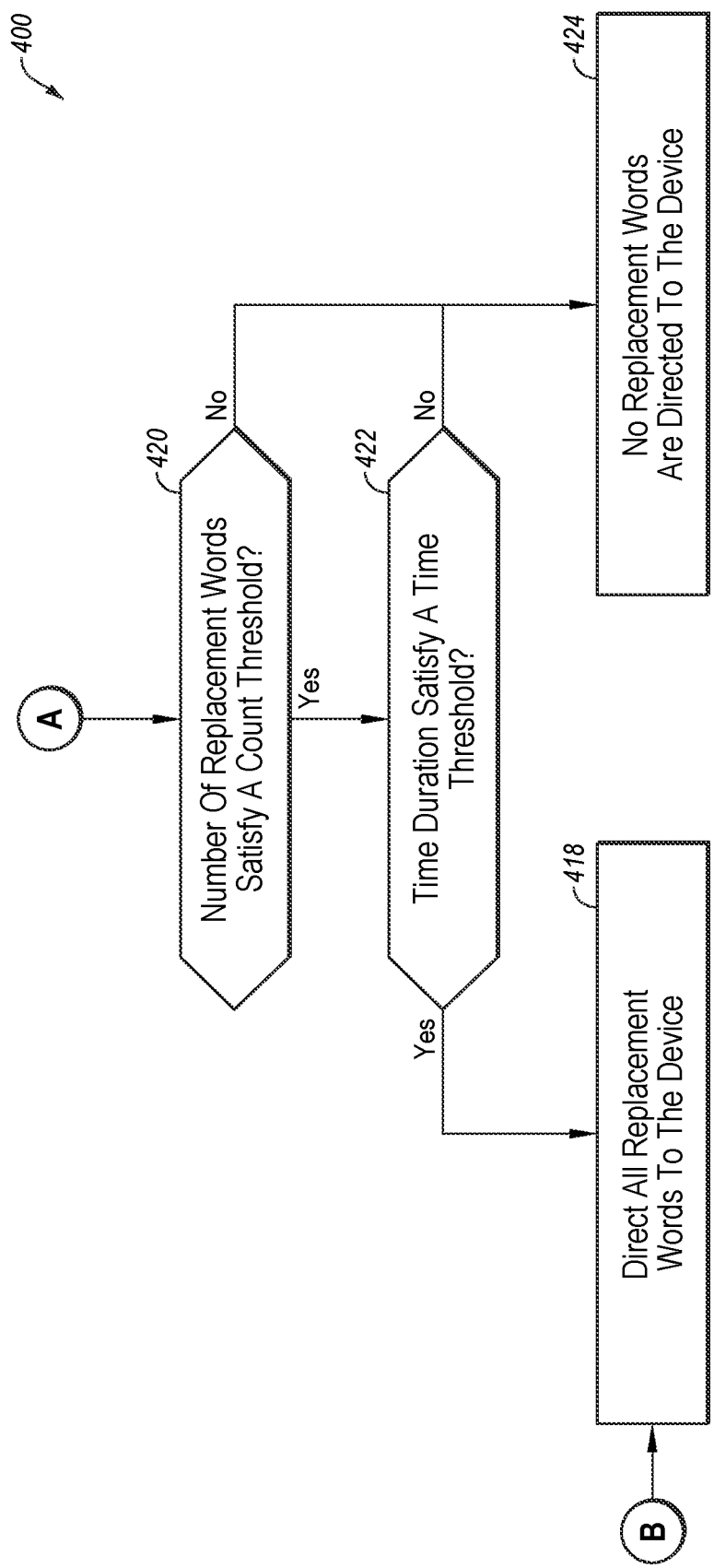

FIGS. 4A and 4B illustrate a flowchart of an example method 400 to correct transcriptions. The method 400 may be arranged in accordance with at least one embodiment described in the present disclosure. One or more operations of the method 400 may be performed, in some embodiments, by a device or system, such as the transcription system 120 and/or the transcription system 200 of FIGS. 1 and 2 or another device or combination of devices. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a first text string may be obtained. In some embodiments, the first text string may be a transcription of a portion of audio. The audio may be part of a communication session between a device and a remote device. In some embodiments, a first ASR system may generate the first text string.

At block 404, the first text string may be directed to the device. The first text string may be directed to the device for presentation of the first text string on the device. In some embodiments, the first text string may be presented in real-time or substantially real-time during the communication session in connection with the portion of the audio. In these and other embodiments, the presentation of the first text string may be delayed with respect to the presentation of the portion of the audio.

At block 406, a second text string may be obtained. In some embodiments, the second text string may be a transcription of the portion of the audio. In these and other embodiments, the second text string may be generated by a second ASR system that is different from the first ASR system. Alternately or additionally, the first and second text string may be generated by the same ASR system. In some embodiments, the first text string may include a first word at a location. In these and other embodiments, the second text string may include a second word at a location that may correspond to a location of the first word in the first text string. In these and other embodiments, a first accuracy score of the first word may be obtained and a second accuracy score of the second word may be obtained. At block 408, a first accuracy score of a first word may be compared to a second accuracy score of a second word.

At block 410, it may be determined if a difference between the first accuracy score and the second accuracy score satisfies an accuracy threshold. In response to the difference between the first accuracy score and the second accuracy score satisfying the accuracy threshold, it may be determined that the second word is a replacement word for the first word. In these and other embodiments, the method 400 may proceed to block 412. In response to the difference between the first accuracy score and the second accuracy score not satisfying the accuracy threshold, it may be determined if the second accuracy score is higher than the first accuracy score. In response to the second accuracy score being higher than the first accuracy score, it may be determined that the second word is a replacement word for the first word and the method 400 may proceed to block 420. In response to the second accuracy score not being higher than the first accuracy score, it may be determined that the second word is not a replacement word for the first word and the method 400 may end.

At block 412, it may be determined if a time duration since directing a previous replacement word to the device satisfies a time threshold. In response to the time duration satisfying the time threshold, the method 400 may proceed to block 414. In response to the time duration not satisfying the time threshold, the method 400 may return to block 412 until the time duration satisfies the time threshold.

At block 414, it may be determined if other replacement words are ready for directing to the device. In response to other replacement words being ready to direct to the device, the method 400 may proceed to block 418. At block 418, all replacement words may be directed to the device. In response to other replacement words not being ready to direct to the device, the method 400 may proceed to block 416. At block 416, the second word may be directed to the device.

At block 420, it may be determined if a number of replacement words not yet directed to the device satisfies a count threshold. In response to the number of replacement words not yet directed to the device satisfying the count threshold, the method 400 may proceed to block 422. In response to the number of replacement words not yet directed to the device not satisfying the count threshold, the method 400 may proceed to block 424. At block 424, no replacement words may be directed to the device.

At block 422, it may be determined if a time duration since directing a previous replacement word to the device satisfies a time threshold. In response to the time duration satisfying the time threshold, the method 400 may proceed to block 418. At block 418, all replacement words may be directed to the device. In response to the time duration not satisfying the time threshold, the method 400 may proceed to block 424. Alternately or additionally, in response to the time duration not satisfying the time threshold, the method 400 may return to block 422 until the time duration satisfies the time threshold.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may not include the block 412 and/or the block 422. In these and other embodiments, the replacement words may be sent regardless of a time since a previous replacement word was sent. As another example, the method 400 may not include the block 412, the block 416, and the block 418. Rather, in these and other embodiments, in response to the difference between the first accuracy score and the second accuracy score satisfying the accuracy threshold, the replacement word may be sent. As another example, the method 400 may not include the blocks 420, 422, and 424.

Figure 5:
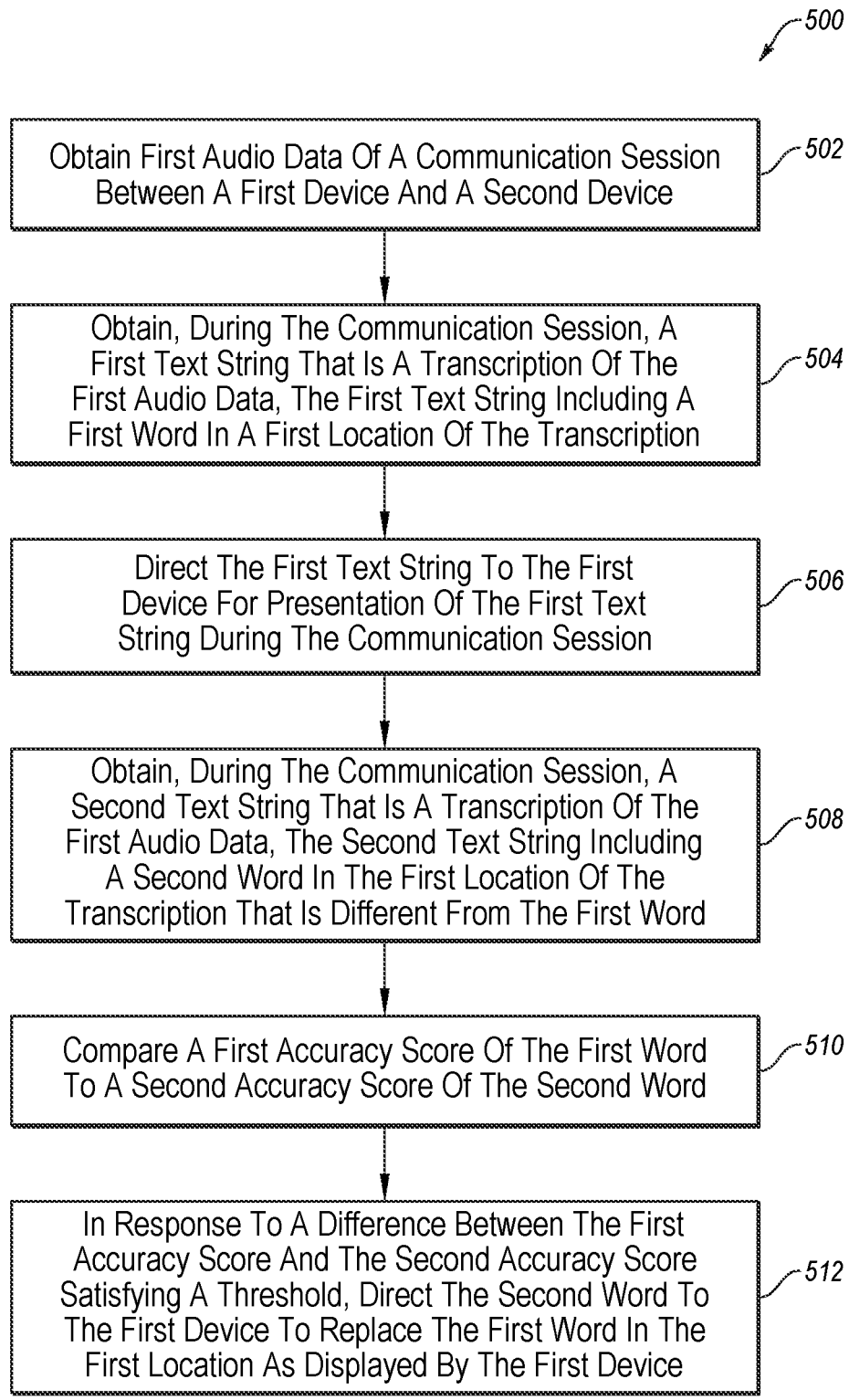
FIG. 5 illustrates a flowchart of another example method to correct transcriptions.

FIG. 5 illustrates a flowchart of an example method 500 to correct transcriptions. The method 500 may be arranged in accordance with at least one embodiment described in the present disclosure. One or more operations of the method 500 may be performed, in some embodiments, by a device or system, such as the transcription system 120 and/or the transcription system 200 of FIGS. 1 and 2 or another device or combination of devices. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where first audio data of a communication session between a first device and a second device may be obtained. At block 504, a first text string may be obtained during the communication session that is a transcription of the first audio data. In some embodiments, the first text string may include a first word in a first location of the transcription.

At block 506, the first text string may be directed to the first device for presentation of the first text string during the communication session. At block 508, a second text string may be obtained during the communication session that is a transcription of the first audio data. In some embodiments, the second text string may include a second word in the first location of the transcription that is different from the first word.

In some embodiments, the first text string is obtained from a first automatic transcription system and the second text string is obtained from a second automatic transcription system that is different than the first automatic transcription system. Alternately or additionally, both the first text string and the second text string are partial text strings that are not finalized text strings as generated by automatic transcription systems. Alternately or additionally, the first text string may be a partial ASR result and the second text string may be a final ASR result. In these and other embodiments, the first text string and the second may be generated by the same automatic transcription system.

At block 510, a first accuracy score of the first word may be compared to a second accuracy score of the second word. At block 512 in response to a difference between the first accuracy score and the second accuracy score satisfying a threshold, the second word may be directed to the first device to replace the first word in the first location as displayed by the first device.

In some embodiments, in response to the difference between the first accuracy score and the second accuracy score satisfying the threshold, one or more words of the first text string may not be replaced by one or more words of the second text string. Alternately or additionally, the threshold may be adjusted in response to the second word being generated by a second automatic transcription system that is different than a first automatic transcription system that generates the first word.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include obtaining an indication of a time lapse from when a second previous word is directed to the first device to replace a first previous word. In some embodiments, the second word may be directed to the first device to replace the first word in the first location in further response to the time lapse satisfying a time threshold.

As another example, the method 500 may further include obtaining, during the communication session, a third text string that is a transcription of the first audio data. In some embodiments, the third text string may include a third word in a second location of the transcription. The method 500 may further include directing the third text string to the first device for presentation of the third text string during the communication session and obtaining, during the communication session, a fourth text string that is a transcription of the first audio data. In some embodiments, the fourth text string may include a fourth word in the second location of the transcription that is different from the third word. The method 500 may also include comparing a third accuracy score of the third word to a fourth accuracy score of the fourth word and in response to the fourth accuracy score being greater than the third accuracy score and a difference between the third accuracy score and the fourth accuracy score not satisfying the threshold, determining to maintain the third word in the second location as displayed by the first device instead of directing the fourth word to the first device to replace the third word in the second location as displayed by the first device in response to the fourth accuracy score being greater than the third accuracy score and a difference between the third accuracy score and the fourth accuracy score satisfying the threshold.

As another example, the method 500 may further include obtaining a first content score of the first word. In some embodiments, the first content score may indicate an effect of the first word on a meaning of the transcription. The method 500 may further include obtaining a second content score of the second word. In some embodiments, the second content score may indicate an effect of the second word on the meaning of the transcription. In some embodiments, the second word may be directed to the first device to replace the first word in the first location in further response to a difference between the first content score and the second content score satisfying a content threshold.

As another example, the method 500 may further include in response to the difference between the first accuracy score and the second accuracy score satisfying the threshold, directing a third word to the first device to replace a fourth word in a second location in the transcription as displayed by the first device. In some embodiments, a difference between a fourth accuracy score of the fourth word and a third accuracy score of the third word may not satisfy the threshold. Alternately or additionally, the second location may be before the first location in the transcription.

Figure 6:
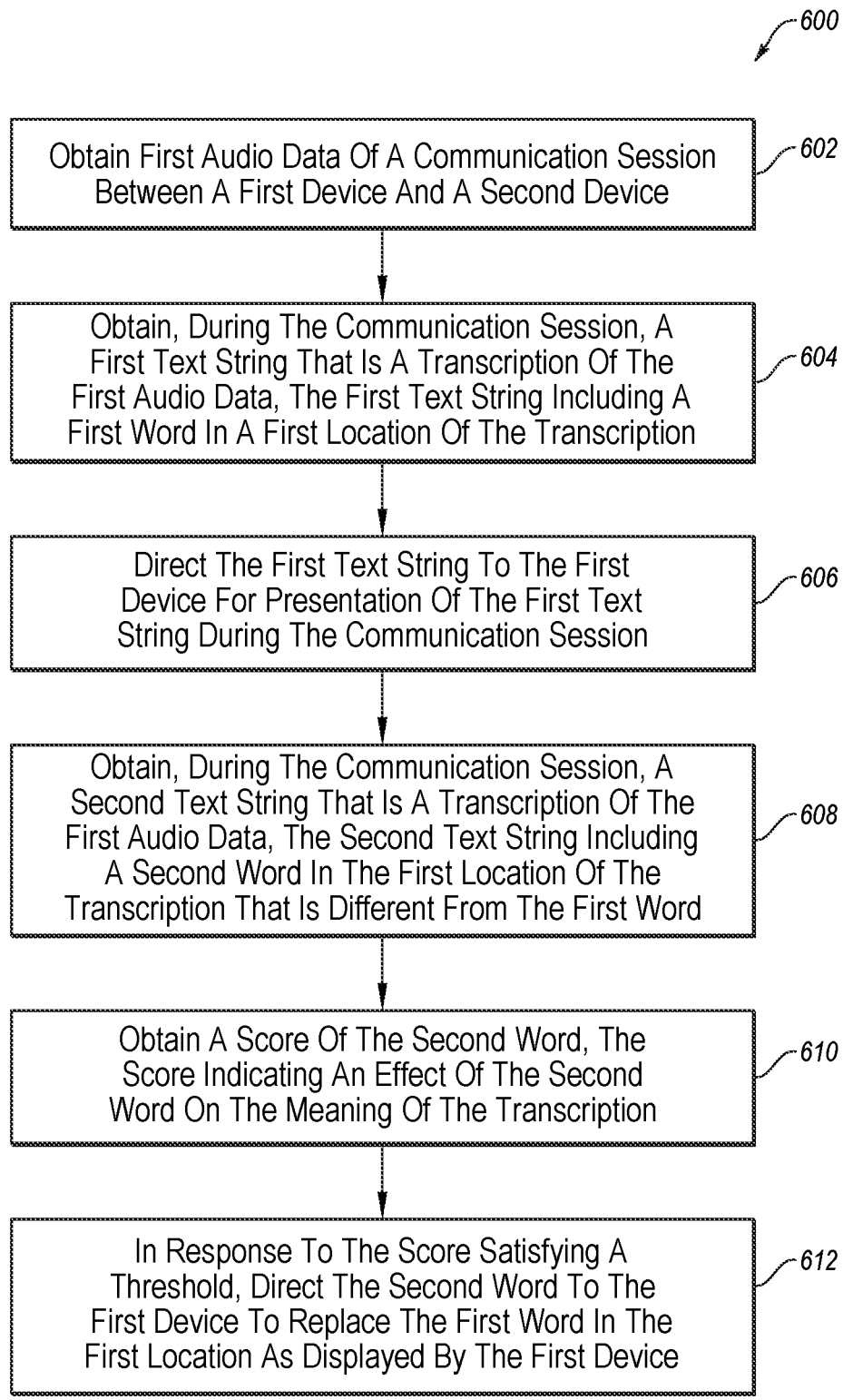
FIG. 6 illustrates a flowchart of another example method to correct transcriptions.

FIG. 6 illustrates a flowchart of an example method 600 to correct transcriptions. The method 600 may be arranged in accordance with at least one embodiment described in the present disclosure. One or more operations of the method 600 may be performed, in some embodiments, by a device or system, such as the transcription system 120 and/or the transcription system 200 of FIGS. 1 and 2 or another device or combination of devices. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where first audio data of a communication session between a first device and a second device may be obtained. At block 604, a first text string may be obtained during the communication session that is a transcription of the first audio data. In some embodiments, the first text string may include a first word in a first location of the transcription.

At block 606, the first text string may be directed to the first device for presentation of the first text string during the communication session. At block 608, a second text string may be obtained during the communication session that is a transcription of the first audio data. In some embodiments, the second text string may include a second word in the first location of the transcription that is different from the first word. In some embodiments, first text string may be obtained from a first automatic transcription system and the second text string may be obtained from a second automatic transcription system that is different than the first automatic transcription system.

At block 610, a score of the second word may be obtained. In some embodiments, the score may indicate an effect of the second word on the meaning of the transcription. At block 612, in response to the second score satisfying a threshold, the second word may be directed to the first device to replace the first word in the first location as displayed by the first device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may further include in response to the score satisfying a threshold, directing a third word to the first device to replace a fourth word in a second location in the transcription as displayed by the first device. In these and other embodiments, a score of the fourth word, which indicates an effect of the fourth word on a meaning of the transcription, may not satisfy the threshold.

In some embodiments, the method 600 may further include obtaining a first accuracy score of the first word and obtaining a second accuracy score of the second word. In these and other embodiments, the second word may be directed to the first device to replace the first word in the first location in further response to a sum of the first accuracy score and the second accuracy score satisfying an accuracy threshold.

In some embodiments, the method 600 may further include obtaining a first score of the first word. In these and other embodiments, the second word may be directed to the first device to replace the first word in the first location as displayed by the first device in response to either the first score satisfying a first threshold or the score satisfying the threshold. Alternately or additionally, the second word may be directed to the first device to replace the first word in the first location as displayed by the first device in response to the first score satisfying a first threshold and the score satisfying the threshold.

Figure 7:
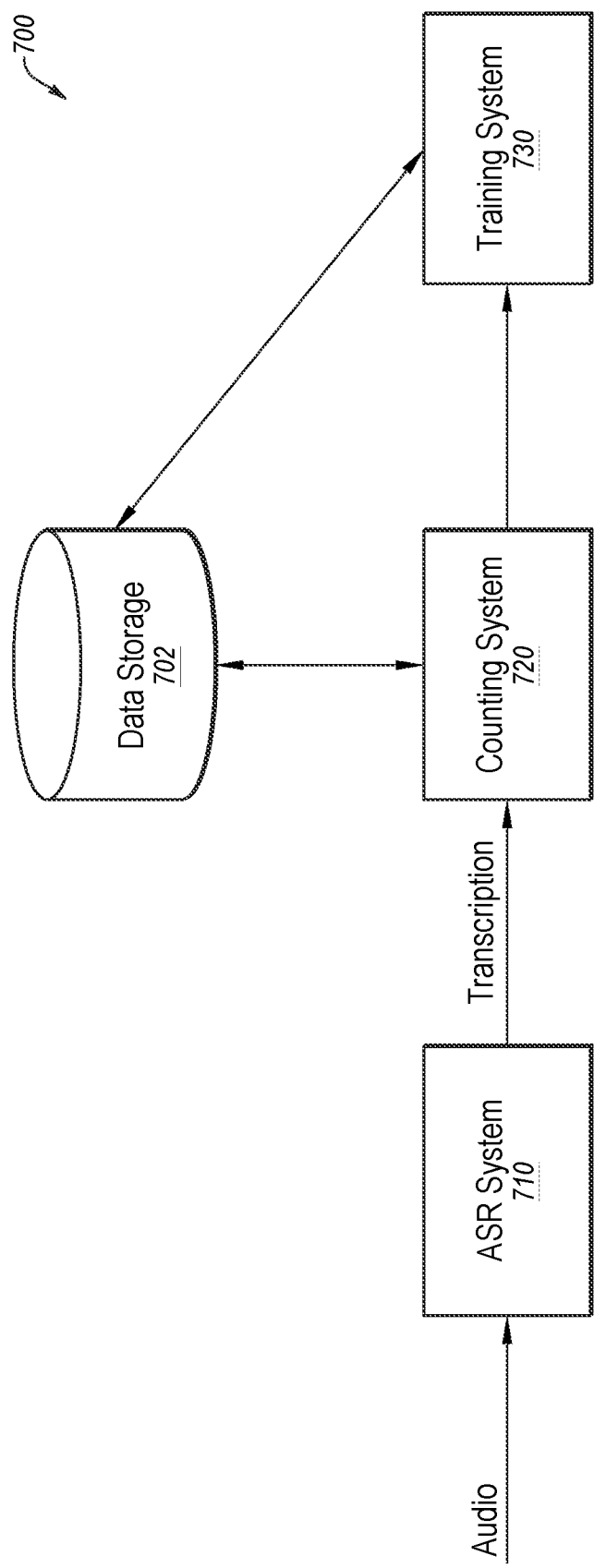
FIG. 7 illustrates an example environment for training an ASR system using word sequences.

FIG. 7 illustrates an example environment 700 for training an ASR system using word sequences. The environment 700 may be arranged in accordance with at least one embodiment described in the present disclosure. The environment 700 may include a data storage 702, an ASR system 710, a counting system 720, and a training system 730.

In some embodiments, the environment 700 may be configured to count how many times each of multiple word sequences, such as n-grams, occur in transcriptions of audio. In these and other embodiments, the probability of a word sequence occurring during speech may be determined based on the number of times that the word sequence occurs in the transcriptions. In these and other embodiments, the probabilities of the word sequences may be used to train a language model that may be used in an ASR system.

In some embodiments, maintaining word sequences resulting from communication sessions between parties, such as a communication session between the first device 104 and the second device 106 as illustrated in FIG. 1, may present one or more concerns. For example, the information embodied in the word sequences and/or counts of the word sequences may be private, sensitive, and/or confidential. In some embodiments, the systems and methods as disclosed with respect to at least FIGS. 7-10 may be configured to establish word sequences without obtaining the initial word sequences from audio of communication sessions and to the maintain the word sequences and/or counts of the word sequences confidential. In these and other embodiments, the systems and methods may be configured to secure the word sequences and/or counts of the word sequences and/or obscure the word sequences and/or counts of the word sequences. Securing and/or obscure the word sequences and/or counts of the word sequences may help to prevent private, sensitive, and/or confidential information from being extracted or inferred from the word sequences and/or counts of the word sequences.

In some embodiments, the data storage 702 may be configured to store multiple word sequences in a word sequence table and counts associated with the multiple word sequences. In these and other embodiments, each count may be associated with a different one of the word sequences and represent how many times the word sequence has been found in a transcription of audio.

In some embodiments, the word sequences stored in the word sequence table in the data storage 702 may be generated using any one of multiple different methods, singularly or in combination. For example, the word sequences may be generated using text from commercially available corpora or transcriptions from other services or collections of text. In these and other embodiments, the text may be divided into word sequences of multiple different lengths. For example, the word sequences may include lengths of 1, 2, 3, 4, 5, 6, 7, 8 or more words. In these and other embodiments, the same text may result in the combination of multiple different word sequences of different lengths. For example, text of a length of five words may be used to generate five one-word sequences, four two-word sequences, three three-word sequences, two four-word sequences, and one five-word sequence.

As another example, the word sequences may be generated from transcriptions generated from ASR systems in a transcription system, such as the transcription system 120 of FIG. 1. In these and other embodiments, the word sequences may be generated from audio of users that provide permission to the transcription system to generate and store the word sequences. For example, the word sequences may be generated from audio of the users of the transcription system that obtain transcriptions for presentation from the transcription system. In these and other embodiments, the transcription system may generate a first transcription of the audio that originates from a third-party device during a communication session between a third-party and the user. The first transcription may be provided to the user. Alternately or additionally, the first transcription may be used to compare to current word sequences and increment counters associated with the word sequences as discussed in this disclosure. The transcription system may also be configured to generate a second transcription of audio that originates from the device of the user. The second transcription may not be presented on the device of the user because the user spoke the words in the transcription. In these and other embodiments, the second transcription may be used to generate word sequences for storage in the data storage 702. In these and other embodiments, word sequences from the second transcription may also be counted. Alternately or additionally, in response to a word sequence from the second transcription not being part of the word sequence table, the word sequence may be added to the word sequence table. Alternately or additionally, the word sequence may be added to the word sequence table in response to a determination that a communication session is provided under a particular class of service, such as a communication session is a residential phone call, a business phone call, a communication where the topic is not private, designated as a data collection communication session, a suspected fraudulent communication session, a fraudulent communication session, a communication session where consent has been provided by one or more parties, a communication session where consent has been provided by all parties, subject to a particular set of laws such as laws governing the state where one or more parties are located, a test communication session, a communication session subject to reimbursement from a participant or other party, or a communication session not subject to reimbursement from a participant or other party, among other types of communication session.

As another example, random word sequences may be generated to populate the word sequence table. The random word sequences may be generated using a language model. For example, a language model may include a recurrent neural network (RNN). The RNN may be configured to determine probabilities of words either alone or given a sequence of proceeding and/or succeeding words. In these and other embodiments, the language model may be trained from previously obtained audio recordings and/or transcriptions, trained from audio from communication sessions, and/or trained from other word sequences tables or other available language models.

To generate the random word sequences using the RNN, one or more large sequences of words may be generated. To generate the large sequence of words, a probability of each word in a set of words may be obtained from the RNN. The set of words may be words that are included in the language model. A first word may be selected, and its probability determined based on the first word being the first word in a sequence of words. A second word may be selected based on its probability or frequency give that the proceeding word is the first word. For example, each of the two-word sequences in the language model may be reviewed that start with the first word. A word sequence from the language model may be selected at random. The odds of a given sequence being selected may be in proportion to its probability or frequency as determined by the language model. A second word of the word sequence from the language model may be used as the second word for the random word sequence. The process of selecting a next word based on probabilities may continue to generate a large sequence of words. The word sequence table may be generated from the large sequence of words by, for example, identifying n-grams that appear in the large sequence and counting their frequency of occurrence. In these and other embodiments, in response to a word sequence being generated that is already part of the word sequence table, a counter associated with the word sequence may be incremented. By incrementing the counters, an initial count and thus an initial probability for the word sequences in the word sequence table may be obtained.

As another example, the word sequence table may be generated using a language model that employs a word sequence table. In these and other embodiments, the word sequences in the language model may be combined to generate the word sequences for the word sequence table stored in the data storage 702. For example, two two-word sequences from the language model that share a common word may be combined to generate a three-word sequence for the word sequence table stored in the data storage 702. For example, the word sequences "see you" and "you later" may be combined to generate the word sequence "see you later." In these and other embodiments, a probability of the word sequences from the language model may be multiplying together to obtain a probability of the word sequences for the word sequence table. For example, the probability of the word sequence "see you" may be 0.02 and the probability of the word sequence "you later" may be 0.03. As such, the probability of the word sequence for "see you later" may be 0.0006. The probability may be converted to a count for the counter associated with the word sequence in the data storage 702.

In some embodiments, the word sequence table may be generated based on transcriptions stored on a device of a user. For example, a device may store the transcriptions that are provided by a transcription system. In these and other embodiments, the device may provide the transcriptions to a system that generates the word sequence table. In these and other embodiments, the word sequence table may be generated using the transcriptions in a similar manner as transcriptions obtained from other resources.

In some embodiments, the word sequences at creation may be analyzed to determine if the word sequences include sensitive information. In response to the word sequences including sensitive information, the sensitive information may be removed. Sensitive information may include criminal offence data including convictions & offenses, trade union membership, hearing impairment, and philosophical opinions, among other sensitive information as discussed in U.S. patent application Ser. No. 16/209,524.

In some embodiments, each of the word sequences stored by data storage 702 may include a corresponding counter of multiple counters stored in the data storage 702. In some embodiments, a counter corresponding to a word sequence may be incremented when the word sequence is found in a transcription and/or during generation of the word sequences. For example, when word sequences are generated from another word sequence or a language model, after discovery of a first word sequence, each subsequent generation of the first word sequence may result in the counter corresponding to the first word sequence being incremented. The counter may be incremented at any interval, such as by 0.1, 0.5, 1, 2, 3 or some other value.

In some embodiments, the counters may be initialized to a particular value at the creation of the counters. The particular value may be set to zero or one. Alternately or additionally, the particular value may be set to a random value. The random values may be stored in the data storage 702 or in a separate location. In these and other embodiments, each of the random values may be associated with a particular counter such that the random values may be removed from the count of the counters. By subtracting the random values, the counts of the counters may more accurately indicate how often the word sequences associated with the counters where discovered in transcriptions.

In some embodiments, the counters may be initialized to a random value in a system that includes multiple counting regions or portions of the values that may be considered during training of a language model using the word sequence table and the corresponding counters. For example, the random values may be assigned to a number or a multiple of the number. For example, the number may be X and the random number may be X, 2X, 3X, etc. In these and other embodiments, the counter may be incremented. A modulus function with respect to X may be applied to the counters to obtain the count of counters without the random number. In some embodiments, X may be a power of two such as $2^8$, $2^{16}$, $2^{24}$, $2^{12}$, $2^{48}$, or $2^{56}$. As another example, the random number may be a number that is associated with upper bits of a multiple bit counter. In these and other embodiments, the lower bits of the counter may be incremented in response to discovery of the word sequences and the upper bits may not be considered during training of a language model using the word sequence table and the corresponding counters.

In some embodiments, the counters may be initialized to a random value that is not stored and not able to be removed. In these and other embodiments, the random values may be selected from a set of random values. The set of random values may be small compared to an expect count of the counters. For example, the set random values may be values between −5.0 to 5.0. In these and other embodiments, when the counts of the counters are expected to be larger than 1000, a potential error introduced by the random values may be less than 0.005. In some embodiments, the random values may be selected from a set with a large range. For example, the set of random values may include a distribution of values, such as a Gaussian distribution of values. Other distribution of values may also be used, including Poisson, exponential, double exponential, Cauchy, Chi-Square, Weibull, Gamma, F, and other distributions.

Initializing the counters may increase a privacy security of a system that includes the counters. For example, if a system that uses the word sequences and counters is accessed by someone without authorization, the counters being at random numbers may reduce the conclusions that may be obtained from the word sequence table and the corresponding counters.

In some embodiments, random or fictitious word sequences may be also be created to be included in the word sequence table. The fictitious word sequences may be word sequences that are not expected to be included in transcriptions or that have not been found so far in text corpora or transcriptions. As such, the counters of the fictitious word sequences may not be expected to be incremented. Counters associated with the fictitious word sequences may be initialized to a random value. Alternatively, fictitious word sequences may be created for which it is not known whether the sequences are likely to be included in transcriptions. In these and other embodiments, because the counters may be small the effect of the fictitious word sequences on language model generated using the fictitious word sequences may be small. However, the fictitious word sequences may also reduce the conclusions that may be obtained from the word sequence table and the corresponding counters from someone that accesses the word sequence table and the corresponding counters without authorization.

In some embodiments, the word sequence table and the corresponding counters may be encrypted. In these and other embodiments, the entire word sequence table and the corresponding counters may be encrypted. Alternately or additionally, each of the word sequences and their corresponding counter may be encrypted together. Alternately or additionally, each of the word sequences may be encrypted using a first encryption key and each of the counters may be encrypted using a second encryption key. In some embodiments, each of the words in the word sequences may be encrypted separately. For example, for a word sequence of "the fat cat," the word "the," the word "fat," and the word "cat," may each be encrypted separately using a first encryption key or separate encryption keys. The encrypted word sequence table and the corresponding counters may be stored in the data storage 702. In some embodiments, an encryption key may be provided to or stored on the counting system 720 and/or the data storage 702. The encryption key may be used to create and update word sequences and counters. In some embodiments, a decryption key may be provided to or stored on the training system 730. A decryption key may not be provided to the counting system 720 or the data storage 702.

In some embodiments, the ASR system 710 may be configured to be obtain a transcription of audio. For example, the ASR system 710 may be analogous to an ASR system used by a transcription system, such as the transcription system 120 of FIG. 1. In some embodiments, the audio obtained by the ASR system 710 may be audio from a communication session. In these and other embodiments, the ASR system 710 may obtain the transcription in real-time or substantially real-time during the communication session. The ASR system 710 may provide the transcription to the counting system 720.

In some embodiments, the counting system 720 may be configured to increment counters corresponding to word sequences in the word sequence table in response to finding the word sequences in the transcriptions obtained from the ASR system 710. For example, the counting system 720 may be configured to parse the transcription into multiple different transcription word sequences. The counting system 720 may compare the transcription word sequences to the table word sequences in the word sequence table. In response to a transcription word sequence matching a table word sequence, the counting system 720 may be configured to increment a counter associated with the table word sequence.

In some embodiments, the counting system 720 may be configured to increment the counters in an analogous manner. For example, each counter may be incremented by the same value. Alternately or additionally, each of the counters may be incremented by a different value or a different subset of the counters may be incremented by different values. In these and other embodiments, an indication of the incrementation value may be stored for each of the counters such that the counters may be normalized. For example, the counters may be divided by the incrementation value such that a normalized comparison may be made between the different counters.

In some embodiments, the counting system 720 may include a count of the total number of transcription word sequences that are found in the transcriptions. As such, the counting system 720 may be able to determine a probability of each of the word sequences in the transcriptions by dividing a count of a table word sequence by the total number of transcription word sequences. Alternately or additionally, a count for a table word sequence may be determined by multiplying the probability of the word sequence by the total number of transcription word sequences.

In some embodiments, the counting system 720 may be configured to determine a length of time during which counters of table word sequences have been incremented. For example, in some embodiments, the counting system 720 may be configured to provide a time stamp in response to creating a table word sequence or to first incrementing a counter of a table word sequence. For example, a first time that a table word sequence is found to match a transcription word sequence, the counting system 720 may associate a time stamp with the table word sequence. In some embodiments, the time stamp may not be included to increase a privacy of the word sequences. Alternatively or additionally, the time stamp may be altered, such as rounded to a nearest minute, hour, day, or by adding an offset of time.

In some embodiments, the counting system 720 may be further configured to associate additional information with a table word sequence when a counter of the table word sequence is incremented. For example, information regarding the transcription that included the transcription word sequence that matches the table word sequence may be associated with the transcription word sequence. For example, the information may include a device that obtained the transcription, a device where the audio originated, a quality of the audio, and information regarding the ASR system that generated the transcription, among other information.

In some embodiments, the counting system 720 may be configured to not add transcription word sequences to the word sequence table in response to the transcription word sequences not being found in the word sequence table. Alternately or additionally, the counting system 720 may be configured to add transcription word sequences of a particular length to the word sequence table. For example, the counting system 720 may add transcription word sequences of lengths less than a threshold to the word sequence table. In these and other embodiments, the counting system 720 may adjust the language in the transcription word sequences based on the words in the word sequences before adding the transcription word sequences to the word sequence table. For example, the counting system 720 may adjust language that may indicate the transcription word sequence may include private information. In another example, the counting system 720 may adjust language to redact, alter, or obscure private information.

In some embodiments, the counting system 720 may be configured to add random transcription word sequences to the word sequence table in response to the transcription word sequence being found to include private information. In these and other embodiments, the counting system 720 may also add one or more additional word sequences to the word sequence table that may be similar to the newly added word sequence. For example, if the transcription word sequence is, "John Doe has cancer" a similar word sequence that may be created and added to the word sequence table may be "John Poe has cancer." As another example, if the transcription word sequence is, "my PIN is 3209" a similar word sequence that may be created and added to the word sequence table may be "my PIN is 3922."

In some embodiments, the counting system 720 may be configured to adjust the word sequence table and/or the counters of the word sequence table. For example, in some embodiments, the counting system 720 may be configured to remove one or more of the word sequences in the word sequence table. In these and other embodiments, the counting system 720 may be configured to remove a word sequence in response to a count of the word sequence not satisfying a count threshold. The count threshold may be based on a total number of transcription word sequences matched to the table word sequences, a length of time since the word sequence was added to the word sequence table, the size of or number of sequences in the word sequence table, an error tolerance for the word sequence table and counters, and an ASR system that may use a language model generated using the word sequence table and counters, among others. In some embodiments, the counting system 720 and data storage 702 may not have the decryption key. The determination of whether the count of the word sequence satisfies a count threshold may be performed by sending the encrypted counter value to a system that includes a decryption key. The length of time since the word sequence was added to the word sequence table and the count threshold may also be sent. The system with a decryption key may decrypt the counter, compare the decrypted value to the count threshold, and return an indication of whether the word sequence may be removed.

In some embodiments, the counting system 720 may be configured to adjust the word sequence table at particular intervals in response to an age of the word sequence table, in response to an age of particular word sequences in the word sequence table, based on accuracy of ASR systems using language models generated using the word sequence table, among other factors. For example, the counting system 720 may compare counters of word sequences to the count threshold in response to the word sequences having a time interval since the counters of the word sequences are first incremented that satisfies a time threshold. The time threshold may be based on factors that include a total number of transcription word sequences matched to the table word sequences and an error tolerance for the word sequence table and counters, among others.

In some embodiments, based on the adjustments to the word sequence table, some word sequences may be added to the word sequence table that never or rarely are incremented based on the transcription and thus are removed from the word sequence table after a particular time period. For example, the word sequence table may include first word sequences that are generated from other word sequence tables or language models that are not common word sequences. As a result, the first word sequences may not be found in the transcription word sequences from the ASR system 710. After the particular time period, the first word sequences may be removed from the word sequence table. In some embodiments, after adjusting the word sequence table, for example, by removing word sequences from the word sequence table, one or more word sequences may be added to the word sequence table. For example, additional word sequences may be generated based on the word sequences in the word sequence table. In these and other embodiments, the additional word sequences may be generated based on word sequences added to the word sequence table since the last adjustment of the word sequence table, based on another subset of word sequences, or based on all of the word sequences in the word sequence table.

In some embodiments, as discussed with respect to FIG. 7, the word sequences in the word sequence table and the counters may be encrypted. In some embodiments, the word sequence table and/or counters may be decrypted for comparison to the transcription word sequence and incrementing the counters. Alternately or additionally, the counting system 720 may be configured to obtain the encrypted word sequence table and the encrypted counters and increment the counters without decrypting the encrypted word sequence table and the encrypted counters. For example, in some embodiments, the counting system 720 may be configured to obtain the transcription word sequences and encrypt the transcription word sequences using a same encryption key used to encrypt the table word sequences. After encrypting the transcription word sequences, the counting system 720 may be configured to compare the table word sequences that are individually encrypted to determine if the word sequence table includes a word sequence that matches the transcription word sequence. The matching is able to be performed without decryption because a word sequence encrypted with the same encryption key may be the same. In these and other embodiments, if the encrypted transcription word sequence does not match any of the encrypted table word sequences, then the encrypted transcription word sequence may be added to the word sequence table.

In some embodiments, the transcription word sequences may be transformed before the transcription word sequences are encrypted. For example, in some embodiments, one or more characters may be added to the transcription word sequences before, after, or mixed in with the words. In these and other embodiments, the one or more characters may be selected such that the majority or all of the transcription word sequences may be different. For example, the one or more characters may be a character appended to a beginning or end of a word sequence. In these and other embodiments, the character could be any data, such as numbers, strings, previous word sequences, information about the transcription word sequence, such as a time of arrival of the transcription word sequence or data from the audio that resulted in the transcription word sequence.

In these and other embodiments, the transcription word sequences may be added to the word sequence table with a counter of one. As a result of a majority or all of the transcription word sequences being different due to the one or more characters may be added to the transcription word sequences, a comparison between the transcription word sequences and the table word sequences may not occur. Rather, the transcription word sequences may be added to the word sequence table. During training, each of the table word sequences may be decrypted and the one or more characters removed. After removing the characters, the table word sequences that are the same may be counted to determine a count for each of the table word sequences that may be used to train or adjust a language model.

In some embodiments, the encrypted counters of the data storage 702 may also be incremented without being decrypted. In these and other embodiments, the value that may be used to increment the encrypted counters may be encrypted using the same transcription key as used to encrypt the counters. In these and other embodiments, an encryption scheme that may allow the encrypted counters to be incremented without decrypting may include homomorphic encryption schemes. As an example, the encryption scheme may be an additive homomorphic encryption scheme such as a Paillier or Benaloh cryptosystem. In these and other embodiments, the encrypted counter may be incremented by multiplying the encrypted counter by the encrypted incrementing value using modulo arithmetic. For example, the encrypted counter may be incremented by one by multiplying the encrypted counter by the encrypted value of one. If multiple instances of a transcription word sequence are found, the encrypted counter may be incremented by the number of instances by multiplying the encrypted counter by the encrypted number of instances. Part or all of a first word sequence table may be combined with part or all of a second word sequence table by finding matching encrypted word sequences that exists in both tables. Then, for each matching encrypted word sequence, the corresponding encrypted counter from the first table may be multiplied by the corresponding encrypted counter from the second table. The product may then be used as the encrypted sum of the counter for the matching word sequence. The process of using a product as the encrypted sum of the counter may be repeated to combine multiple word sequence tables. For example, word sequence tables from multiple instances of the counting system 720 or data storage 702 may be combined into an accumulated word sequence table by multiplying the encrypted counters for matching word sequences together to determine encrypted values of counter totals.

As another example, the encrypted counters of the data storage 702 may also be incremented by re-encrypting the counters. In these and other embodiments, a number of times that the counter is encrypted may indicate a value of the counter.

In some embodiments, the counting system 720 may be configured as a system that obtains transcriptions from multiple ASR systems. FIG. 7 illustrates a single ASR system 710. However, in some embodiments, the environment 700 may include multiple ASR systems 710. For example, some of the multiple ASR systems may be revoicing systems that are each associated with a CA. In these and other embodiments, each of the ASR systems may provide the transcriptions to the counting system 720.

Alternately or additionally, the counting system 720 may be a compilation of multiple sub-counting systems. In these and other embodiments, each of the sub-counting systems may include a corresponding data storage with an initialized word sequence table and counters. In these and other embodiments, each of the sub-counting systems may obtain transcriptions from one or more ASR systems 710. The sub-counting systems may increment the counters of their corresponding word sequence table and/or add additional word sequences to the word sequence table. In these and other embodiments, the counting system 720 may obtain and combine the word sequence tables and counters from the sub-counting systems. In these and other embodiments, each of the sub-counting systems may obtain a separate encryption key for encrypting the word sequences and the counters. In these and other embodiments, the encryption keys may be changed periodically.

In some embodiments, the counting system 720 may provide information regarding the word sequence table and the counters to the training system 730. For example, the counting system 720 may provide the word sequence table and counters to the training system 730. Alternately or additionally, the training system 730 may obtain the word sequence table and the counters from the data storage 702.

The training system 730 may be configured to adapt a language model used by an ASR system using the word sequence table and the counters. For example, the training system 730 may adjust a probability of different word combinations in the language model based on a probability of the word sequences in the word sequence table as determined using the counters.

In some embodiments, the training system 730 may obtain the word sequence table and the counters in an encrypted state. In these and other embodiments, the training system 730 may be configured to decrypt the word sequence table and the counters to perform the training. Alternately or additionally, the training system 730 may be configured to use the word sequences in the encrypted state, such as when each word of the word sequences is encrypted individually. In these and other embodiments, the language model may be adapted using the encrypted words.

In some embodiments, the training system 730 may be configured to adjust values of the counters. For example, if the counters were assigned random values initially, the training system 730 may adjust for the random values to normalize the counters.

In some embodiments, the training system 730 may be configured to generate a language model using the word sequence table and counters. In these and other embodiments, the training system 730 may use the language model to train another language model, such as a recurrent neural network language model. In these and other embodiments, the initial language model may be adapted using the encrypted words. The second language model may be further trained using the encrypted words from the initial language model. In these and other embodiments, during use of the language model by an ASR system, the word sequences that are provided to the second language model may be encrypted before being sent to the second language model. The second language model may provide a probability for each of the encrypted word sequences that may be used by the ASR system to select a word sequence for the transcription of audio. The selected word sequence may be decrypted, and the decrypted word sequence may be provided in the transcription of audio.

Modifications, additions, or omissions may be made to the environment 700 without departing from the scope of the present disclosure. For example, in some embodiments, the data storage 702 may be part of the counting system 720. Alternately or additionally, in some embodiments, a portion of the word sequence table may be stored in the counting system 720 and the remainder at the data storage 702. The portion of the word sequence table stored in the counting system 720 may correspond to the portion of the word sequence table that may be more likely to be matched to a transcription word sequence, such as the table word sequences with the highest counts.

As another example, the audio obtained by the environment 700 may include audio that is obtained by a device during a communication session between the device and another device. In these and other embodiments, the audio may be provided to the ASR system 710. Alternately or additionally, the audio may be provided to a second ASR system. The transcription generated by the second ASR system may be provided to the device. The transcription generated by the ASR system 710 may not be provided to the device. In these and other embodiments, the transcription generated by the ASR system 710 may be provided to the counting system 720 and used to generate transcription word sequences. In these and other embodiments, the second ASR system may be faster than the ASR system 710. As such, to decrease the time between presenting audio and transcriptions at the device, the transcription from the second ASR system may be provided to the device.

Figure 8A:
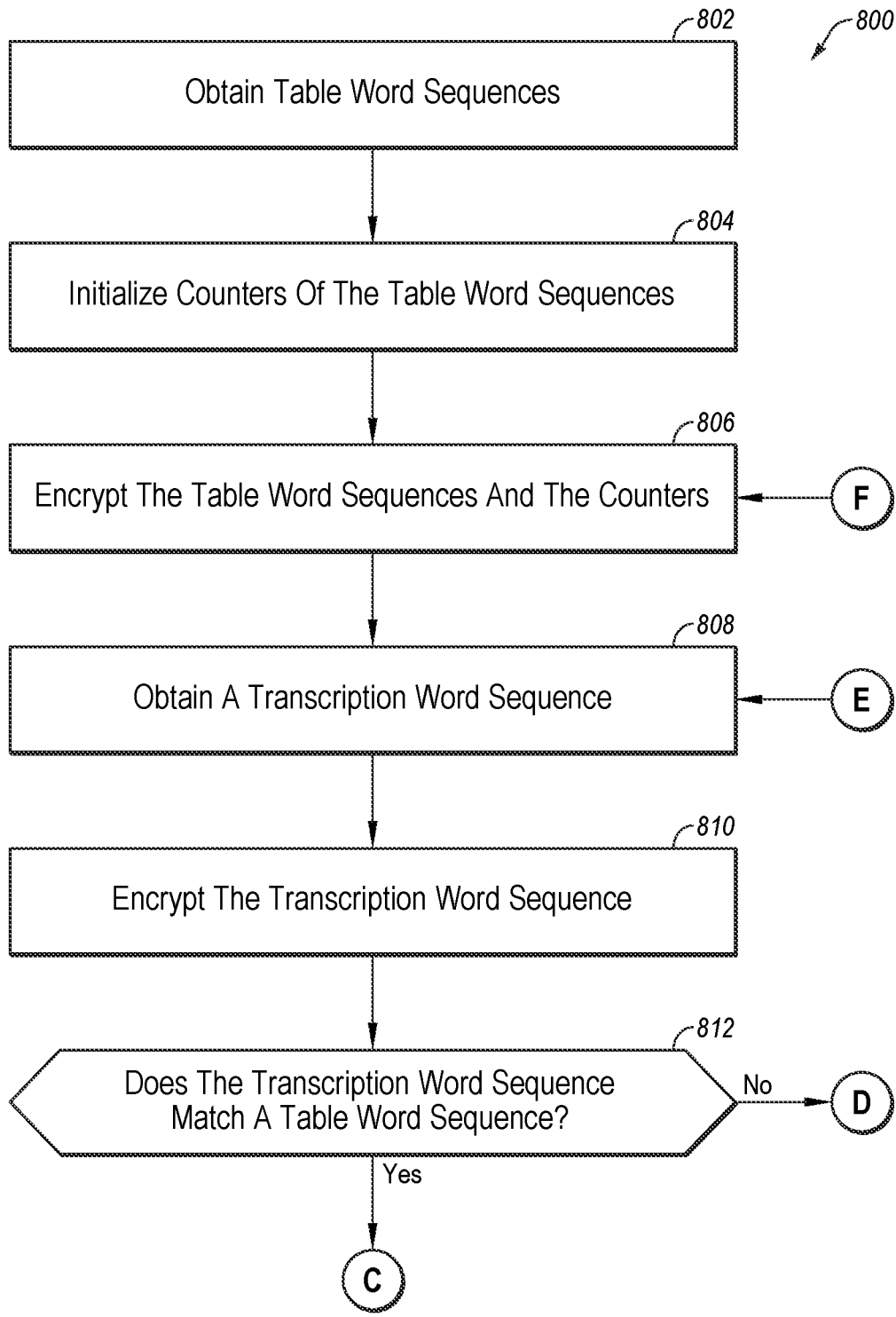
FIGS. 8A and 8B illustrate a flowchart of example method to count word sequences.
Figure 8B:
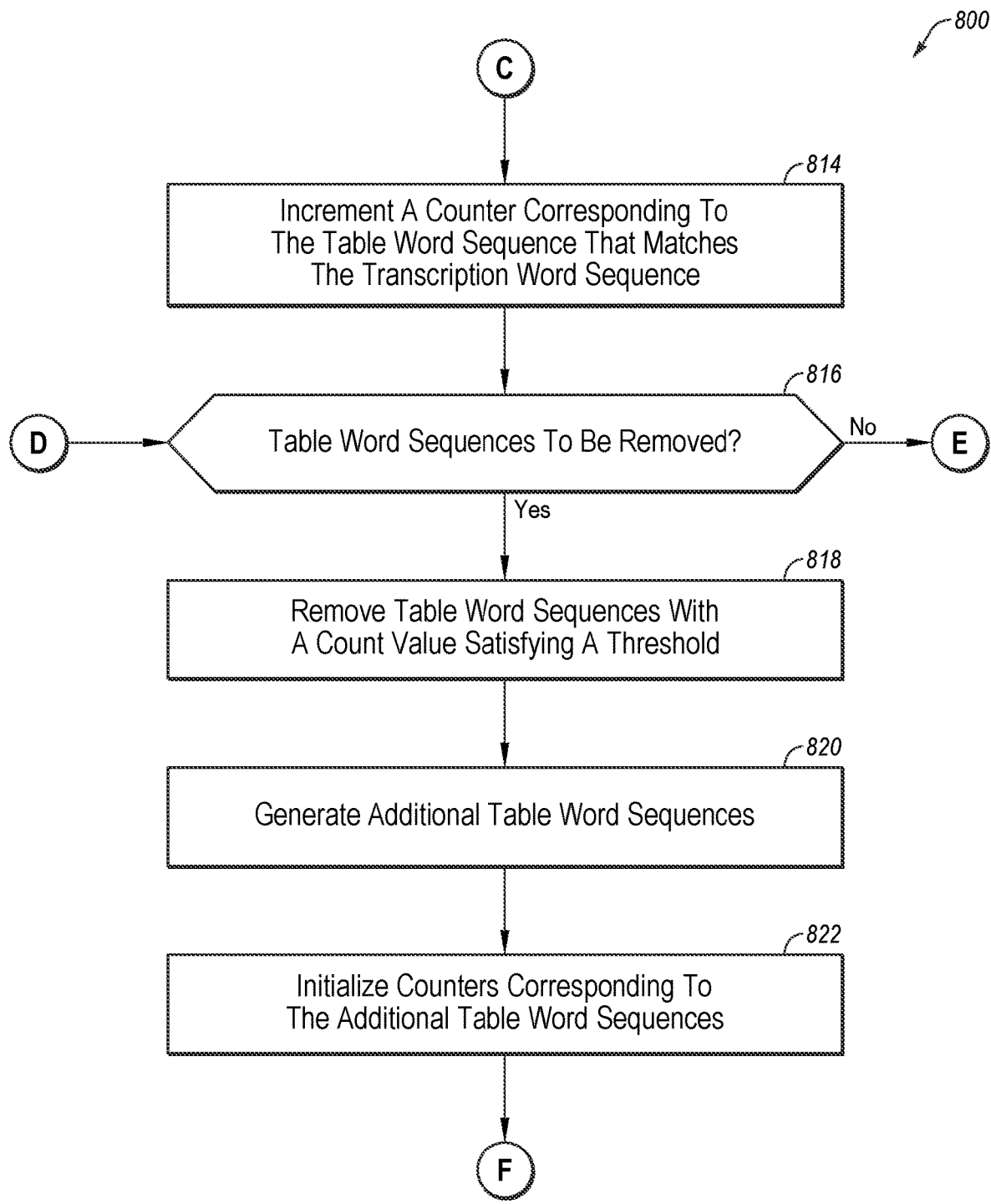

FIGS. 8A and 8B illustrate a flowchart of an example method 800 to count word sequences. The method 800 may be arranged in accordance with at least one embodiment described in the present disclosure. One or more operations of the method 800 may be performed, in some embodiments, by a device or system, such as the transcription system 120 and/or the components of the environment 700 of FIGS. 1 and 7 or another device or combination of devices. In these and other embodiments, the method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 800 may begin at block 802, where table word sequences may be obtained. In some embodiments, the table word sequences may be obtained from a language model or a word sequence table. Alternately or additionally, the table word sequences may be obtained from audio of a user that obtains transcriptions for presentation.

At block 804, counters of the table word sequences may be initialized. In some embodiments, each of the counters may correspond to a different one of the table word sequences. In these and other embodiments, the counters may be initialized to zero or one. Alternately or additionally, the counters may be initialized to a random number. In some embodiments, the random numbers may be stored and associated with their corresponding counter. In some embodiments, the random number may be a uniform random number within a particular range. Alternately or additionally, the random number may be from a distribution of numbers.

At block 806, the table word sequences and the counters may be encrypted. In some embodiments, the table word sequences and the counters may be encrypted together using a single encryption key. Alternately or additionally, the table word sequences may be encrypted using a first encryption key and the counters may be encrypted using a second encryption key that is different from the first encryption key. In these and other embodiments, each of the table word sequences may be separately encrypted using the first encryption key.

At block 808, a transcription word sequence may be obtained. In some embodiments, the transcription word sequence may be a transcription of audio of a communication session between two devices. In these and other embodiments, the transcription word sequence may be obtained during the communication session.

At block 810, the transcription word sequence may be encrypted. In some embodiments, the transcription word sequence may be encrypted using the encryption key used to encrypt the table word sequences.

At block 812, it may be determined if a transcription word sequence matches one of the table word sequences. In these and other embodiments, the encrypted transcription word sequence may be compared with the encrypted table word sequences. In response to the encrypted transcription word sequence matching one of the encrypted table word sequences, the method 800 may proceed to block 814. In response to the encrypted transcription word sequence not matching one of the encrypted table word sequences, the method 800 may proceed to block 816.

At block 814, a counter corresponding to the encrypted table word sequences that matches the encrypted transcription word sequence may be incremented. In some embodiments, when the counter is encrypted the counter may be incremented without decrypting the counter.

At block 816, it may be determined if the table word sequences are to be removed. It may be determined to remove table word sequences based on one or more factors. The factors may include expiration of a time interval, age of the table word sequences, the value of counters falling below a selected threshold, and accuracy of ASR systems using language models generated using the word sequence table, among others.

In response to determining table word sequences are to be removed, the method 800 may proceed to block 818. In response to determining table word sequences are not to be removed, the method 800 may proceed to block 808. At block 808, another transcription word sequence may be obtained. In some embodiments, the other transcription word sequence may be part of a transcription of the same audio as the transcription word sequence.

At block 818, table word sequences with a count value satisfying a threshold may be removed. In some embodiments, the threshold may be based on a total number of transcription word sequences matched to the table word sequences, a length of time between when the table word sequence is added to a word sequence table, an error tolerance for the word sequence table and counters, and an ASR system that may use a language model generated using the word sequence table and counters, among others.

At block 820, additional table word sequences may be generated. The additional table word sequences may be generated based on the table word sequences after removal of some of the table word sequences as described in block 818.

At block 822, counters corresponding to the additional table word sequences may be initialized. The method 800 may proceed to block 806. In block 806, the additional table word sequences and the corresponding counters may be encrypted.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 800 may further include generate an additional table word sequence that is the same as the transcription word sequence in response to the transcription word sequence not matching any of the table word sequences.

Figure 9:
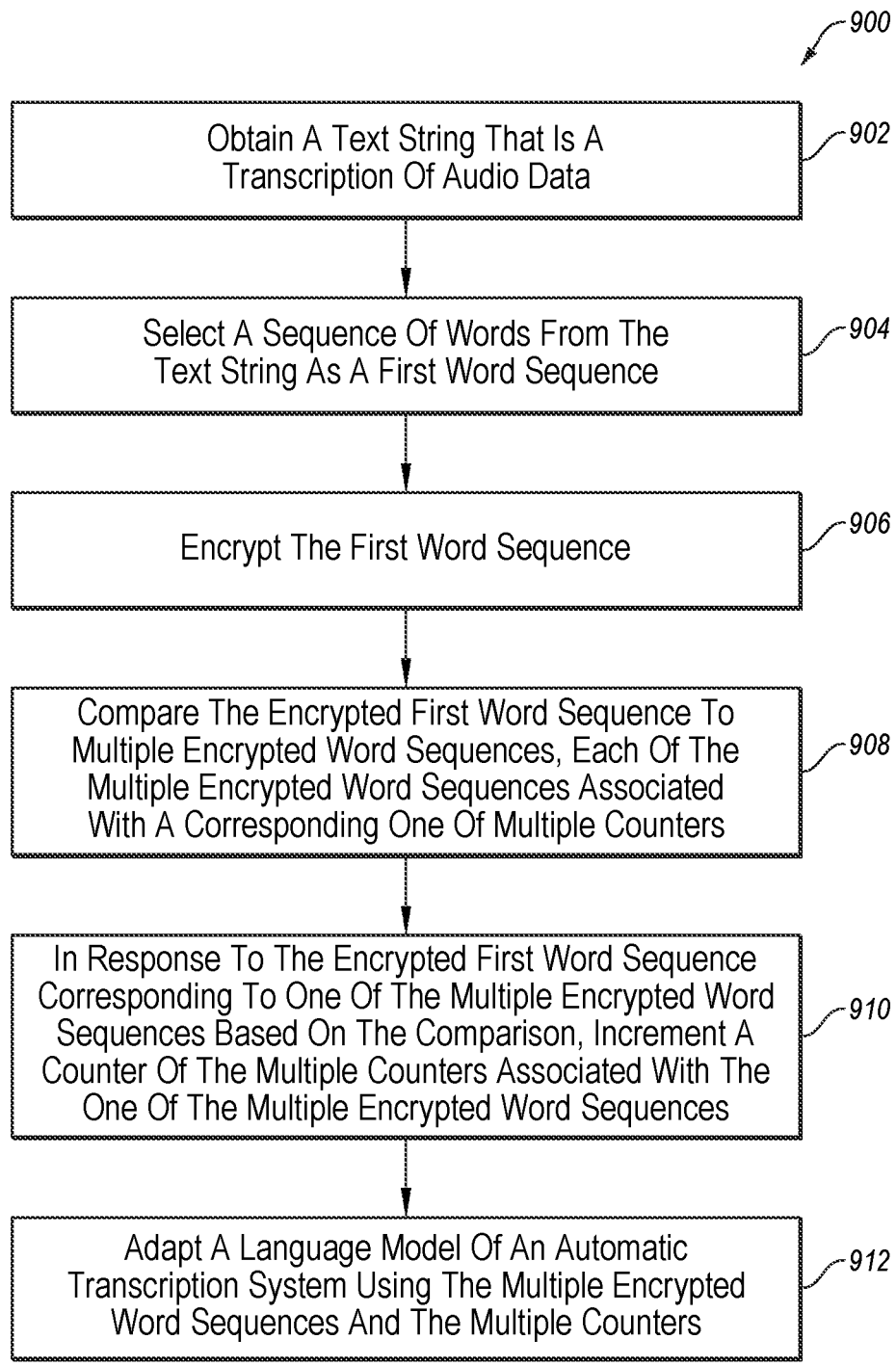
FIG. 9 illustrates a flowchart of example method to train an ASR system using word sequences.

FIG. 9 illustrates a flowchart of an example method 900 to train an ASR system using word sequences. The method 900 may be arranged in accordance with at least one embodiment described in the present disclosure. One or more operations of the method 900 may be performed, in some embodiments, by a device or system, such as the transcription system 120 and/or the components of the environment 700 of FIGS. 1 and 7 or another device or combination of devices. In these and other embodiments, the method 900 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 900 may begin at block 902, where a text string that is a transcription of audio data may be obtained. At block 904, a sequence of words may be selected from the text string as a first word sequence. At block 906, the first word sequence may be encrypted.

At block 908, the encrypted first word sequence may be compared to multiple encrypted word sequences. In some embodiments, each of the multiple encrypted word sequences may be associated with a corresponding one of multiple counters. In some embodiments, the multiple counters may be initialized with random numbers. Alternately or additionally, before obtaining the text string, the multiple encrypted word sequences may be generated from random text strings generated from another multiple word sequences or a second language model.

At block 910, in response to the encrypted first word sequence corresponding to one of the multiple encrypted word sequences based on the comparison, a counter of the multiple counters associated with the one of the multiple encrypted word sequences may be incremented. In some embodiments, the multiple counters may be encrypted, and the counter associated with the one of the multiple encrypted word sequences may be incremented while being encrypted. In these and other embodiments, a first encryption key for the multiple encrypted word sequences may be different from a second encryption key for the multiple encrypted counters.

In some embodiments, each one of the multiple counters may indicate a number of occurrences that a corresponding one of the multiple encrypted words sequences is included in multiple transcriptions of multiple communication sessions that occur between multiple devices.

At block 912, a language model of an automatic transcription system may be adapted using the multiple encrypted word sequences and the multiple counters.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 900 may further include obtaining second audio data originating at multiple first devices and obtaining multiple second text strings that are transcriptions of the second audio data. The method 900 may further include before obtaining the text string, generating the multiple encrypted word sequences from the multiple second text strings. In these and other embodiments, the audio data may originate at multiple second devices and the multiple second devices may not include the multiple first devices.

In some embodiments, the method 900 may further include after incrementing the counter of the multiple counters, removing a second word sequence of the multiple encrypted word sequences from the multiple encrypted word sequences based on a second counter of the multiple counters associated with the second word sequence satisfying a threshold. In some embodiments, before obtaining the text string, the first word sequence may be generated from random text strings generated from another multiple word sequences or a second language model.

In some embodiments, the method 900 may further include after removing the first word sequence, generating a second word sequence to include in the multiple encrypted word sequences using the multiple encrypted word sequences.

The method 900 may further include further comprising decrypting the multiple encrypted word sequences. In some embodiments, the language model may be adapted using the decrypted multiple word sequence and the multiple counters.

Figure 10:
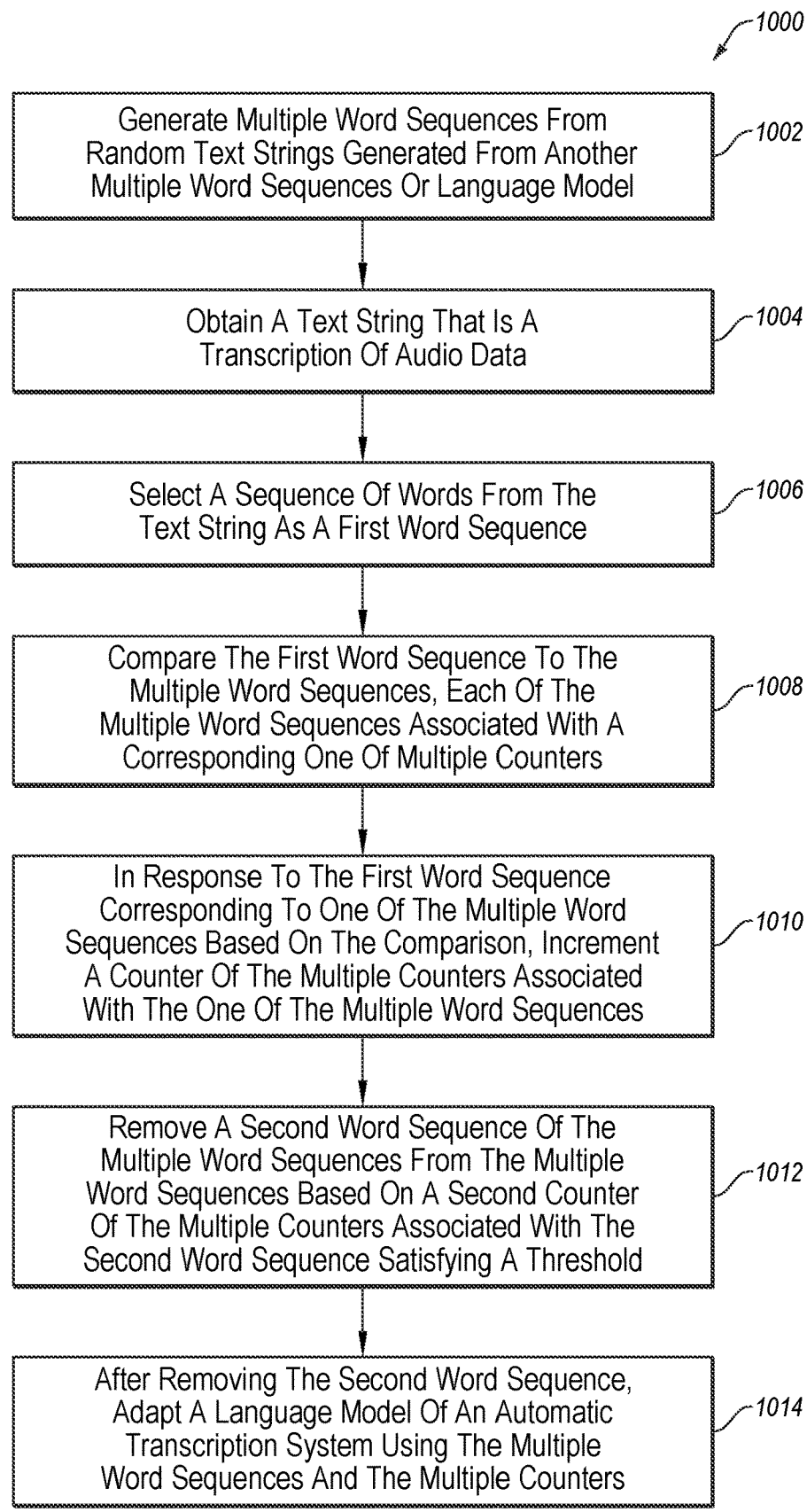
FIG. 10 illustrates a flowchart of another example method to train an ASR system using word sequences.

FIG. 10 illustrates a flowchart of an example method 1000 to train an ASR system using word sequences. The method 1000 may be arranged in accordance with at least one embodiment described in the present disclosure. One or more operations of the method 1000 may be performed, in some embodiments, by a device or system, such as the transcription system 120 and/or the components of the environment 700 of FIGS. 1 and 7 or another device or combination of devices. In these and other embodiments, the method 1000 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 1000 may begin at block 1002, multiple word sequences may be generated from random text strings generated from another multiple word sequences or language model. At block 1004, a text string that is a transcription of audio data may be obtained.

At block 1006, a sequence of words from the text string may be selected as a first word sequence. At block 1008, the first word sequence may be compared to the multiple word sequences. In these and other embodiments, each of the multiple word sequences may be associated with a corresponding one of multiple counters. In some embodiments, the multiple counters may be initialized with random numbers.

At block 1010, in response to the first word sequence corresponding to one of the multiple of word sequences based on the comparison, a counter of the multiple counters associated with the one of the multiple word sequences may be incremented. In some embodiments, the multiple counters may be encrypted, and the counter associated with the one of the multiple encrypted word sequences may be incremented while being encrypted.

At block 1012, a second word sequence of the multiple word sequences may be removed from the plurality of word sequences based on a second counter of the multiple counters associated with the second word sequence satisfying a threshold.

At block 1014, after removing the second word sequence, a language model of an automatic transcription system may be adapted using the multiple word sequences and the multiple counters.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 1000 may further include encrypting the first word sequence and encrypting the multiple word sequences. In these and other embodiments, the first word sequence and the multiple word sequences may both be encrypted when compared.

In some embodiments, the method 1000 may further include after removing the second word sequence, generating a third word sequence to include in the multiple word sequences using the multiple word sequences.

As another example, the method 1000 may further include encrypting the first word sequence using a first encryption key and encrypting the multiple word sequences using the first encryption key. In these and other embodiments, the first word sequence and the multiple word sequences may both be encrypted when compared. The method 1000 may further include encrypting the multiple counters using a second encryption key that is different from the first encryption key. In these and other embodiments, the counter may be incremented while being encrypted.

Figure 11:
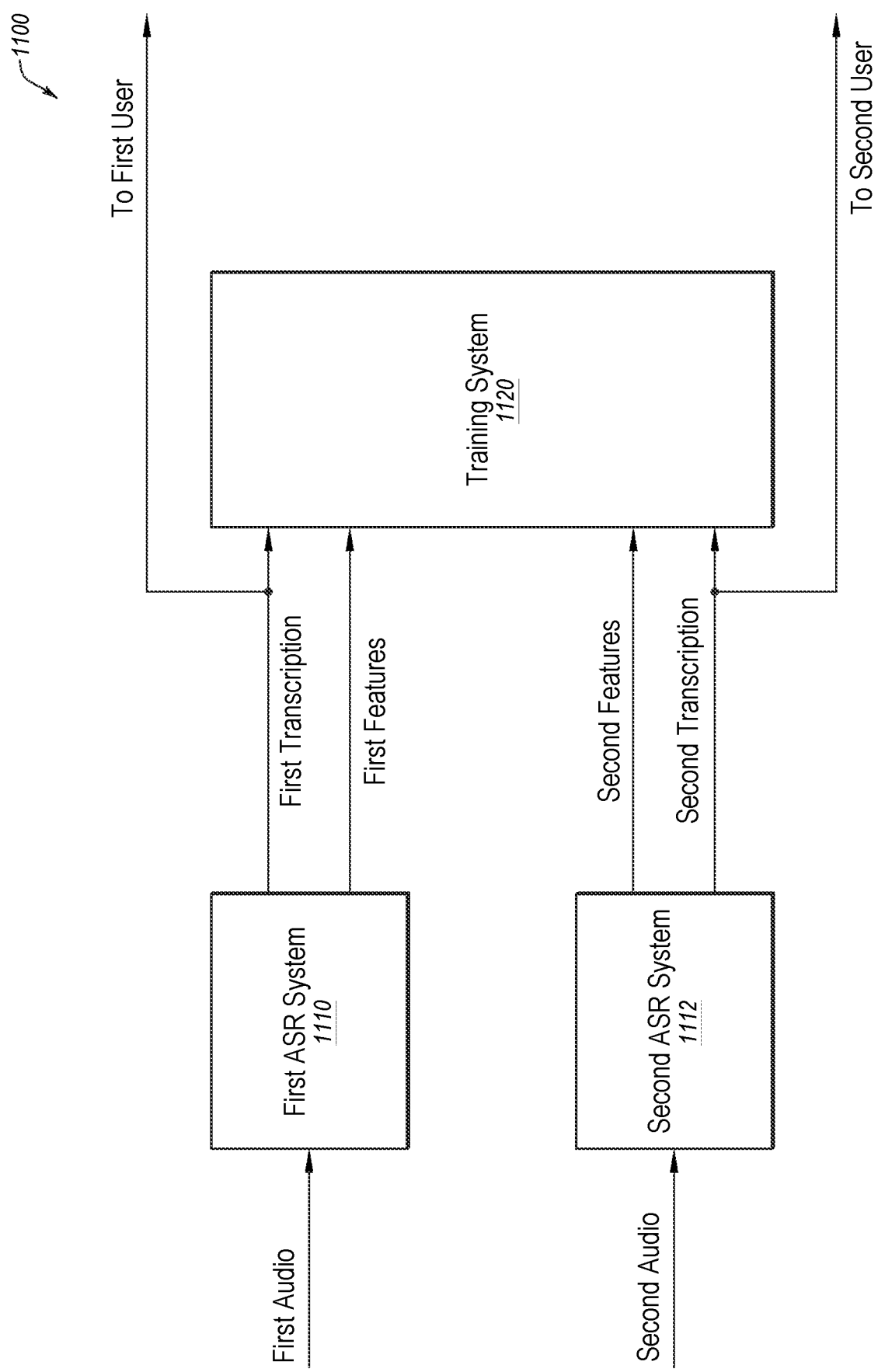
FIG. 11 illustrates an example environment for training ASR models.

FIG. 11 illustrates an example environment 1100 for training ASR models. The environment 1100 may be arranged in accordance with at least one embodiment described in the present disclosure. The environment 1100 may include a first ASR system 1110, a second ASR system 1112, and a training system 1120.

The first ASR system 1110 and the second ASR system 1112 may be configured as any type of ASR system as described in this disclosure. For example, the first ASR system 1110 and the second ASR system 1112 may be analogous to an ASR system of the transcription system 120 of FIG. 1. In these and other embodiments, the first ASR system 1110 and the second ASR system 1112 may be the same type of ASR systems. Alternately or additionally, the first ASR system 1110 and the second ASR system 1112 may be different types of ASR systems. For example, the first ASR system 1110 may be non-revoiced ASR system and the second ASR system 1112 may be a revoiced ASR system.

In some embodiments, the first ASR system 1110 may be configured to obtain first audio. The first ASR system 1110 may be configured to generate a first transcription of the first audio. The first ASR system 1110 may provide the first transcription to the training system 1120. The first ASR system 1110 may also be configured to provide first features regarding the first audio and the first transcription to the training system 1120. The first features may include features of the first audio, features of the generation of the first transcription from the first audio, and features of the communication session that generates the first audio, among other features regarding the first audio and the first transcription. For example, features of the first audio may include accents of voices in the first audio, confidence or estimated accuracy of the first transcription, quality of the first audio, volume of the first audio, and audio characteristics of the voices of the first audio, among others. As another example, features of the generation of the first transcription from the first audio may include outputs of an acoustic model, language model, or other models of the first ASR system 1110, among other outputs of the first ASR system 1110 such as an accuracy of a transcription. The features of the communication session may include devices that are used in the communication session, length of the communication session, topic of the communication session, among others.

In some embodiments, the second ASR system 1112 may be configured to obtain second audio. The second ASR system 1112 may be configured to generate a second transcription of the second audio. The second ASR system 1112 may provide the second transcription to the training system 1120. The second ASR system 1112 may also be configured to provide second features regarding the second audio and the second transcription to the training system 1120. The second features may include features of the second audio, features of the generation of the second transcription from the first audio, and features of the communication session that generates the second audio, among other features regarding the second audio and the second transcription.

In some embodiments, the environment 1100 may be part of a transcription system, such as the transcription system 120 of FIG. 1. In these and other embodiments, the first audio obtained by the first ASR system 1110 may be audio from a communication session between a first device and a second device, such as the first device 104 and the second device 106 of FIG. 1. In these and other embodiments, the first audio may be provided by the first device to the first ASR system 1110 and the first transcription may be provided to the first device for presentation to a user of the first device. In some embodiments, the environment 1100 may obtain information regarding the communication session. For example, a transcription system that includes the environment 1100 may obtain information regarding the communication session and communicate with the first device as described with respect to FIG. 1. In some embodiments, the second audio obtained by the second ASR system 1112 may be audio from a second communication session between a third device and a fourth device. In these and other embodiments, the second audio may be provided by the third device to the second ASR system 1112 and the second transcription may be provided the third device for presentation to a user of the third device. The environment 1100 may also obtain information regarding the second communication session.

In some embodiments, the training system 1120 may be configured to obtain the first transcription, the second transcription, the first features, and the second features. The training system 1120 may be configured to use the first transcription, the second transcription, the first features, and the second features to train a model of an ASR system. For example, the training system 1120 may be configured to train a deep neural network DNN model. The training system 1120 may be configured to train the DNN model to generate transcriptions from audio. Alternately or additionally, the training system 1120 may be configured to use additional data sources of audio, transcription, and features to build ASR models. The additional sources may include data from other services and collections. In these and other embodiments, some of the data may be generated during training and some of the data may be recorded previous to training.

In some embodiments, the training system 1120 may be configured to use the first transcription, the second transcription, the first features, and the second features to train the DNN during the first communication and the second communication. However, the training system 1120 may not be able to use the first transcription and the first features after termination of the first communication session and may not be able to use the second transcription and the second features after termination of the second communication session. For example, when a communication session is considered to be terminated, the training system 1120 may terminate training and delete content, such as audio and transcriptions, derived from the communication session. In those circumstances when the training system 1120 has not completed training of the DNN, losing a portion of the inputs due to a termination of a communication session may force training to pause, reduce effectiveness of the training, or terminate the training before completion.

As illustrated, the training system 1120 may use inputs from two ASR systems. However, any number of ASR systems may provide input to the training system 1120 for training. For example, 1, 3, 4, 5, 10, 15, 20, 50, 100, 200, 256, 300, 400, or 500 or more ASR systems may provide inputs to the training system 1120 for training. As a number of ASR systems that provides input to the training system 1120 increases, a number of communication sessions that provide the audio to the ASR systems increases. As a such, a likelihood of a communication session terminating during training may also increase. To decrease the likelihood, the training system 1120 may use fewer communication sessions, such as a single communication session.

In some embodiments, the training system 1120 may be configured to compensate for terminating communication sessions by extending the communication sessions until completion of the training, predicting termination of communication sessions, using only portions of communication sessions for training, or reducing a number of inputs from different ASR systems to avoid termination of communication sessions during training. Each of these is further explained below with respect to FIG. 11.

In some embodiments, in response to an indication that a communication session is terminating, such as a party of the communication session terminating the communication session and/or sending a request to terminate the communication session, one or more multiple procedures may be implemented such that the communication session does not end until after completion of the training. For example, a final portion of the transcription of the communication session may be delayed in being direct to a device for presentation to a user until after the training completes. In these and other embodiments, if a communication session is detected as being soon to conclude, the transcription may be slowed to extend the communication session.

As another example, a report may be generated regarding the communication session. In these and other embodiments, the presentation of the report may be considered part of the communication session. As another example, a survey may be generated regarding the communication session. In these and other embodiments, the presentation of the survey may be considered part of the communication session.

As another example, the communication session may be considered ongoing until both parties of the communication session terminate the communication session. Alternately or additionally, corrections to a transcription from a CA or other systems may be delayed. In these and other embodiments, until all corrections are complete, the communication session may be considered as ongoing. As another example, for communication sessions using PSTN, the signaling for termination of PSTN communication sessions may be unreliable. As such, a communication session may be determined to be terminated only after a period of time after receiving termination signals or silence is detected for a particular period that satisfies a threshold.

In some embodiments, the training system 1120 may be configured to predict termination of communication sessions. In these and other embodiments, the training system 1120 may not select transcriptions and features from communication sessions near to terminating for training to avoid communication sessions terminating during training. In these and other embodiments, the training system 1120 may be configured to predict termination of communication sessions based on various features of the communication sessions. For example, with respect to a communication session between first and second devices, these features may include a current length of the communication session and a current length of the communication session as compared to other communication sessions involving the first device, the second device, and/or the first device and the second device. Other features may include phrases being spoken that indicate termination, such as "bye," "talk to you later," etc. Other features may include voices and/or pitch changing, silence on the part of both or one of the parties in the communication session that satisfies a threshold, an indication of which party is currently speaking, termination of the communication session by one of the parties, a change in how often a party speaks with respect to the other party speaking Other features to predict a length of the communication session may include a time of day of the communication session.

In some embodiments, the training system 1120 may include a machine learning model that may be trained to predict a length of a communication session based on features such as words spoken in the communication session. In these and other embodiments, the training system 1120 may provide the transcriptions of the communication session to the model to predict termination of the communication sessions.

In some embodiments, the training system 1120 may use portions of communication sessions for training. For example, the training system 1120 may use features that result from words spoken from a first speaker of a communication session with features from other communication sessions for a first training. The training system 1120 may use features that result from words spoken from a second speaker of the communication with features from another communication session for a second training. By using only a portion of the communication session, the training may be complete before the communication session terminates.

Modifications, additions, or omissions may be made to the environment 1100 without departing from the scope of the present disclosure.

Figure 12:
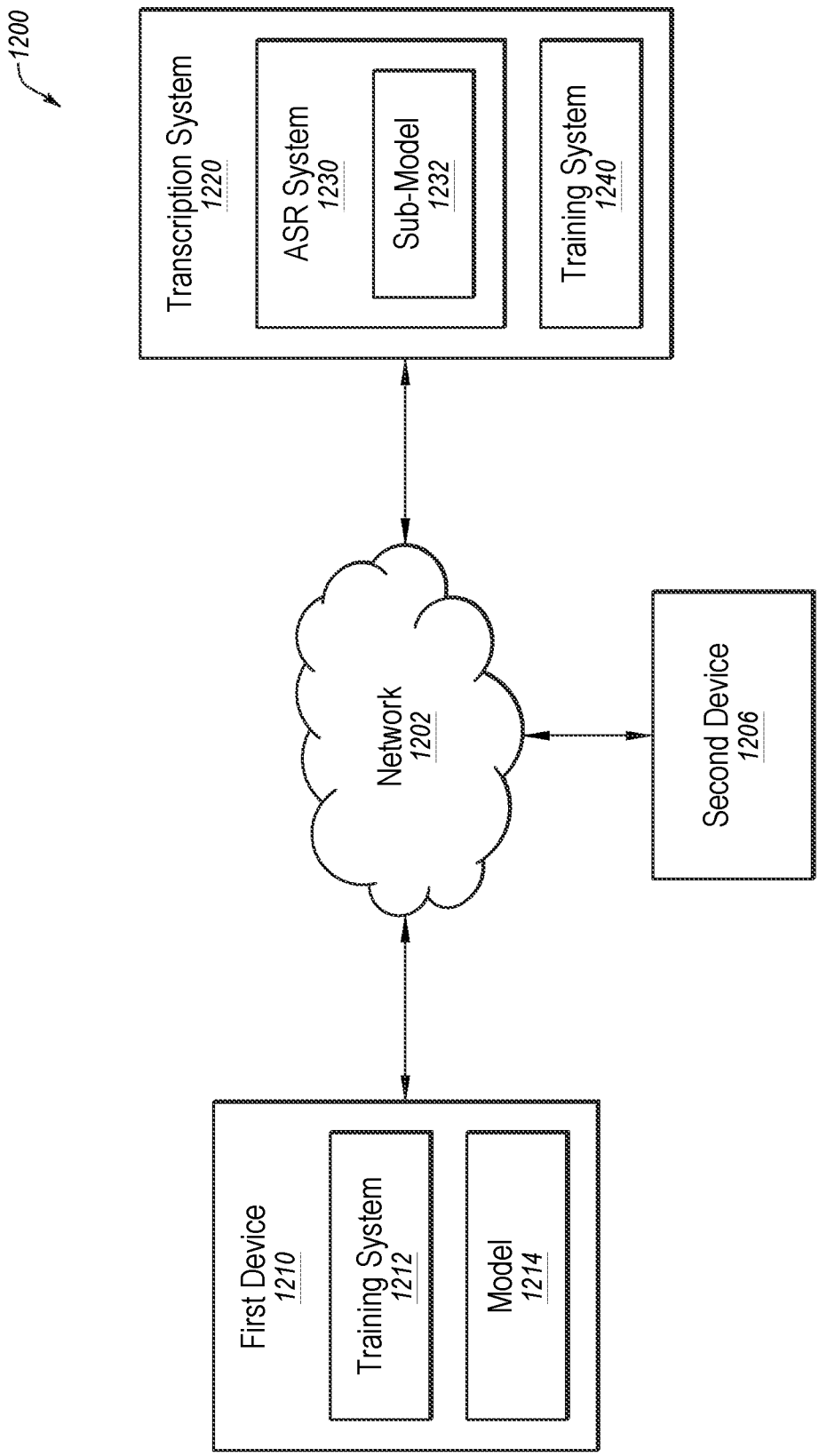
FIG. 12 illustrates another example environment for training ASR models.

FIG. 12 illustrates another example environment 1200 for training ASR models. The environment 1200 may be arranged in accordance with at least one embodiment described in the present disclosure. The environment 1200 may include a network 1202, a first device 1210 that includes a training system 1212 and a model 1214, a second device 1206, and a transcription system 1220 that includes a training system 1240 and an ASR system 1230 that includes a sub-model 1232.

The network 1202, the first device 1210, the second device 1206, and the transcription system 1220 may be similar to the network 102, the first device 104, the second device 106, and the transcription system 120 of FIG. 1, respectively. Thus a general description of these elements is not provided with respect to FIG. 12. Additional description regarding how these elements may be used to train ASR models is described with respect to FIG. 12.

The first device 1210 may be configured to obtain audio during a communication session, such as during a communication session between the first device 1210 and the second device 1206. The first device 1210 may provide the audio to the transcription system 1220 over the network 1202. The first device 1210 may obtain a transcription of the audio from the transcription system 1220.

In some embodiments, the training system 1212 may be configured to obtain the transcription and audio of the communication session. The training system 1212 may be configured to train the model 1214 using the transcription and the audio. For example, the training system 1212 may use various features of the transcription and the audio to train the model 1214. For example, the training system 1212 may use the features described with respect to FIG. 11 to train the model 1214 among other features. In these and other embodiments, the training of the model 1214 may include supervised training where the training system 1212 uses the transcription as the desired output and the features of the audio as the input that results in the desired output.

In some embodiments, the model 1214 may be a deep neural network model or other type of machine learning model that may be trained based on providing parameters and a result. In some embodiments, the model may be a language model or an acoustic model that may be used by an ASR system to transcribe audio. Alternately or additionally, the model may be another type of model used by an ASR system to transcribe audio.

In some embodiments, the training system 1212 may use audio and a transcription from a communication session during the communication session to train the model 1214. In these and other embodiments, the transcription and audio may be deleted after the communication session. Alternately or additionally, the training system 1212 may store transcriptions and audio from communication sessions and use the stored transcriptions and audio to train the model 1214. After the model 1214 is trained, the first device 1210 may be configured to provide the model 1214 to the transcription system 1220.

The training system 1240 may obtain the model 1214 from the first device 1210. In some embodiments, the training system 1240 may use the model 1214 to generate the sub-model 1232. In these and other embodiments, the training system 1240 may be configured to use audio data to train the sub-model 1232 using the model 1214. In these and other embodiments, the audio may be audio obtained from communication sessions that are provided to the transcription system 1220 for transcription. Alternately or additionally, the audio may be pre-recorded from a database. Alternately or additionally, the audio may be copies of audio stored on devices, such as the first device 1210. Alternately or additionally, any of the previous type of audio that is augmented may be used for training. In these and other embodiments, augmentation of the audio may be may include speeding up, slowing down, changing the pitch, adding distortion, adding noise, and filtering, which may include boosting and/or attenuating one or more frequency bands, among other types of augmentation.

In some embodiments, the training system 1240 may be configured to use the audio to train the sub-model 1232 using the model 1214 by providing the audio to the model 1214 to output an output. The training system 1240 may use the audio as an input to the model 1214 and the output of the model 1214 in response to obtaining the audio as a training target for the sub-model 1232.

In some embodiments, the training system 1240 may be configured to obtain multiple models from multiple other devices. In these and other embodiments, the multiple other devices may each train a model in a manner analogous to the training of the model 1214 by the first device 1210. In these and other embodiments, the other devices may provide the models to the training system 1240. The training system 1240 may use the other models and the model 1214 to train the sub-model 1232.

For example, the training system 1240 may provide the same audio to the model 1214 and the other models. The training system 1240 may use the outputs of the model 1214 and the other models to train the sub-model 1232. In these and other embodiments, the output of each of the models may be used during a phase of the training of the sub-model 1232. The outputs of the models may be cycled through to train the sub-model 1232. The outputs may be cycled through in a particular order, pseudo-randomly, or randomly. As a result, the overall training of the sub-model 1232 may be based on the outputs of each of the models. In these and other embodiments, each of the models may be limited in scope based on the audio and transcriptions used to the train the models. However, the sub-model 1232 may include the attributes of each of the models. As such, the sub-model 1232 may be trained based on a large variety of audio and transcriptions and thus may be a higher quality model than the model 1214 or the other models.

As another example, the training system 1240 may use the outputs of the model 1214 and the other models to train the sub-model 1232 by combining the outputs of the model 1214 and the other models. For example, the outputs of the model 1214 and the other models may be a transcription of the audio provided to the model 1214 and the other models. In these and other embodiments, the training system 1240 may combine the transcriptions through a fusing process as described in this disclosure, to generate a fused transcription. The fused transcription may be used to train the sub-model 1232.

As another example, the training system 1240 may use the outputs of the model 1214 and the other models to train the sub-model 1232 by combining output probabilities of the model 1214 and the other models. For example, each of the models may output a phoneme probability of audio. In these and other embodiments, the training system 1240 may average or otherwise mathematically combine the outputs of the model 1214 and the other models to use during training of the sub-model 1232.

As another example, a first subset of the models obtained from devices may be used to train the sub-model 1232 by cycling through the outputs of the first subset of the models. In these and other embodiments, a second subset of the models obtained from devices may be used to train the sub-model 1232 by combining the transcriptions output by the second subset of the models. Alternately or additionally, a third subset of the models obtained from devices may be used to train the sub-model 1232 by averaging or otherwise mathematically combining outputs of the third subset of the models.

In some embodiments, after training the sub-model 1232, the training system 1240 may provide the sub-model 1232 to the ASR system 1230. The ASR system 1230 may use the sub-model 1232 to generate transcriptions of audio provided from the devices. The transcription system 1220 may provide the transcriptions of the audio to the devices.

In some embodiments, the training system 1240 may also provide the sub-model 1232 and/or a subset of the sub-model 1232 to the devices. In these and other embodiments, the devices may train the sub-model 1232 and/or subset of the sub-model 1232. For example, the first device 1210 may train the sub-model 1232 and/or subset of the sub-model 1232 using the training system 1212 to generate the model 1214. The model 1214 may later be provided to the transcription system 1220 to use to train the sub-model. As a result, the model 1214 and the sub-model 1232 may not be static, but rather dynamic models that are consistently changing based on audio obtained by the first device 1210 and other devices.

Modifications, additions, or omissions may be made to the environment 1200 without departing from the scope of the present disclosure. For example, in some embodiments, the environment 1200 may include multiple other devices that may provide models to the transcription system 1220 for use by the training system 1240.

FIG. 13 illustrates another example environment 1300 for transcription of communications, in accordance with some embodiments of the present disclosure. The environment 1300 may include a transcription system 1314 configured to generate transcriptions of audio by transcribing the audio with an ASR system 1320. The transcription system 1314 may be part of or analogous to one or more of the other transcription systems described in the present disclosure. The audio may also be broadcast to a CA by way of an audio interface 1322. For example, the audio interface 1322 may be configured to broadcast audio to a CA or provide the audio to a device associated with the CA that may broadcast the audio.

In some embodiments, a text editor 1326 may be configured to obtain the transcriptions from the ASR system 1320. The text editor 1326 may also be configured to present the transcriptions to a CA or to provide the transcription to a device for presentation to a CA. The text editor 1326 may obtain inputs from the CA regarding edits to the transcription. The text editor 1326 may be configured to change the transcription to correct the errors.

In some embodiments, the environment 1300 may also be configured with a CA activity monitor 1304. In this and other embodiments disclosed herein where an ASR system may provide transcriptions automatically and where a CA may be aware that the ASR system is running, there is a risk that the CA may stop working or work at a reduced performance level.

In some embodiments, the CA activity monitor 1304 may be configured to monitor the CA for unproductive behavior and advise the CA, the CA's supervisor, or otherwise provide feedback, reports, or alarms so that the behavior may be verified and/or corrected. In some embodiments, the CA activity monitor 1304 may be configured to determine a level of engagement of the CA based on one or more performance parameters that may be monitored by the CA activity monitor 1304.

One or more of the analyzed performance parameters may include the CA correction rate, which may relate to how often the CA corrects (e.g., by typing or any other suitable mechanism) a previously recognized word or phrase. In some embodiments, the CA correction rate may not be measured in instances in which correction by the CA may be difficult or unnecessary. For example, the CA correction rate may be measured only when there is no audio that is to be transcribed being received (e.g., when the person whose speech is being transcribed is not speaking) because this may be when the CA may have time to perform correction without also having to perform revoicing. Additionally or alternatively, the correction rate may not be measured when the CA is actively revoicing. In these or other embodiments, the CA correction rate may be modified or weighted with respect to determining the level of engagement of the CA based on whether the audio is being received and/or the CA is performing revoicing. Analyzing the CA correction rate in light of these different situations may help avoid penalizing the CA for not making corrections in instances in which the CA's attention may be better directed elsewhere.

In these or other embodiments, the level of engagement based on the CA correction rate may be based on a determined revoicing ASR error rate, which may be another example performance parameter. For example, when the determined revoicing ASR error rate is high, the CA correction rate would likely be higher than when the determined revoicing ASR error rate is low. As such, a relationship between the CA correction rate and the determined revoicing ASR error rate may indicate the level of engagement.

The determined revoicing ASR error rate may be an estimated error rate and/or an actual error rate of a transcription produced by the ASR transcribing the revoiced speech provided by the CA. The error rate may indicate errors in the transcription with respect to the actual speech in the audio being transcribed. In some embodiments, the determined revoicing ASR error rate may be determined directly by the CA activity monitor 1304 using any suitable technique. Additionally or alternatively, the determined revoicing ASR error rate may be obtained from the ASR system 1320 used to transcribe the revoiced speech that is provided by the CA. Alternately or additionally, the determined revoicing ASR error rate may be obtained from a non-revoicing ASR system that is used to transcribe the audio. Alternately or additionally, the determined revoicing ASR error rate may be obtained based on a comparison between the transcription output by the ASR system 1320 and transcription generated by another non-revoicing ASR system. In some embodiments, the determined revoicing ASR error rate may be determined based on an ASR confidence of one the ASR system 1320 and/or the non-revoicing ASR system.

In these or other embodiments, the determined revoicing ASR error rate may be based on a level of difficulty of the speech being transcribed in which the higher the difficulty, the higher the determined revoicing ASR error rate and vice versa. In some embodiments, the level of difficulty may be determined based on the ASR confidence of one or more of the used ASRs of the ASR system 1320. Alternately or additionally, the level of difficulty may be determined based on the factors discussed in this disclosure when discussing level of difficulty of audio.

In some embodiments, the actual error rate may be determined by comparing the CA output text to a truth transcript. For example, the CA activity monitor 1304 may periodically place pre-recorded test communication sessions to the CA where the transcription is known and where errors are inserted into the transcription. If the CA fails to correct an acceptable number or percentage of the errors, the CA activity monitor 1304 may signal poor CA performance.

In some embodiments, the performance parameters may include a relationship between the determined revoicing ASR error rate and the correction rate with respect to whether the audio is being received and/or the CA is performing revoicing. For example, instances in which the correction rate is low, there is currently no reception of audio to transcribe, and the determined revoicing ASR error rate is high, may indicate a low level of engagement by the CA.

In these or other embodiments, the performance parameters may include a relationship between whether audio that is to be transcribed is currently being received and whether the CA is speaking. For example, when audio that is to be transcribed is currently being received, the CA typically would be revoicing the speech of such audio. Instances in which the CA is not revoicing the speech of the audio may indicate a lower level of engagement than instances in which the CA is revoicing the speech of the audio.

In some embodiments, a determination as to whether the CA is revoicing the speech of the audio may be made based on a comparison between energy levels of audio obtained by the transcription system 1314 and the energy of audio produced by the CA in relation to revoicing, which may be captured by a microphone into which the CA may speak for revoicing purposes. In some embodiments, in performing the comparison, the energy of the audio obtained by the transcription system 1314 may be delayed by a particular amount of time (e.g., 1 to 2 seconds) to compensate for a potential lag between when audio is obtained by the transcription system 1314 and the CA begins revoicing of the audio.

The performance parameters may also include one or more comparisons between transcriptions generated from revoicing ASR systems ("revoicing transcriptions") and transcriptions generated by non-revoicing ASR systems ("non-revoicing transcriptions.") For example, the number of differences between the revoicing transcriptions and the non-revoicing transcriptions may be counted and used to determine an agreement rate. In another example, the revoicing transcriptions and the non-revoicing transcriptions may be aligned and comparisons may be made as to instances in which the revoicing transcriptions is blank but the non-revoicing transcriptions includes a word or vice versa. In these or other embodiments, the number of such instances may be counted over a period of time to determine performance parameters such as blanks over a unit of time or over a number of words. These differences between the revoicing transcriptions and the non-revoicing transcriptions may indicate the level of engagement of the CA in which a higher rate of differences and/or a higher rate of blanks may indicate a lower level of CA engagement.

The performance parameters may also include a relationship between the determined revoicing ASR error rate and a non-revoicing ASR error rate. The relationship may provide a measure of CA performance in light of difficulty. For example, if the non-revoicing ASR error rate and the revoicing ASR error rate have a direct correlation, the likelihood that the CA is not sufficiently engaged may be lower than if the non-revoicing ASR error rate and the revoicing ASR error rate do not correlate as well. The level of correlation may thus provide a level of comparative performance. This measurement may thus give a measure of CA performance in light of difficulty of the task—e.g., when the task is easy (e.g., as indicated by a low non-revoicing ASR error rate) and the revoicing ASR error rate is comparable, less leniency may be allowed than when the task is difficult. In some instances, the relationship between the revoicing ASR error rate and the non-revoicing ASR error rate may include the revoicing ASR error rate minus the non-revoicing ASR error rate or the revoicing ASR error rate divided by the non-revoicing ASR error rate, or any other suitable relationship.

The performance parameters may include a relationship between the CA's current performance (e.g., as indicated by the determined revoicing ASR error rate) and the CA's historical performance and/or experience level. For example, a CA with more experience and/or higher skill levels may be scored differently than a CA with less experience and/or lower skills. Further, a current CA performance indicator that negatively deviates from the historical performance indicator may indicate a lower level of engagement. In some instances, the relationship between the current CA performance marker (e.g., current revoicing ASR error rate) and the historical CA performance marker (e.g., historical revoicing ASR error rate) may include the current CA performance marker minus the historical CA performance marker, or the current CA performance marker divided by the historical CA performance marker, or any other suitable relationship. Multiple performance parameters may be combined, as in averaged, input to a linear or non-linear classifier, etc., and used to indicate a lower level of CA engagement.

In some embodiments, the CA activity monitor 1304 may be configured to cause presentation of feedback to the CA (e.g., to cause presentation on a display viewed by the CA) during or after a communication session. The feedback may relate to one or more of the performance parameters in some embodiments. Some examples of feedback may include the determined revoicing ASR accuracy (e.g., as indicated by determined error rate) and the determined revoicing ASR accuracy over a period of time (the past hour, that week, etc.). Other examples of feedback may include the determined accuracy and the accuracy of one or more references. The reference(s) may include: the revoicing ASR's historical accuracy (all-time average, past 30 days, that week, that day, etc.); the accuracy of other revoicing ASRs in the network or in the center; a target accuracy goal set by the CA's management; and a target or expected accuracy given the communication session difficulty and/or CA skill level.

Other examples of feedback may include a relationship between the determined revoicing ASR accuracy and a particular reference accuracy. For example, if the revoicing ASR scored 88% and the reference is 85%, the display may present "+3%" or "You are 3% over par" (where "par" is the expected accuracy for that call). In another example, the CA activity monitor 1304 may interpret the revoicing ASR accuracy (and optionally reference accuracy) and cause the display to express the result in words, as in, "That was your best call today!" or "You're in the top 5% for your team this week" or "Congratulations, you've earned a prize/gift certificate/bonus/extra break/time off/food item/ . . . ."

Other examples of feedback may include the CA activity monitor 1304 may convert the CA score into a graphical format such as a speed dial, graphical status indicator such as a flashing light or performance history plot, performance thermometer, rating on a five-star scale, emoticons such as smiley or frowning faces, animated GIFs, bar charts, pie charts, or videos such as fireworks, a parade, or audience applause. Other examples of feedback may include the CA activity monitor 1304 may cause presentation of an alert (e.g., an audible and/or visual signal) in instances in which the level of engagement of the CA is flagged as being below a particular level (e.g., the CA is flagged as being potentially distracted based on one or more of the performance parameters not satisfying a particular threshold).

In some embodiments, the CA activity monitor 1304 may cause feedback to be provided to the CA's manager. For example, the feedback may be in the form of dashboards (live status displays) or reports (periodic compilation of performance data), graphical status indicators, or alerts (when performance is flagging). The feedback may provide performance of multiple CAs, shown simultaneously.

Additionally or alternatively, if a problem is suspected (e.g., one or more of the performance parameters do not satisfy a particular threshold), the manager may be bridged onto the communication session handled by the CA's (e.g., by the CA activity monitor 1304 or any other suitable system, module, or device) to allow the manager to monitor what is happening.

An interface available to the manager may enable the manager to send the CA a custom message, select a canned message, and/or (especially if there is a pattern of behavior) provide an award or penalty to the CA. If the communication session is a test communication session, the CA's audio, keystrokes, transcripts, corrections, feedback from the CA activity monitor 1304, etc., and/or other events may be recorded for analysis, training the CA, and/or training the CA activity monitor 1304 for better accuracy.

Feedback may also be used to populate a dashboard, leaderboard, employee of the day/week display, or other public readout that provides recognition of the CA's performance. The feedback may promote a higher level of engagement by the CA's to help reduce CA distraction.

Additionally or alternatively, the CA activity monitor 1304 may reduce CA distraction by detecting, reporting, closing, disabling, minimizing, pausing, or hiding software applications (browsers, games, media players, communication programs) other than a CA client application that may be used for revoicing (e.g., CaptionNet) when a communication session is in progress. Between communication sessions, the CA may be allowed to watch videos, check email, play games, surf the net, etc., but such applications may be suspended during a communication session. After a communication session ends, the applications may resume, remembering their previous state.

Modifications, additions, or omissions may be made to FIG. 13 without departing from the scope of the present disclosure. For example, the transcription system 1314 may perform more or fewer operations than those described. For example, the transcription system 1314 may perform one or more operations related to monitoring, reporting, and/or improving CA engagement that are described in U.S. patent application Ser. No. 16/209,524. Further, the transcription system 1314 may include more or fewer components than those specifically described. In addition, the delineation of different operations performed by different components as described with respect to FIG. 13 is merely to aid in understanding of the concepts described and is not meant to be limiting.

As another example, performance of CAs and/or ASR systems may be compared. In these and other embodiments, audio of a communication session may be obtained. A reference transcription may be generated of the audio using an ASR system, such as a revoicing ASR system, non-revoicing ASR system, or some combination thereof. In these and other embodiments, the audio may be provided to multiple different ASR systems, such as multiple different revoicing systems that incorporate revoiced audio from different CAs. In these and other embodiments, cameras may be used to monitor the CAs during revoicing of the audio. The transcriptions output by each of the multiple different ASR systems may be compared to the reference transcription to determine a score for each of the multiple different ASR systems. As an example, the concepts disclosed in this paragraph may be integrated with FIG. 49 of U.S. patent application Ser. No. 16/209,524.

FIG. 14 illustrates another example environment 1400 for transcription of communications. The environment 1400 may be arranged in accordance with at least one embodiment described in the present disclosure. The environment 1400 may include an ASR system 1420 configured to generate transcriptions of audio 1406 that may be stored in a data storage 1404 in a corresponding audio file. Reference to the audio 1406 may include reference to the sounds of the audio 1406 and/or the corresponding audio file. In some embodiments, the ASR system 1420 may be part of or analogous to one or more of the other ASR systems described in the present disclosure. The ASR system 1420 may use revoiced audio and non-revoiced audio to generate a transcription.

In some embodiments, the audio 1406 may be broadcast to a CA by way of an audio interface 1422 that may obtain the audio 1406 from the data storage 1404 or some other component of the environment 1400 that is not explicitly illustrated. For example, the audio interface 1422 may be configured to broadcast the audio 1406 to a CA or provide the audio 1406 to a device associated with the CA that may broadcast the audio.

In some embodiments, the CA may revoice the audio 1406 by speaking into a microphone, which may capture the revoiced audio. The captured audio may be obtained by a CA input interface 1424 that may provide the revoiced audio to the ASR system 1420. The ASR system 1420 may generate a transcript of the revoiced audio.

The CA input interface 1424 may include any suitable system, apparatus, device, and/or software routine, etc., that may be configured to perform operations related to providing revoiced audio to the ASR system 1420 and/or controlling the presentation of the audio 1406 by the audio interface 1422.

In some embodiments, the environment 1400 may be configured to perform operations related to offline revoicing. Offline revoicing may include the revoicing of audio that has been previously captured or created and that is stored for at least a certain amount of time. For example, the audio 1406 may be stored in the data storage 1404 and may have been previously created in that the audio 1406 may not be merely streamed in real time in a transitory manner. The amount of time between the creation of the audio 1406 and the storage of the audio 1406 may vary. For example, the audio 1406 may be part of a currently occurring communication session and may also be stored concurrently for offline use. In some embodiments, the "offline" use of the audio 1406 may merely be a delayed use of the audio 1406 as compared to the creation and capturing of the audio 1406. For example, offline use of the audio 1406 may be performed a matter of minutes or even seconds after the creation of the audio 1406. As such, offline use of the audio 1406 may occur in instances in which a communication session from which the audio 1406 is derived is still being conducted. The storage of the audio 1406 may be permanent or for a certain amount of time that may range from seconds, minutes, days, weeks, months, years, etc.

The CA input interface 1424 may be configured to perform one or more operations that may be related to offline revoicing. For example, if the CA stops speaking, the CA input interface 1424 may be configured to direct the audio interface 1422 to pause presentation of the audio 1406. In these or other embodiments, the CA input interface 1424 may be configured to cause the audio interface 1422 to resume presentation of the audio 1406 in response to a resume operation performed by the CA. By way of example, the resume operation may include when the CA begins speaking, or when the CA indicates that he/she is ready to proceed via a foot pedal, switch, mouse click, keyboard press, etc. In some embodiments, the CA input interface 1424 may cause presentation of the audio 1406 to resume at the point where the CA stopped speaking (or where revoicing ASR text generation stopped), even if subsequent audio (e.g., audio after the point) was presented to the CA before the pause.

In some embodiments, the point where the audio 1406 resumes may be determined by aligning a transcription generated by another ASR system from the audio 1406 to the transcription from revoiced audio generated by the ASR system 1420. Based on the alignment, a location in the audio 1406 may be determined that corresponds to the last transcription generated by the ASR system 1420 based on the revoiced audio.

Additionally or alternatively, the point where audio 1406 resumes may be determined by aligning the audio 1406 to the revoiced audio of the audio 1406. For example, the point where the CA stopped speaking may be marked and mapped to that point to the corresponding point in the audio 1406.

In these or other embodiments, the CA input interface 1424 may be configured to detect and mark the point where the CA stopped speaking by detecting that revoiced audio provided to the CA input interface 1424 has stopped and/or by detecting that the ASR system 1420 has stopped providing text associated with revoicing of the audio 1406. Additionally or alternatively, the CA input interface 1424 may be configured to detect and mark the point even though the audio interface 1422 may continue presenting the audio 1406. In some embodiments, the CA input interface 1424 may perform one or more operations related to detecting that the CA has stopped speaking as described in U.S. patent application Ser. No. 16/209,524.

In some embodiments, the environment 1400 may include an audio processor 1426 configured to perform one or more processing operations with respect to the audio 1406. The audio processor 1426 may include any suitable system, apparatus, device, and/or software routine, etc., that may be configured to perform operations related to performing the processing operations with respect to the audio 1406.

In some embodiments, the processing operations may include removing silence gaps in the audio 1406 before the audio 1406 is presented by the audio interface 1422. The detection of silence gaps may use energy detectors and/or an ASR system, such as the ASR system 1420. For example, an ASR system may transcribe the audio 1406 before the audio 1406 is presented to a CA. The ASR system may generate timing for endpoints for the words recognized corresponding to where the words begin and end in the audio 1406. Sections of the audio 1406 that do not correspond to words recognized by the ASR system may be considered less likely to include words to be transcribed. Based on this determination, the audio processor 1426 may determine where speech occurs in the audio 1406 in some embodiments. Additionally or alternatively, the audio processor 1426 may use energy detection of the audio 1406 to identify non-speech portions of the audio 1406. In these or other embodiments, the audio processor 1426 may be configured to remove the non-speech portions before the audio 1406 is presented to the CA.

In some embodiments, the audio processor 1426 may be configured to detect that the audio 1406 pertains to a particular topic. In these or other embodiments, the audio processor 1426 may load a topic-specific language model into the ASR system 1420 such that the ASR system 1402 may perform transcription operations based on the particular topic and words and phrases associated therewith.

In some embodiments, the audio processing operations of the audio processor 1426 may include causing transcription and/or analysis of part or all of the audio 1406 using a first ASR system different from the ASR system 1420. In these or other embodiments, the transcription and/or analysis may be used to identify the specific topic and corresponding language model for the ASR system 1420. In some embodiments, using all of the audio 1406 to determine the particular topic and/or language model may be more accurate than using only a portion of the audio 1406.

The processing operations may also include providing the audio 1406 (e.g., as revoiced by the CA and/or directly provided to the ASR system 1420) to the ASR system 1420 that is configured for the corresponding language model and topic. In these or other embodiments, a first output of the ASR system 1420 that is based on the revoiced audio and a second output of the ASR system 1420 that is based on direct use of the audio 1406 may be fused together as described in disclosure.

In some embodiments, the environment may cause generation of a prototype transcription of the audio 1406 using the ASR system 1420 prior to providing the audio to the CA. In these or other embodiments, the prototype transcription may be presented to the CA as the CA revoices the audio 1406. Additionally or alternatively, a lattice related to words of the audio 1406 may be generated prior to providing the audio to the CA. In these or other embodiments, the lattice and/or the prototype transcription may be provided to the ASR system 1420 that is being used with respect to the revoicing of the audio 1406, which may prime the ASR system 1420 to better tune the ASR system 1420 for transcription of the revoiced audio. Priming the ASR system 1420 in this manner may help the ASR system 1420 transcribe the audio faster, use less CPU time, and/or be more accurate. Further, in response to the CA seeing words appear on the screen more quickly because of the ASR system 1420 performing the transcriptions faster, the CA may then be able to more readily detect and correct errors.

Modifications, additions, or omissions may be made to FIG. 14 without departing from the scope of the present disclosure. For example, the environment 1400 may include more or fewer components than those specifically described. In addition, the delineation of different operations performed by different components as described with respect to FIG. 14 is merely to aid in understanding of the concepts described and is not meant to be limiting. For example, two or more of the audio interfaces 1422, the CA input interface 1424, the ASR system 1420, and/or the audio processor 1426 and associated operations may be performed by the same component. Further, reference to a particular component performing a particular operation may include one or more operations performed by one or more other components as directed by the particular component with respect to performing the particular operation. Additionally, although the environment 1400 is described in the context of a CA, one or more of the operations may apply to any number of other transcribing situations and are not limited to those only within the context of a CA.

FIG. 15 illustrates an example environment 1500 to filter audio. The environment 1500 may be arranged in accordance with at least one embodiment described in the present disclosure. The environment 1500 may include an interference processor 1524 configured to filter out interference 1510 from audio 1506 to generate filtered audio 1512.

The interference processor 1524 may include any suitable system, apparatus, device, and/or software routine, etc., that may be configured to perform operations related to performing the filtering operations with respect to the audio 1506. In some embodiments, the interference processor 1524 may be part of a transcription system such as the transcription system 120 of FIG. 1 or any of the transcription systems described in this disclosure.

In some embodiments, the interference 1510 may include audio of public media such as a radio broadcast, television broadcast, podcast, Internet video (e.g., YouTube® video), music, etc. The audio 1506 may also include speech 1508 in some embodiments. Further, the audio 1506 may include the interference 1510 that may interfere with discerning the speech 1508.

For example, the audio 1506 may be audio captured by a microphone of a telephone during a communication session. During the communication session, the interference 1510 may make it more difficult to hear the speech 1508 of a participant in the communication session. As indicated above, in some embodiments, the audio 1506 may be provided to a transcription system that may transcribe the speech 1508. The interference processor 1524 may remove at least a portion of the interference 1510 such that the speech 1508 is easier to hear by the other participant in the communication session and/or easier to be processed by the transcription system. The operations and use of the interference processor 1524 are not limited to such a scenario.

The interference processor 1524 may be configured to identify the interference 1510 and then remove the identified interference 1510 from the audio 1506 to generate the filtered audio 1512. The filtered audio 1512 in some embodiments may thus include the speech 1508 but not the interference 1510.

As indicated above, in some embodiments, the interference 1510 may include public media and the interference processor 1524 may be configured to identify the interference 1510 based on the interference 1510 including public media. For example, in some embodiments, the interference processor 1524 may store an archive of public media such as broadcast media and/or other audio recordings. As indicated above, the public media may include commercial music and other audio recordings, radio and TV broadcasts, movies, YouTube® videos and other media available on the Internet, podcasts, and other broadcast media. The interference processor 1524 may search the available recordings to find one that matches an audio signal of the audio 1506. Matching audio may be identified as the interference 1510.

Additionally or alternatively, the interference processor 1524 may be configured to compare the audio 1506 against audio of live broadcasts. For example, the interference processor 1524 may be configured to monitor live broadcasts and compare the audio from the monitored broadcasts to the audio 1506 to determine whether the audio 1506 includes the live broadcast audio as interference 1510.

In these or other embodiments, the interference processor 1524 may create a copy of the interference 1510 from the archived public media. For example, the interference processor 1524 may include an adaptive filter 1526 that may be configured to apply one or more processing adjustments, such as frequency-dependent amplification, time delay adjustment, phase shifting, nonlinear distortion, and/or other processing adjustments to the identified public media that corresponds to the interference 1510. By applying processing adjustments, the adapter filter 1526 may create a copy of the interference 1510 that matches or closely matches the version of the interference 1510 as included in the audio 1506 received by the interference processor 1524. The copy of the interference 1510 may be obtained from the archive of public media or may be a stream of the live broadcast of the public media. In some embodiments, the stream of the live broadcast may be delayed to match the live broadcast timing with that of the interference 1510 as obtained by the interference processor 1524.

In some embodiments, the adaptive filter 1526 may be configured to provide the copy of the interference to a subtractor 1528. The subtractor 1528 may also be configured to receive the audio 1506. The subtractor 1528 may be configured to perform any applicable operation on the audio 1506 based on the copy of the interference 1510 to remove the interference 1510 from the audio 1506. For example, the subtractor 1528 may be configured to subtract the copy of the interference 1510 as obtained from the adaptive filter 1526 from the audio 1506 to remove at least a portion of the interference 1510 from the audio 1506 to generate the filtered audio 1512.

Modifications, additions, or omissions may be made to FIG. 15 without departing from the scope of the present disclosure. For example, the environment 1500 may include more or fewer components than those specifically described. In addition, the delineation of different operations performed by different components as described with respect to FIG. 15 is merely to aid in understanding of the concepts described and is not meant to be limiting. Additionally, although the environment 1500 is described in the context of removing public media from audio that also includes speech, one or more of the operations may apply to any number of other situations in which identifying and removing a certain type of public media from audio may be performed.

FIG. 16 illustrates an example environment 1600 for obtaining transcriptions. The environment 1600 may be arranged in accordance with at least one embodiment described in the present disclosure. The environment 1600 may include a first ASR system 1610a, a second ASR system 1610b, a third ASR system 1610c, and a fourth ASR system 1610d, referred to collectively as ASR systems 1610, a fuser system 1620, and a data storage 1630 that includes a dictionary 1632.

Each of the ASR systems 1610 may be configured to generate transcriptions from audio. For example, each of the ASR systems 1610 may include a different ASR system configuration as explained with respect to FIG. 1. Alternately or additionally, one or more of the ASR systems 1610 may include similar configurations. Each of the ASR systems 1610 may provide transcriptions to the fuser system 1620. In these and other embodiments, each of the ASR systems 1610 may provide partial text strings and final text strings to the fuser system 1620.

The fuser system 1620 may be configured to align the text strings from the ASR systems 1610. After aligning the text strings, the fuser system 1620 may select a word from the text strings for each position of words in the text strings for inclusion in a final transcription output by the fuser system 1620. Discussion regarding selection among the words and operations of a fuser system are further provided in U.S. patent application Ser. No. 16/209,524.

In some embodiments, aligning the words in the text strings may be computationally intensive. In some embodiments, the fuser system 1620 may be configured to convert each word of the text strings obtained from the ASR systems 1610 to an index value. In these and other embodiments, each instance of the same word may be converted to the same index value. For example, all instances of the word "the" may be converted to the index value of 22.

In some embodiments, the data storage 1630 may be configured to store a dictionary 1632 that may include words and the index values corresponding to each of the words. In some embodiments, the dictionary may include words and index values before audio is provided to the ASR systems 1610. Alternately or additionally, the words and index values may be created as words are encountered in the text strings generated by the ASR systems 1610. In these and other embodiments, the words and index values may be newly created in the dictionary 1632 for each different audio session. For example, one audio session may result from a single communication session. Alternately or additionally, multiple communication sessions may be an audio session, among other configurations.

During operation, when the fuser system 1620 obtains a word from a text string, the fuser system 1620 may search the dictionary 1632 for the word. When the word is found, an index value associated with the word is obtained and placed in the location of the word in an index value string. When the word is not found, the word is added to the dictionary 1632 and assigned an index value. In some embodiments, the index value may be obtained through a hashing function. Alternatively or additionally, the index value may be determined by converting letters to a number. For example, each character may be converted to a numeric value (e.g., a cipher such as a=1, b=2, . . . ) and the series of numeric values may be concatenated (e.g., "one"=15 & 14 & 5=151405). Alternately or additionally, the index value may be the next value in a sequence. For example, the first word in the dictionary may have a corresponding index value of zero, the second word may have a corresponding index value of one, the third word may have a corresponding index value of two, etc.

After substituting each word for the corresponding index value, the strings of indexes values may be compared to align the strings of indexes values. Further methods for aligning text strings that may be performed by the fuser system 1620 are described with respect to FIGS. 17 and 18. Alternately or additionally, an exhaustive search or quantum computer may be used to align the words in the text strings. Alternately or additionally, other methods may be used to align the words in the text strings.

After alignment of the strings of index values, a word for each position of the strings of index values may be selected for the final transcription. In some embodiments, before the alignment of the words, the word may be denormalized. For example, the word "can't" may be denormalized to the word "cannot' to allow for comparison between the words for the selection of the word for the final transcription. In these and other embodiments, a regular expression script may be used to normalize/denormalize numeric text. For example, an entry in the regular expression script may specify that the "00" in [0-9]00" maps to "hundred" so that "800" is rendered as "eight hundred." Alternately or additionally, rules may be encoded in software to perform the normalize/denormalize numeric text.

In some embodiments, a word may be selected based on a voting process for the word. For example, for a given positions of the strings of index values, the words from the ASR systems 1610 may be compared. Each word may receive a vote. If two of the words from the ASR systems 1610 are the same, then that word receives two votes. The word with the most votes may be selected. In case of a tie, the fuser system 1620 may look at various features to select a word.

In some embodiments, the fuser system 1620 may be configured to weight the votes. For example, the fuser system 1620 may weight words from one of the ASR systems 1610 more than another of the ASR systems 1610. As a result, a word from one of the ASR systems 1610 that does not match any of the other words may be selected. Alternately or additionally, ties between the outputs of the ASR systems 1610 are less likely to occur.

In some embodiments, the fuser system 1620 may weight the votes based on an estimated accuracy of the ASR systems 1610. For example, if three of the ASR systems 1610 output the words "car," "far," and "cot," respectively, and the ASR system 1610 rendering "far" is estimated to have higher accuracy, then "far" may be selected and output.

The similarity between the ASR systems 1610 may also affect how the votes are weighted. Similarity between the ASR systems 1610 may be measured, for example, in terms of how correlated the outputs of the ASR systems 1610 are using a correlation coefficient or correlation matrix. Additionally or alternatively, similarity may be measured by transcribing audio with the ASR systems 1610 and measuring the agreement rate between each pair of the ASR systems 1610. In these and other embodiments, ASR systems 1610 that output the same hypothesis may, as a group, receive less weight if the ASR systems 1610 have a tendency towards similar behavior.

As an example, the first ASR system 1610*a* and the second ASR system 1610*b* may be determined to be similar and the third ASR system 1610*c* and the fourth ASR system 1610*d* may be determined to be dissimilar. In this example, the first ASR system 1610*a* and the second ASR system 1610*b* may output the word "car" and the third ASR system 1610*c* and the fourth ASR system 1610*d* may output the word "far." Based on the dissimilarity of the third ASR system 1610*c* and the fourth ASR system 1610*d*, the outputs of the third ASR system 1610*c* and the fourth ASR system 1610*d* may receive a full vote. Alternately or additionally, based on the similarity of the first ASR system 1610*a* and the second ASR system 1610*b*, the outputs of the first ASR system 1610*a* and the second ASR system 1610*b* may be weighted to receive a partial vote. Thus, the fuser system 1620 may select the word "far."

In some embodiments, the outputs of the ASR systems 1610 may be weighted based on both accuracy and similarity. For example, let w1, w2, w3, and w4 be the weights for the ASR systems 1610, respectively. Let Sab be the similarity (such as a correlation coefficient) between transcriptions (T) from two ASR systems Ta and Tb, where a may be any one of the first ASR systems 1610 and b may be another one of the first ASR systems 1610. Let z1, z2, z3, and z4 be the accuracy scores of for first-fourth ASR systems 1610, respectively. The weights for each of the ASR systems 1610 may be assigned based on the following equations:

$$w1 = z1 - k*(S12 + S13 + S14).$$

$$w2 = z2 - k*(S21 + S23 + S24).$$

$$w3 = z3 - k*(S31 + S32 + S34).$$

$$w4 = z4 - k*(S41 + S42 + S43).$$

The above equations assign an ASR system 1610 points for accuracy but take away points if the ASR system 1610 is correlated with any of the other ASR systems 1610. In these and other embodiment, the variable k may be a scaling factor that balances the effect of accuracy against similarity and may be chosen to maximize the accuracy of the fused output.

Along with the accuracy and similarity, one or more features may be considered when selecting a word for each position of the strings of the index value for inclusion in a final transcription. Examples of some features are included in tables 2 and 5 of U.S. patent application Ser. No. 16/209,524. Additionally, U.S. patent application Ser. No. 16/209,524 describes various methods regarding how the selection of words may occur. In these and other embodiments, the features may be provided to a machine learning model, such as a classifier, to select a word.

In addition to the features described in tables 2 and 5, additional features may be considered with respect to the partial text strings and the final text strings generated by the ASR systems 1610. For example, per-word agreement between the partial text stings and the final text strings may be a feature. Agreement between the partial text stings and the final text strings may indicate that a word or phrase is likely to be correct. For example, agreement between a partial text string from the first ASR system 1610a and a final text string from the second ASR system 1610b which may be generating the text strings faster than the first ASR system 1610a. In these and other embodiments, in response to a partial text sting and a final text string agreeing, the fuser system 1620 may select the words for the final transcription output by the fuser system 1620 or use the agreement as a feature input to a classifier model in the fuser system 1620 used to select between words in the text strings of the ASR systems 1610. As another feature, partial text strings that maintain constant over a particular number of additional partial text strings or that maintain constant for a period of time may be indicate as having higher confidence, which may be a feature in selecting the words for the final transcription. Alternately or additionally, the confidence of partial ASR results and confidence of final ASR results may each be considered as features.

In some embodiments, the amount of time between a partial text string and a subsequent partial text string or between a partial text string and a final text string may be a feature. For example, if a partial text early and final text string agree and a large amount of time or a number of words, syllables, or characters has been generated between the two results, then confidence in the final text string may be higher.

In some embodiments, a feature may be an ASR confidence that may be defined based on features extracted from a decoding lattice. The lattice may take any of multiple forms, such as a full lattice, a pruned lattice, a word confusion network, etc. For example, a likelihood of the best path may be extracted from the decoding lattice and used as an estimate for ASR confidence. Alternately or additionally, a likelihood of a competing hypothesis through the lattice may be extracted, where the competing hypothesis is the second-best path that has no arcs in common with the best path. Equivalently, the best path may be removed from the lattice and the best remaining path may be used as a competing hypothesis. ASR confidence may then be estimated from the difference between or ratio of the likelihood determined for the best path and the competing hypothesis. Alternately or additionally, the total likelihood of all possible (or multiple) paths through the lattice may be totaled and used as a competing hypothesis. Finding and summing all possible paths may use a large amount of processing, but the total may be efficiently determined using dynamic programming techniques such as the Viterbi or Dijkstra methods. These features may be used to determine an ASR confidence.

In some embodiments, an agreement rate may be a feature considered when selecting between words. An agreement rate may indicate how often text from one of the ASR systems 1610 agrees with text from another of the ASR systems 1610. In some embodiments, an agreement rate may therefore be averaged over an interval such as (a) since the beginning of the communication session, (b) over the past amount of time such as over the past 15 seconds, (c) over the past number of words, or (d) a weighted average over a selected interval. An example of a weighted average may be to weight more recent word agreements more than previous word agreements.

In some embodiments, an agreement rate that may be considered may be an agreement rate between sub-word units, such as phonemes. In these and other embodiments, one or more of the ASR systems 1610 may generate phoneme strings instead of words. Alternately or additionally, phoneme strings may be obtained from the words output by the ASR systems 1610. In these and other embodiments, the phoneme strings may be aligned and an agreement rate between the phoneme strings may be determined. For example, the audio may include the words "I want ice cream." The first ASR system 1610a may transcribe the audio into a first phoneme string (using IPA symbols) "/I/ /w/ /a/ /n/ /t/ /I/ /s/ /k/ /r/ /i:/ /m/" and the second ASR system 1610b may transcribe the audio into a second phoneme string "/I/ /w/ /a/ /n/ /t/ /I/ /s/ /t/ /r/ /i:/ /m/." In these and other embodiments, the difference between the first and second phoneme strings may be the phoneme "/t/." With one phoneme error out of 11, the agreement rate may be 91 percent.

In some embodiments, an agreement rate may be between more than two of the ASR systems 1610. For example, for the ASR systems 1610 an agreement rate between all pairs of the ASR systems 1610 may be determined. Thus, six agreement rates may be determined. The agreement rates may be used as an only feature or with other features, such as confidence scores from the ASR systems 1610, to select between the words. In these and other embodiments, one or more of the ASR systems 1610 may be different types of ASR systems. For example, the first ASR system 1610a may be a speaker-independent ASR system, the second ASR system 1610b may be a speaker-dependent revoicing ASR system, and the third ASR system 1610c may be a speaker-independent revoicing ASR system 1610. Alternately or additionally, in some embodiments, an agreement rate with an ASR system from which words are not selected for the final transcription may be used as a feature. For example, a fifth ASR system may generate text strings from the audio. The fifth ASR system may not provide the text string to the fuser system 1620 such that the output of the fifth ASR system is not fused or selected for the final transcription. In these and other embodiments, the text strings from the fifth ASR system may be used to break ties in voting in the fuser system 1620, for providing an additional set of agreement rates, for training models, etc.

In some embodiments, the agreement rate may reflect how much the words agree. In these and other embodiments, the number or fraction of letters in common between words may be measured. For example, "stroke" vs. "strike" may be compared to determine how may letters agree using letter comparisons. In this example, the agreement may be ⅚, or about 0.833, since the words differ only by one letter out of six. As another example, the agreement rate may be based on a number of phonemes in common between words. For example, "faster" vs. "master" may differ by one phoneme out of two ("fas-ter" vs. "mas-ter"), so that the phoneme distance may be ½.

As another example, the agreement rate may be based on a similarity of word meanings. Various methods may be used to measure word similarity, including (i) tables that show how similar words are, (ii) embeddings, where words are assigned a number or a vector of numbers characterizing the word and the similarity is the numeric distance, and (iii) groupings, where words are assigned to a category (e.g., color, unit of measure, proper noun, part of speech like nouns and prepositions, etc.) and distances between words are defined as the distance between their respective categories.

As another example, the agreement rate may be based on an acoustic similarity between words. For example, "s" is similar to "z," but "s" is very different from "m." With this measure, "wear" and "where" may be considered relatively similar because the words sound similar. In contrast "wear" may be considered very different from "tear" because the "t" sounds nothing like "w. In these and other embodiments, a spectral distance may be used to measure acoustic similarity. Alternatively, a lookup table may specify the distance between each letter and each other letter. Alternatively, a lookup table may specify the distance between each phoneme and each other phoneme.

As another example, the agreement rate may be based on one or more of the estimates above. For example, using letter agreement, "His stroke won the game" and "His strike won the game" may have an agreement rate of 18/19 averaged over letters (19 total letters with 18 matching) or (4–⅚)/5 averaging over words (4 for the matching words and ⅚ for "stroke" vs. "strike" and dividing by 5 words).

Another feature may include a measure of how accuracy changes during a communication session. For example, an indication that accuracy is dropping over time may be used to indicate CA fatigue. An indication that accuracy is increasing over time may indicate that the ASR system is learning and adapting to the acoustic and language environment of the communication session.

Another feature may include how often the fuser system 1620 selects words from text strings from one of the ASR systems 1610 or how often the words from the text strings from the ASR systems 1610 include the same words in the same locations in the text strings. In these and other embodiments, if one of the ASR systems 1610 is selected more often, outputs of the one of the ASR systems 1610 may be weighted more for selection as compared to the text strings from the other ASR systems 1610.

Another feature may include how often one of the ASR systems 1610 includes a word in a location in a text string and another of the ASR systems 1610 does not include a word. The number of words in a location in a text string from one of the ASR systems 1610 when another of the ASR systems 1610 does not include a word may be divided or compared to the total number of words from text strings of one of the ASR systems 1610 or an average of the total number of words from text strings of the ASR systems 1610.

Other features may involve conditions being experienced by or relating to a CA that may be revoicing audio for a revoicing ASR system. For example, evidence of a CA being distracted may include the CA using other apps or websites during the revoicing process. For example, the CA pressing keys or clicking or moving a mouse within an application other than a revoicing client used to generate the revoiced audio may be evidence of distraction. Other features may include the CA making corrections to the transcription. A system may determine a CA is making corrections based on collecting audio of the CA typing from a microphone. The system may detect timing, frequency, and fraction of the time the CA makes corrections, all of which may be features.

In some embodiments, another feature may include hearing the CA talking with the speech of the CA corresponding to the audio being revoiced. Alternately or additionally, a feature may include a camera capturing an image of the CA talking or texting on a phone.

In some embodiments, another feature may include determining how often the CA misses punctuation in the revoicing. Missing the punctuation may be the result of the speech being fast or otherwise difficult. Alternately or additionally, missing the punctuation may indicate that the CA is less competent or is not carefully performing the revoicing process.

In some embodiments, another feature may include how often a transcription of the revoicing ASR system is corrected or a correction rate of the revoicing ASR system, which may be a reflection of the correction rate of the CA. In these and other embodiments, the correction rate may be computed or normalized several ways. For example, suppose for an interval D (measured in time, words, syllables, or some other period) there is an interval S of silence and another interval T when speech is present. The correction rate R may be the number of corrections (C) per interval such as R=C/D, R=C/S, R=C/T, or R=C/(S+T).

In some embodiments, another feature may be physical characteristics of the CA. For example, stress, cognitive load, or level of attention of a CA. These characteristics may be used to help detect errors or to select portions of a re-voiced transcription for training ASR models. Alternately or additionally, the physical characteristics of the CA may include a CA voice volume, a CA voice pitch, which may be normalized by dividing by the CA's average pitch, the variance or standard deviation of the CA's pitch or volume, a CA pitch range, which may be measured as the highest and lowest pitch produced by the CA, CA hesitations, which may be measured by the number of pauses or the total pause percentage while there is speech for revoicing, CA voice clarity, which may be determined based on the confidence of a speech recognizer listening to the CA voice, and CA lag, which may measure how far behind the CA is with respect to revoicing the audio. In these and other embodiments, a greater time lag may be an indication that the CA is struggling. A CA lag may be determined by comparing the audio and revoiced audio directly or by sending both the audio and revoiced audio through separate ASR systems and comparing timestamps provided by each ASR system.

In some embodiments, the physical characteristics of the CA may further include CA eye motion. For example, if the CA looks up, to the side, away from the screen or if the CA's eyes flutter, this may indicate distraction. The physical characteristics of the CA may further include a CA voice vibrato as disappearance or reduction of the vibrato may indicate stress or a CA blood pressure, galvanic response or other biometric responses indicating stress. The physical characteristics of the CA may further include a CA electroencephalogram (EEG). The CA's brainwaves may indicate that the CA has made a mistake, is under stress, lacks confidence, or is distracted. For example, the presence of alpha waves and theta waves may indicate the CA's level of distraction. Signal patterns from the EEG may also indicate that the CA has just made a mistake and could be used to weight the confidence of the re-voiced transcription.

In some embodiments, when providing an indication regarding a transcription, such as providing scores to a CA as feedback or providing an indication to a manager or to a subscriber, two, three, or more scores may be provided. When three scores are provided, the three scores may include accuracy of a revoicing ASR system, a non-revoicing ASR system, and of a fused transcription, or a combination thereof. An example combination may be revoicing ASR system accuracy divided by non-revoicing ASR system accuracy, which may indicate a performance of a revoicing ASR system with respect to the performance of the non-revoicing ASR system.

In some embodiments, other features may be considered when selecting between words. For example, the other features may include a type/model/version of a device being used during the communication session. Another feature may include whether the user requested a transcription for a current communication and how often transcriptions are requested for previous calls. Another feature may include whether a word is part of partial text string or a final text string. In these and other embodiments, a word that is part of a final text string may be weighted more than a word that is part of a partial text string during a selection process performed by the fuser system 1620.

In some embodiments, another feature may include how long it has been since a word was recognized, such as a time since the word was included in a partial text string. A longer a word goes unchanged, the less likely the word is to change. As such, the confidence on the word may increase.

In some embodiments, another feature may include a spectral phase of the frequency content of the audio being transcribed. The spectral phase may be used to detect the reverberant characteristics of a signal. A speaker in a room with hard walls may produce the same magnitude spectrum as a speaker outside on the lawn, but the phase spectrum may be different.

In some embodiments, another feature may include a prior probability of an ASR system being correct when recognizing a given word in audio. In these and other embodiments, the term "prior" may indicate that the probability is determined without using audio or other evidence from a speaker at the time of recognition. The probability may be expressed as P(correct|S, W), which is the probability that an ASR system S is correct when it recognizes a word W. The probability may be determined by transcribing a training set of speech audio signals and comparing the recognized transcriptions to a set of reference (truth) transcriptions and counting how often the ASR system is correct for individual words. For example, suppose a set of audio files are input to a first ASR system and the word "time" is recognized 1000 times. For those recognitions, the first ASR system is correct 950 times. As such, the prior probability of "time" being correct when recognized by the first ASR system is P(correct|ASR1, "time")=950/1000=0.95.

As an example, suppose the first ASR system 1610a recognizes a word in a given audio stream as "time" and a second ASR system 1610b recognizes the word as "tide." Additionally, suppose P(correct|ASR1, "time")=0.95 and P(correct|ASR2, "tide")=0.90. The fuser system 1620 may weight these probabilities in making a selection and may be more likely to select "time" from the first ASR system 1610a given its higher prior probability.

As another example, the feature may be used in estimating accuracy of a series of words. For example, the first ASR system 1610a may transcribe a series of words, word1, word2, word3, etc. The prior probability P(correct ASR1, word1, word2, word3) for the series of words may be determined from a set of audio files using the process described above for single words. Alternately or additionally, the prior probability of a series of words may be determined from the sum of the prior word probabilities=P(correct|ASR1,word1)+P(correct|ASR1,word2)+P(correct|ASR1,word3)+ . . . . Alternately or additionally, the prior probability may be the product of word probabilities, the sum of log word probabilities, the average of word probabilities, or the average of log word probabilities.

In some embodiments, as an alternative to measuring and storing the prior probability for each word for each ASR system, words may be categorized into groups and the prior probability may be estimated for each group by mathematically combining the prior probabilities for one or more words in the group. For example, words may be clustered into groups of words that sound alike (e.g., "fad," "sad," "sat," "fat" could be a group), words that rhyme, parts of speech (e.g., nouns, prepositions, articles, etc., may each be a group), words that are likely to be misrecognized as each other (e.g., "five" is often confused with "nine"), and words that appear with similar frequencies. Other examples of groups may include words and phrases that belong to a particular domain such as medical, legal, financial, technical, business calls, shopping, making an appointment, planning for a get-together, among other domains. These words and phrases may include terms that are relatively common in the context of the domain but relatively uncommon outside the domain. Groups may include subdomains such as (using the medical domain as an example) drug names, disease names, diagnoses, treatments, procedures, discussing test results, anatomy terms, CPT and other medical coding terms, and medical abbreviations. In these and other embodiments, membership in a group may be used to determine a prior probability, conditional probability or likelihood score of a language model, significance value, accuracy estimate, or other attributes for a word or phrase. Alternately or additionally, group membership may be used as a feature to select an ASR system, to align text strings or to assist in selection of one or more words in a fusion system, to estimate accuracy of an ASR system, to classify a word or conversation, etc. For example, when selecting between words, a fuser may preferentially select medical subdomain words and phrases from an ASR system that performs well with medical terminology over an ASR system that performs less well with medical terminology.

In some embodiments, to compute the prior probability for a given word, groups to which the word belongs may be determined. A prior probability for the word may be estimated based on the group prior probability. In some embodiments, the group prior probability may be determined to be the average prior probability for one or more words in the group.

In some embodiments, another feature may include conditional word entropy given a language model. For example, if the probability of a word 1 occurring, given n preceding words, word 2, word 3, . . . , is P=Probability (word1|word2, word3, . . . ), then one formulation of the conditional word entropy for word 1 may be H=−P*log(P). Entropy for a phrase may be computed by averaging or otherwise combining the entropy for each word across all words in a phrase.

In some embodiments, another feature may be acoustic similarity between audio and revoiced audio. The acoustic similarity may help indicate whether a CA correctly repeated the words in the audio. Acoustic similarity may be measured by determining a spectral difference between audio and revoiced audio. To determine the spectral difference, the audio and revoiced audio may be aligned. The audio and revoiced audio may be aligned by using linear programming to stretch or compress time in one or both audio signals to minimize the spectral difference between the audio and revoiced audio. Alternately or additionally, the audio and revoiced audio may be aligned by aligning the text strings output by speech recognizers, one with the audio as input and the other with and revoiced audio as input, collecting the timestamps for word endpoints from the speech recognizers, and aligning the audio based on the alignment of the recognized text strings and timestamps. Alternately or additionally, the audio and revoiced audio may be aligned based on matching the magnitude spectra of the audio and revoiced audio. Alternately or additionally, the audio and revoiced audio may be aligned based on features, such as MEL cepstral or MFCC features, from the audio and revoiced audio.

After aligning the audio and revoiced audio, the audio and revoiced audio may be compared. The similarity between the aligned audio and revoiced audio may be a feature. The acoustic similarity for a word may be determined by mapping the locations of portions of the audio to corresponding portions of the revoiced audio, according to their alignment, and measuring the spectral distance for each portion. A comparison score indicating a similarity of the audio and revoiced audio for a portion of the audio and revoiced audio that corresponds to each word in the text strings output from the audio and revoiced audio may be assigned to each word. The comparison score of a word may be feature. An example comparison score may be determined as the distance between the MFCC features from a portion of the audio and the MFCC features from a portion of the revoiced audio aligned to the portion of the audio. A comparison score for a word may be the comparison score for all portions of the word averaged together.

As another feature, if a CA makes a correction to a word, the correction may take priority in the fuser system 1620. For example, the fuser system 1620 may not change the correction made by the CA. An indication that a CA made a correction to a word may be another feature. In these and other embodiments, the CA may be configured to use a touch screen or speed-clicking to perform the corrections. In these and other embodiments, CA may not type the correction. Rather, by a CA selecting a word, the word may change the word to an alternate word considered for the location by the fuser system 1620 and/or one or more of the ASR systems 1610. Alternately or additionally, by a CA selecting a word, alternative words may be presented for selection by the CA. The alternative words may be words considered for the location by the fuser system 1620 and/or one or more of the ASR systems 1610. Alternately or additionally, when a CA hovers a cursor over a word, the alternate word may appear, and if the CA clicks on the original or alternate word, the original word may be replaced by the alternate.

In some embodiments, the fuser system 1620 may be configured to not generate a final transcription until receiving text strings from a particular one of the ASR systems 1610. In these and other embodiments, the fuser system 1620 may also be configured to always select at least one word from the particular one of the ASR systems 1610 for the final transcription. For example, the at least one word may be a first word output by the particular one of the ASR systems 1610. In these and other embodiments, the particular one of the ASR systems 1610 may be a revoicing ASR system.

Modifications, additions, or omissions may be made to the environment 1600 without departing from the scope of the present disclosure. For example, in some embodiments, the features discussed with respect to selecting between words by the fuser system 1620 may be used by a transcription system to perform other selection process. For example, the features may be used to select between ASR systems as described with respect to FIG. 21. Alternately or additionally, the features may be used to estimate accuracy of a transcription or difficulty of audio to transcribe, for training ASR models as described with respect to FIGS. 7-12, amongst other uses with respect to embodiments discussed in this disclosure and other disclosures such as embodiments in U.S. patent application Ser. No. 16/209,524.

As another example, in some embodiments, one of the ASR systems 1610 may stop generating text strings. For example, the one of the ASR systems 1610 may suffer a hardware, software, or power issue. Alternately or additionally, the one of the ASR systems 1610 may be a revoicing ASR system and the revoicing of the audio may stop. In these and other embodiments, the fuser system 1620 may change the configuration of the fuser system 1620 to accommodate using fewer ASR systems, such as only using three of the four ASR systems 1610 or whatever number of the ASR systems 1610 that are providing text strings to the fuser system 1620. For example, the fuser system 1620 may use a machine learning model to make a selection of a word from the fuser system 1620. In these and other embodiments, the fuser system 1620 may use a different machine learning model that may be trained for the remaining ASR systems 1610.

As another example, a display of a CA that is revoicing audio for one of the ASR systems 1610 may be configured to present the final transcription generated by the fuser system 1620. In these and other embodiments, when a word generated by the one of the ASR systems 1610 is selected by the fuser system 1620, an indication of the selection of the word may be presented in the display with respect to the final transcription. The indication may be displayed using a change in color, brightness, font, line width, background, or highlighting, among other indications.

As another example, the fuser system 1620 may be configured to address profanity that may be included in the text strings provided to the fuser system 1620 from the ASR systems 1610. For example, if profanity is detected in a text string not generated by a revoicing ASR system, the profanity may be provided to a CA to be checked. Alternately or additionally, if profanity is detected in a text string generated by a revoicing ASR system, the profanity may be accepted.

As an alternative, if one or more text strings at a word location include profanity from one or more of the ASR systems 1610, but one or more text strings of other of the ASR systems 1610 does not include the profanity, the profanity may not be selected by the fuser system 1620. Alternately or additionally, if the ASR system 1610 that includes the profanity is a revoicing ASR system, the profanity may be selected. Alternately or additionally, a word being profanity may be a feature that is considered by the fuser system 1620 during the selection of a word for a final transcription.

As discussed, the text strings that include word sequences that are generated by the ASR systems 1610 may be aligned by the fuser system 1620 before selecting a word for a final transcription. One method for selecting a word is to exhaustively search all possible paths and select the one that minimizes or maximizes a desired criterion. Another method may include using linear programming such as the Viterbi or Dykstra methods to select a word.

In some embodiments, a search may be performed across multi-dimensional space, where each dimension corresponds to one text string from one of the ASR systems 1610. In these and other embodiments, the search may include finding a path through the multi-dimensional space that aligns similar words across the inputs or works to reduce a distance between the words. The method may work by minimizing some cost functions such as edit distance, where edit distance may be the number of insertions, deletions, and substitutions that may be performed to convert the words described in the path to one of the inputs.

Figure 17:
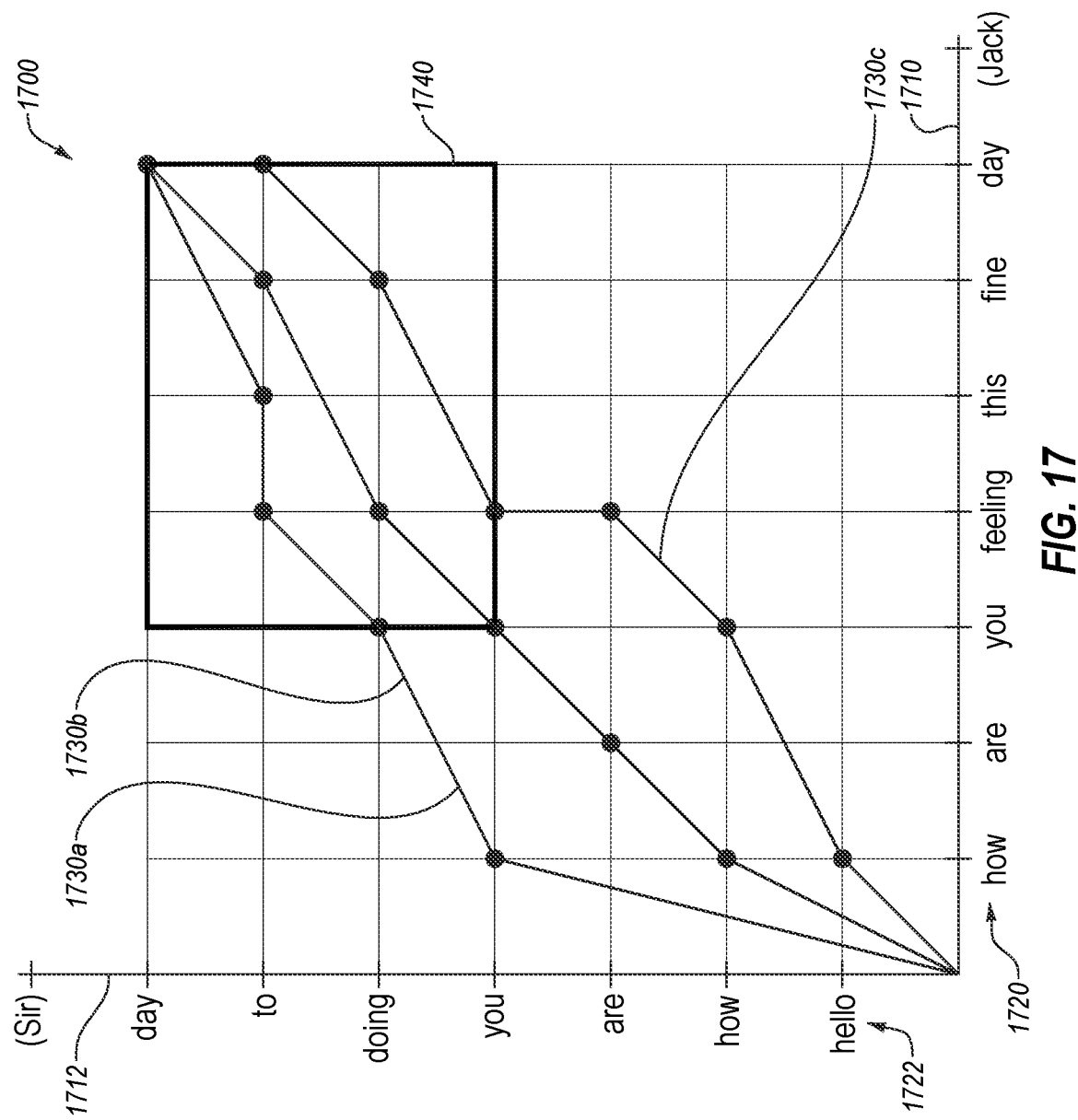
FIG. 17 illustrates an example two-dimensional coordinate system for aligning word sequences.

In some embodiments, a method may perform a search across multi-dimensional space using a sliding window. For example, FIG. 17 illustrates an example two-dimensional coordinate system 1700 for aligning word sequences. The coordinate system 1700 may be arranged in accordance with at least one embodiment described in the present disclosure. The coordinate system 1700 may include a first axis 1710, a second axis 1712, a first word sequence 1720, a second word sequence 1722, a first candidate path 1730a, a second candidate path 1730b, a third candidate path 1730c, referred to collectively as candidate paths 1730, and a sliding window 1740.

The first axis 1710 may include words from the first word sequence 1720 of a first ASR system. The second axis 1712 may include words from the second word sequence 1722 of a second ASR system. Both the first word sequence 1720 and the second word sequence 1722 may be provided to a fuser system. The fuser system may be configured to align the first word sequence 1720 and the second word sequence 1722.

The nodes of the candidate paths 1730 may illustrate candidate alignment of the words in the first word sequence 1720 and the first word sequence 1720. For example, a node at the intersection of "hello" and "how" in the third candidate path 1730c may indicate that in the third candidate path 1730c the words "hello" and "how" are aligned. Alternately or additionally, more than the three candidate paths 1730 are possible. However, only three candidate paths 1730 are illustrated for ease of explanation.

To reduce a number of potential new candidate paths, only those portions of the candidate paths 1730 that are within the sliding window 1740 may change. Portions of the candidate paths 1730 outside of the sliding window 1740 may not be changing. For example, the portions of the candidate paths 1730 outside of the sliding window 1740 may be stable.

As illustrated in FIG. 17, the most recent word obtained from the ASR systems by the fuser system is the word "day." As additional words are output by the ASR systems, edges of the sliding window 1740 may extend. For example, addition of the word "jack" to the first word sequence 1720 may result in the vertical edge of the sliding window 1740 furthest from the origin extending further from the origin. Alternately or additionally, the vertical and horizontal edges of the sliding window 1740 may also move to be further from the origin. As a result, the portions of the candidate paths 1730 that are stable may increase. For example, as illustrated, the sliding window 1740 may have started at the origin and moved upward and out to the current location. The sliding window 1740 may be illustrated as square or rectangular. However, the sliding window 1740 may be another shape, such as a rhombus or a trapezoid.

In some embodiments, a space for the potential candidate paths 1730 may be reduced by collecting timestamps from the ASR systems with respect to the words in the first word sequence 1720 and the second word sequence 1722. In these and other embodiments, the timestamps may be determined by the ASR systems and may indicate a time for the start and/or endpoints of phonemes, words, or phrases in the first word sequence 1720 and the second word sequence 1722. In these and other embodiments, a space for the potential candidate paths 1730 may be reduced based on a time difference between timestamps of words. For example, a space for the potential candidate paths 1730 may be reduced based on the potential candidate paths 1730 only including those words that have a time difference below a particular threshold.

In some embodiments, a time difference between timestamps of words may also be used as an additional penalty in the alignment scoring criteria when selecting the candidate paths 1730. Alternately or additionally, a time difference between timestamps of words may also be used as a feature in the selection process performed by a fuser system.

In some embodiments, one ASR system may be slower than another ASR system. For example, a revoicing ASR system may have a delay with respect to other ASR systems. Alternately or additionally, an offset, which may correspond to the average difference in delay, may be added to or subtracted from timestamps. For example, if a first ASR system is 1.5 seconds slower than a second ASR system, then 1.5 seconds may be subtracted from the timestamps of the first ASR system before constraining the sliding window 1740 based on the timestamps. Alternately or additionally, 1.5 seconds may be added to the second ASR system. Alternately or additionally, an offset may be considered when determining a search space for the candidate paths 1730 and assigning a voting penalty.

In some embodiments, limiting the search space for candidate paths 1730 based on timestamps may be performed instead of or in addition to using the sliding window 1740. In these and other embodiments, when both the timestamps and the sliding window 1740 are employed, the timestamps may be used to narrow the search space within the sliding window 1740.

Figure 18:
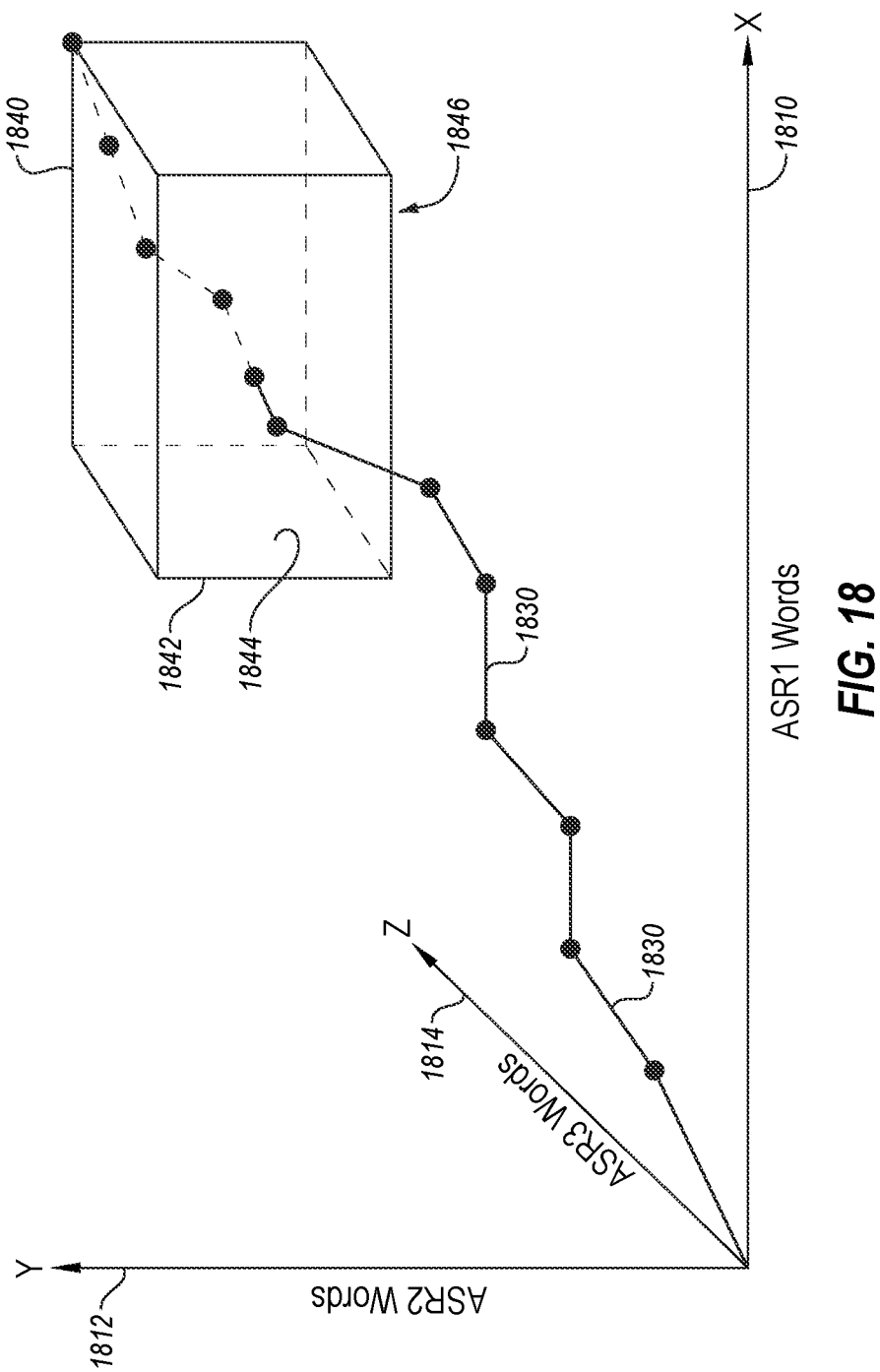
FIG. 18 illustrates an example three-dimensional coordinate system for aligning word sequences.

FIG. 18 illustrates an example three-dimensional coordinate system 1800 for aligning word sequences. The coordinate system 1800 may be arranged in accordance with at least one embodiment described in the present disclosure. The coordinate system 1800 may include a first axis 1810, a second axis 1812, a third axis 1814, a selected path 1830, and a sliding window 1840.

The sliding window 1840 as illustrated in FIG. 18 includes six faces through which a candidate path may extend. Alternately or additionally, a coordinate system may include more than three dimensions when more than three word sequences are being aligned. In these and other embodiments, the sliding window may become a hyper-rectangle with a number of hyperfaces that correspond with the number of word sequences being aligned.

As illustrated in the FIG. 18, the sliding window 1840 may include a first face 1842, a second face 1844, and a third face 1846 through which a stable candidate path may enter the sliding window 1840. The other faces of the sliding window 1840 may extend when one or more words are added to the word sequences.

A method that may be performed by a fuser system using the concept of the sliding window to align word sequences is now provided. A fuser system obtains a new word or phrase from an ASR system and extends a side of the sliding window to accommodate the new word. After extending the sliding window, the fuser system may determine a set of one or more candidate paths inside the sliding window.

In some embodiments, the candidate paths inside the sliding window may be determined from a point where other stable candidate paths enter the sliding window and the candidate paths inside the sliding window may exit the sliding window at faces furthest from the origin. In some embodiments, candidate paths inside the sliding window may only be determined from candidate paths that enter the sliding window at a particular face or vertex of the sliding window. For example, the fuser system may only consider continuing candidate paths that enter at a vertex of the sliding window nearest the origin. In these and other embodiments, the fuser system may only consider candidate paths that leave the sliding window at a particular face or vertex, such as the vertex furthest from the origin. Alternately or additionally, the candidate paths within the sliding window may only be determined from a candidate path with the lowest cost until intersecting the sliding window. The cost of a path is discussed below.

In some embodiments, the fuser system may align the most recent words from all recognizers to determine candidate paths. Alternately or additionally, the fuser system may insert one or more blank spaces representing words at the end of one or more word sequences to account for differences in latency between the ASR systems to determine candidate paths. For example, if two word sequences are "please return my call" and "please return," the fuser system may add blanks spaces to the second word sequence so that it reads "please return (blank) (blank)" such that the second word sequence more easily aligns with the first word sequence.

In some embodiments, after determining the candidate paths, the fuser system may a select the candidate path from the candidate paths in the sliding window. The path selected may correspond to the path with the lowest cost or highest probability.

In some embodiments, the cost of a path may be based on the portion of the path within the sliding window. In some embodiments, the cost of a path may be based on the entire history of the paths. The history of a path may be defined based on the aligned words in the path until the path extends into the sliding window. For example, the first candidate path 1730*a* from FIG. 17 represents words aligned as follows where each word pair is illustrated in a column:
    y-axis: you|doing|to|(blank)|day
    x-axis: how|you|feeling|this|day
the word "blank" represents a point where the second word sequence 1722 did not include a word that is included in the first word sequence 1720. For example, the cost of a path may be a total cumulative costs for every word in the path. Alternately or additionally, the costs of a path may be an average or mathematical adjustment of the total cost based on a number of words in the path. In some embodiments, the costs for each word may be the same. Alternately or additionally, the costs for words may vary based on the words or pairings of the words across the sequences. In these and other embodiments, the costs for words or pairing for words may be weighted. For example, the weights may be determined based on features such as ASR confidence and/or a language model probability evaluated against a word sequence taken from a path, among other features discussed with respect to the fuser systems in this disclosure.

After selecting the candidate path, an alignment of the words along the candidate path may be determined. The fuser system may then select from among the aligned words for words to include in a final transcription.

In some embodiments, after aligning the word, the fuser system may trim the size of the sliding window be moving the faces of the sliding window closest to the origin to be further from the origin. By trimming the size of the sliding window, a greater portion of the candidate paths become stable. By reducing the sliding window, the computations for selecting new candidate paths after additional words are received from the ASR system may be reduced.

The fuser system may trim the size of a sliding window by adjusting a location of a face of the sliding window. The fuser system may determine to adjust a face of a sliding window based on a determination that the paths that intersects the face are unlikely to change along the axis that includes the face to be adjusted. Various criteria may be used to determine that a path is unlikely to change.

For example, one criterion may include a number of words along an axis in a sliding window being more than a threshold. For example, if the sliding window includes more than the threshold number of words on the axis, the face of the sliding window for the axis may be adjusted to include the threshold number of words.

As another example, one criterion may include a series of words along an axis in a sliding window being stable for longer than a threshold. For example, if the sliding window includes words that have been stable longer than the threshold, the face of the sliding window for the axis may be adjusted to not include the stable words.

As another example, one criterion may include a path that intersects with a face of the sliding window having a cost that is below a threshold. The face of the sliding window may be adjusted until the cost of the path increases to be above the threshold.

As another example, one criterion may include removing high cost paths. If paths are removed such that no paths remain that intersect a face of the sliding window, the face of the sliding window may be adjusted.

As another example, one criterion may include a number of active paths crossing a plane inside the sliding window being below a threshold. If the number of active paths crossing the plane is less than the threshold, the face parallel to the plane may be adjusted to coincide with the plane. As another example, if the number of paths intersecting a point inside the sliding window is at or below a threshold, the sliding window may be adjusted so that the corner vertex closest to the origin is moved to the point. In some embodiments, the threshold may be one.

As another example, one criterion may include the sliding window reaching a maximum size along one or more dimensions (i.e., parallel to an axis). Another criterion may include a region not including active paths. In these and other embodiments, the region may be excluded from the sliding window.

As another example, one criterion may include a path exists where words of the word sequences unanimously agree for a selected number of words. For example, the second candidate path 1730*b* includes a three-word segment, "how are you," where both the first word sequence 1720 and the second word sequence 1722 are the same. In these and other embodiments, the sliding window may be adjusted so that the portion of the path with unanimously agreement between the word sequences is not included in the sliding window and becomes stable. Alternately or additionally, instead of a path including words of the word sequences that unanimously agree for a selected number of words, the criterion may be satisfied by the particular number of the word sequences agree for the selected number of words. Alternately or additionally, instead of trimming the sliding window if any path has a segment where words of the word sequences unanimously agree for a selected number of words, the trimming of the sliding window may occur in response to a path with the lowest cost including words of the word sequences unanimously agree for a selected number of words.

Figure 19:
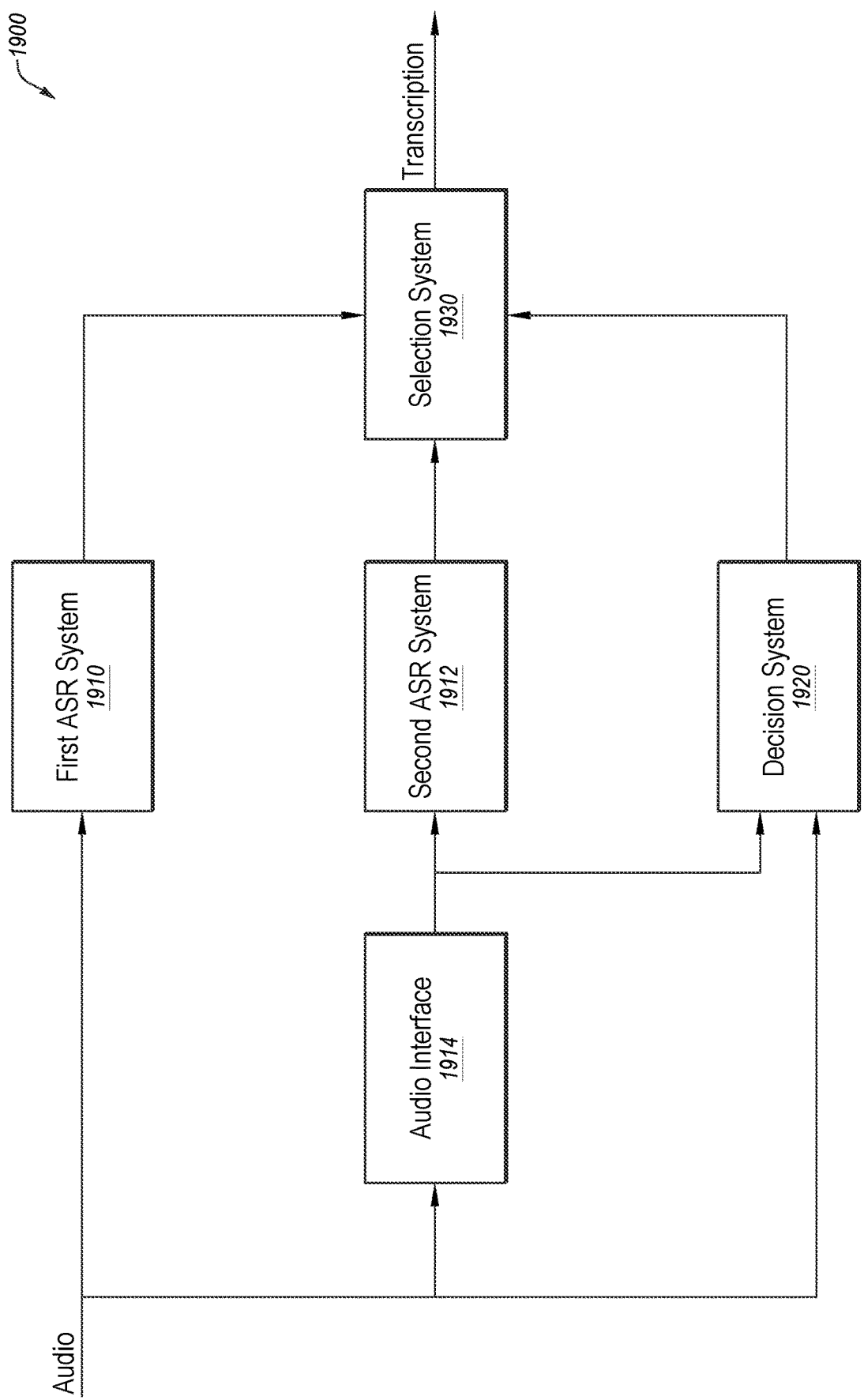
FIG. 19 illustrates another example environment for obtaining transcriptions.

FIG. 19 illustrates another example environment 1900 for obtaining transcriptions. The environment 1900 may be arranged in accordance with at least one embodiment described in the present disclosure. The environment 1900 may include a first ASR system 1910, a second ASR system 1912, an audio interface 1914, a decision system 1920, and a selection system 1930.

The first ASR system 1910 and the second ASR system 1912 may be examples of an ASR system described with respect to FIG. 1, thus no further explanation is provided with respect to FIG. 19.

The environment 1900 may be configured to obtain audio. The audio may be part of a communication session as illustrated in FIG. 1 or obtained from any other source. The audio may be provided to the first ASR system 1910, the audio interface 1914, and to the decision system 1920. The first ASR system 1910 may generate a first text string based on the audio and provide the first text string to the selection system 1930.

The audio interface 1914 may be configured to obtain revoiced audio from the audio. For example, the audio interface 1914 may obtain audio and broadcast the audio. After broadcasting the audio, the audio interface 1914 may obtain a revoicing of the broadcast audio through a microphone as revoiced audio. The revoiced audio may be provided to the second ASR system 1912 and the decision system 1920. The second ASR system 1912 may generate a second text string based on the revoiced audio and provide the second text string to the selection system 1930.

The decision system 1920 may obtain the audio and the revoiced audio. Based on the audio and the revoiced audio and information regarding the first ASR system 1910 and the second ASR system 1912, the decision system 1920 may decide to select one or more words from the first text string or one or more words from the second text string for a final transcription output by the environment 1900. For every word or group of words in the final transcription, the decision system 1920 may provide a selection command to the selection system 1930 that selects one or more words from either the first text string or the second text string.

The selection system 1930 may be configured to obtain the first text string and the second text string. The selection system 1930 may align the first and second text string as described in this disclosure or using any other method. The selection system 1930 may also obtain the selection command from the decision system 1920. Based on the selection command, the selection system 1930 may select one or more words from either the first text string or the second text string. For example, a first selection command from the decision system 1920 may correspond to first word locations in the first and second text strings and may select one or more words from the first text string. A second selection command from the decision system 1920 may correspond to second word locations in the first and second text strings and may select one or more words from the second text string.

The environment 1900 may thus obtain a final transcription based on the first and second text strings from the first ASR system 1910 and the second ASR system 1912 without comparing words output by the first ASR system 1910 and the second ASR system 1912. This is contrasted with the comparison of words done by a fuser system, such as the fuser system illustrated in FIG. 16, to select words for a final transcription.

In some embodiments, the selection system 1930 may not select between the first text string and the second text string for every word or one or more words. In these and other embodiments, the selection command from the decision system 1920 may select the first text string or the second text string for an extended period of time, such as for a current communication session that is generating the audio. Alternately or additionally, the selection command may indicate a selection to the selection system 1930 which may be used until a selection command is received by the selection system 1930 that changes the selection. Alternately or additionally, the selection system 1930 may use a subset of the selection commands received from the decision system 1920. For example, the selection system 1930 may use selection commands received at particular intervals or in response to changes in the words from the text strings, among others. In these and other embodiments, the selection command may change during the intervals but the selection system 1930 may use the selection commands available at the particular interval and ignore the changes in the selection command between the intervals.

The decision system 1920 may be configured to use various methods to determine the selection command. For example, the decision system 1920 may include a neural network that may be determined to select between the outputs of the first ASR system 1910 and the second ASR system 1912 based on the audio and the received audio. For example, the neural network may be trained to estimate a difference between an estimated accuracy of the first ASR system 1910 and the estimated accuracy of the second ASR system 1912 based on the audio and the revoiced audio. In these and other embodiments, in response to the difference being positive, the selection command may select the first text string and in response to the difference being negative, the selection command may select the second text string.

As another example, the neural network may be configured to use features of the audio and the revoiced audio. The features of the audio and the revoiced audio may be extracted by a processor. For example, the features may be Mel frequency cepstral coefficients. Alternately or additionally, the features may be obtained from the first ASR system 1910 and the second ASR system 1912.

As another example, the neural network may be configured to use subwords, such as phonemes, characters, syllables, in the audio and the revoiced audio to generate the selection command. In these and other embodiments, the decision system 1920 may include one or more ASR systems that may be used to generate the subwords from the audio and the revoiced audio. Alternately or additionally, the subwords may be obtained from the first ASR system 1910 and the second ASR system 1912.

As another example, the decision system 1920 may share resources with the first ASR system 1910 and/or the second ASR system 1912. For example, the decision system 1920 may share a feature extraction model, phoneme probability model, among other models with the first ASR system 1910 and/or the second ASR system 1912. In these and other embodiments, the decision system 1920 may obtain confidence levels for the text strings output by the first ASR system 1910 and the second ASR system 1912 and may determine the selection command based on the confidence levels.

As another example, the decision system 1920 may receive the first text string of the first ASR system 1910. Using the first text string, the decision system 1920 may determine locations in the audio and revoiced audio that correspond to words. Based on the location of words, the decision system 1920 may use the portions of the audio and the revoiced audio to determine the selection command. Alternately or additionally, the decision system 1920 may also use the words and the confidence score of the words from the first text string to determine the selection command. Alternately or additionally, the decision system 1920 may use words and confidence scores of the second ASR system 1912.

Modifications, additions, or omissions may be made to the environment 1900 without departing from the scope of the present disclosure. For example, the environment 1900 may include additional ASR systems. In these and other embodiments, the decision system 1920 may send a selection command to the selection system 1930 to select between the outputs of all of the ASR systems. As another example, the selection system 1930 may select the output of the second ASR system 1912 in response to the output of the second ASR system 1912 including words and may select the output of the first ASR system 1910 in response to the output of the second ASR system 1912 not including words. In some embodiments, the selection system may align the output of the first ASR system 1910 and the second ASR system 1912 using timestamps without regard to the content of the words received by the first ASR system 1910 and the second ASR system 1912. As another example, the selection system 1930 may compare the number of words transcribed by the first ASR system 1910 and the second ASR system 1912 over a selected period of time. The selection system 1930 may select between the output of the first ASR system 1910 and the output of the second ASR system 1912 in response to a total number of words from each of the first ASR system 1910 and the second ASR system 1912.

As another example, the decision system 1920 may include one or more ASR systems. For example, the decision system 1920 may include ASR systems that may obtain the audio and revoiced audio. In these and other embodiments, the decision system 1920 may compare the output of the ASR systems to determine the selection command. Alternately or additionally, the decision system 1920 may include one ASR system and compare the output of the ASR system to an output of one of the first ASR system 1910 and the second ASR system 1912.

Alternately or additionally, the decision system 1920 may include ASR systems that may be used to train models for ASR systems. For example, the ASR systems may be used to train acoustic or language models. In these and other embodiments, the trained models may be used by other ASR systems in the decision system 192, the first ASR system 1910, or the second ASR system 1912.

FIG. 20 illustrates an example environment 2000 for classifying audio. The environment 2000 may be arranged in accordance with at least one embodiment described in the present disclosure. The environment 2000 may include a transcription system 2010 that includes a classification system 2020 and an ASR system 2030. The classification system 2020 may include an audio analysis system 2022 and a transcription analysis system 2024.

The transcription system 2010 may be configured to obtain audio. The audio may be part of a communication session as illustrated in FIG. 1 or obtained from any other source. The ASR system 2030 may be example of an ASR system described with respect to FIG. 1, thus no further explanation is provided with respect to FIG. 20. In some embodiments, the ASR system 2030 may be configured to obtain the audio and generate a transcription of the audio.

The classification system 2020 may be configured to obtain the audio and/or the transcriptions. In general, the classification system 2020 may be configured to classify the type of the audio received by the transcription system 2010. The classification system 2020 may classify the audio based on output from the audio analysis system 2022 and/or the transcription analysis system 2024.

The audio analysis system 2022 may be configured to obtain the audio. Using the audio, the audio analysis system 2022 may classify the audio. The transcription analysis system 2024 may be configured to obtain the transcription output by the ASR system 2030. The transcription analysis system 2024 may be configured to classify the audio based on the transcriptions.

In some embodiments, the audio may be classified as being audio for which a transcription is to be generated by the transcription system 2010 or as audio for which a transcription is not be generated by the transcription system 2010. Audio for which a transcription is to be generated may be referred to as transcription audio and audio for which a transcription is not be generated may be referred to as non-transcription audio.

In some embodiments, the audio analysis system 2022 may be configured to classify the audio based on features of the audio such as speaking pace, pattern of echoes, presence and timing of music, pattern of multiple voices taking turns, voice analysis, or audio that originates from a radio, TV, or other broadcasts. In some embodiments, the audio analysis system 2022 may be configured to classify the audio as non-transcription audio based on the audio including only silence, noise, background speech, unintelligible speech, or no detectable speech in the audio. These elements of the audio may be determined based on the audio characteristics of the audio. Alternately or additionally, the transcription analysis system 2024 may determine that the audio is non-transcription audio based on the transcription obtained from the ASR system 2030 not including any words.

In some embodiments, the audio analysis system 2022 may be configured to classify the audio as non-transcription audio based on the audio including multiple people talking in the same room. It may be determined that the audio includes multiple people talking in the same room by analyzing room echoes and comparing acoustic characteristics between multiple voices.

Alternately or additionally, the audio analysis system 2022 may be configured to classify the audio as non-transcription audio based on the audio only including or predominantly including tones or other non-speech signals such as noise, ringing, SIT tones, DTMF (touch-tone) signals, busy signals, music, modem signals or other data signals, canned network announcements, etc.

Alternately or additionally, the audio analysis system 2022 may be configured to classify the audio as non-transcription audio based on characteristics of the audio, including pitch, syllable rate or other speaking rate metrics, patterns of multiple speakers taking turns, length of pauses between turns for a speaker, the inter-turn overlap or gap between turns (i.e., the amount of time from the point one speaker stops talking and the next speaker starts), a determination using voiceprint analysis that the subscriber's voice is not heard on the call, and/or detection of key phrases in the audio such as "this call cannot be completed," common phrases in a foreign language, or phrases known to be frequently used on illegitimate calls.

Alternately or additionally, the audio analysis system 2022 may be configured to classify the audio as non-transcription audio based on the audio including speech in a language not supported by the transcription system 2010. In these and other embodiments, the audio analysis system 2022 may perform automatic language detection to determine the dominant language of the speech in the audio. If the language is determined to be unsupported by the transcription system 2010, the audio may be classified as non-transcription audio.

Alternately or additionally, the audio analysis system 2022 may be configured to classify the audio as non-transcription audio based on a termination of a communication by one or both parties that generates the audio before speech is included in the audio.

Alternately or additionally, the audio analysis system 2022 may be configured to classify the audio as non-transcription audio based on the audio originating with a person/company that is known to have or has a suspected history of fraudulent calls.

In some embodiments, the transcription analysis system 2024 may be configured to classify the audio as non-transcription audio based on comparing the transcription to transcriptions of audio from media. For example, the transcription may be compared to transcriptions from broadcast audio or public recordings (such as commercial music and other produced content, NPR, news reports, webcasts, audio books, movies and other video programs, podcasts, YouTube videos, live radio and TV, etc.), recordings of IVR prompts, recorded announcements. In response to the transcription matching or being substantially similar, the audio may be classified as non-transcription audio. Alternately or additionally, an acoustic characteristic of the audio may be configured to the acoustic characteristic of audio or public recordings to classify the audio.

In some embodiments, a classification of the audio may be inconclusive by the classification system 2020. In these and other embodiments, the audio or a portion thereof may be broadcast to a CA or other person to assist in the classification. In some embodiments, if the audio is suspected or classified as being non-transcription audio, the audio may be recorded. If the audio is subsequently classified as transcription audio, the audio may be deleted. In some embodiments, in response to the audio originating from a communication session, the transcription system 2010 may provide a message to a device providing the audio to the transcription system 2010. The message may request consent to record the audio and/or request confirmation regarding a classification of the audio.

In some embodiments, the audio analysis system 2022 and/or the transcription analysis system 2024 may include a machine learning based classifier that is trained to classify the audio/transcriptions. In these and other embodiments, the machine learning based classifiers may be trained based on audio and/or text provided to the machine learning based classifier and an indication of the classification of the audio as determined by a person, such as a CA.

Modifications, additions, or omissions may be made to the environment 2000 without departing from the scope of the present disclosure. For example, in some embodiments, the audio may be classified as audio that originates from an answering machine, recorded message, IVR system, or other automated system. As another example, in some embodiments the transcription system 2010 may be part of system that receives payment for generating transcriptions of audio. In these and other embodiments, data regarding communication sessions that result in non-transcription audio may be removed from the transcription system 2010. Alternately or additionally, communication sessions classified as transcription audio may generate a bill and communication sessions classified as non-transcription audio may not generate a bill. In some embodiments, communication sessions classified as non-transcription audio may be recorded. Alternately or additionally, one or more messages may be provided to a user of the device that provided the audio regarding the classification of the audio as non-transcription and consequences regarding directing audio the transcription system 2010 in the future that is non-transcription audio.

FIG. 21 illustrates another example environment 2100 for transcription of communications. The environment 2100 may be arranged in accordance with at least one embodiment described in the present disclosure. The environment 2100 may include a first ASR system 2110, a second ASR system 2112 and a fuser system 2120.

The environment 2100 may be configured to obtain audio. The audio may be part of a communication session as illustrated in FIG. 1 or obtained from any other source. The audio may be provided to the first ASR system 2110 and the second ASR system 2112.

In some embodiments, the first ASR system 2110 may be a non-revoicing ASR system. In these and other embodiments, the first ASR system 2110 may be configured to obtain the audio and to generate first text strings based on the audio. The first ASR system 2110 may provide the first text strings to the fuser system 2120. The first text strings may include partial text strings and final text strings. In these and other embodiments, the first ASR system 2110 may provide information regarding the generation of the first text strings to the fuser system 2120. For example, the information may include a confidence regarding an accuracy of the first text strings.

In some embodiments, the second ASR system 2112 may be a revoicing ASR system. In these and other embodiments, the second ASR system 2112 may be configured to obtain the audio, obtain a revoicing of the audio, and to generate second text strings based on the revoiced audio. The second ASR system 2112 may provide the second text strings to the fuser system 2120. The second text strings may include partial text strings and final text strings. In these and other embodiments, the second ASR system 2112 may also provide information regarding the generation of the second text strings to the fuser system 2120.

The fuser system 2120 may obtain the first and second text strings and the other information from the first ASR system 2110 and the second ASR system 2112. In some embodiments, the fuser system 2120 may obtain the first text strings before obtaining the second text stings because the latency of the first ASR system 2110 may be less than the latency of the second ASR system 2112 due to the revoicing of the audio by the second ASR system 2112.

In some embodiments, as the audio is initially received in the environment 2100, the fuser system 2120 may be configured to select the first text strings as a transcription for sending to the user of the audio after receiving the first text string before the second text string is obtained. The transcription for sending to the user may be referred to as a sent transcription with respect to FIG. 21. Thus, the fuser system 2120 may avoid the latency delay of the second ASR system 2112 for the sent transcription. In these and other embodiments, the fuser system 2120 may use a first partial text strings as a sent transcription of the audio. In these and other embodiments, after obtaining the second text string, the fuser system 2120 may use the second text string to determine replacement words for errors in the first text string used as the sent transcription.

Alternately or additionally, before selecting the first text string as the sent transcription before the second text string is obtained, the fuser system 2120 may consider information regarding the first text string. For example, the fuser system 2120 may consider a confidence of the first text string as output by the first ASR system 2110. If the confidence satisfies a threshold, the fuser system 2120 may use the first text string as a sent transcription. If the confidence does not satisfy the threshold, the fuser system 2120 may wait until the second text string arrives at the fuser system 2120 to select words for a sent transcription.

Alternately or additionally, the environment 2100 may include another non-revoicing ASR system. In these and other embodiments, the fuser system 2120 may use words from the outputs of the other ASR system and the first ASR system 2110 that match for a sent transcription. Alternately or additionally, the fuser system 2120 may use a neural net that uses one or more features from the audio, the revoiced audio, and/or the first ASR system 2110, among other features to determine whether to use the first text string as the sent transcription or wait until the second text string arrives.

In some embodiments, the fuser system 2120 may continue selecting between the first text string and the second text string to reduce latency in generating the sent transcription. For example, in some embodiments, the first ASR system 2110 may generate a partial text string before the second ASR system 2112 generates a partial text string for a portion of the audio. However, the second ASR system 2112 may generate a final text string for the portion of the audio before the first ASR system 2110 generates a final text string. In these and other embodiments, the fuser system 2120 may balance accuracy and latency when generating the sent transcription for the portion of the audio. For example, the fuser system 2120 may initially send first text strings from the first ASR system 2110 and later send second text strings from the second ASR system 2112 without fusing or comparing the first and second text strings in response to the first and second text strings satisfying an accuracy threshold and proceeding in this manner reduces latency in generating the sent transcription. In this example, for portions of the audio, the fuser system 2120 may also fuse first text strings and second text strings to generate the sent transcription. Thus, the fuser system 2120 may operate to maintain a threshold of accuracy while reducing latency by adjusting the operations performed as discussed above. After generating a sent transcription, the fuser system 2120 may operate to determine replacement words and provide the replacement words to correct errors in the sent transcription.

In some embodiments, to reduce latency but to help to maintain accuracy, the fuser system 2120 may be configured to fuse partial first and second text strings for a portion of audio to generate a sent transcription before the final text strings for the portion of audio are generated by the first ASR system 2110 and the second ASR system 2112. In these and other embodiments, the fuser system 2120 may use the partial first and second text strings in response to the accuracy satisfying a threshold or in response to other criteria being satisfied. For example, in response to the partial first and second text strings matching, the partial first and second text strings may be used for the sent transcription. In response to the partial first and second text strings not matching, the fuser system 2120 may wait for additional information before using the partial first and second text strings. For example, the additional information may include a change in one of the partial first and second text strings, neither of the partial first and second text strings changing for a duration longer than a duration threshold, neither of the partial first and second text strings changing after a threshold number of words are transcribed by the first ASR system 2110 and/or the second ASR system 2112, a confidence level of the partial first and second text strings satisfying the threshold, or after a particular interval of time or number of words being transcribed, among other information. In these and other embodiments, after obtaining the final text strings for the portion of audio, the fuser system 2120 may determine replacement words as needed to correct errors in the sent transcription.

In some embodiments, an issue may arise where a CA associated with the second ASR system 2112 may be viewing the sent transcription. If the fuser system 2120 uses the text string from the first ASR system 2110, the sent transcription may be generated before the CA revoices the audio, which may confuse the CA. In these and other embodiments, to help to reduce CA confusion, only the second text strings generated by the second ASR system 2112 may be presented to the CA. Alternately or additionally, to help to reduce CA confusion, the sent transcription may be presented only after the corresponding second text strings are generated by the second ASR system 2112. After presentation, the CA may correct the second text strings. Alternately or additionally, if a time period has lapsed since the sent transcription is generated, the sent transcription may be presented to the CA allowing the CA to revoice the audio or correct the sent transcription.

Modifications, additions, or omissions may be made to the environment 2100 without departing from the scope of the present disclosure. For example, in some embodiments, the environment 2100 may include additional ASR systems. As another example, the environment 2100 may be used with CAs with less experience. In these and other embodiments, once a CA increases in experience, the first ASR system 2110 may not be used with an ASR system that uses the more experienced CA.

As another example, in some embodiments, a user to which the transcriptions are presented may be able to adjust for reduced latency or increase accuracy. For example, a setting may be provided for a user to select reduced latency and reduced accuracy or increased accuracy and increased latency. In these and other embodiments, the fuser system 2120 may be configured to adjust how the sent transcription is generated based on the settings.

FIG. 22 illustrates another example environment 2200 for transcription of communications. The environment 2200 may be arranged in accordance with at least one embodiment described in the present disclosure. The environment 2200 may include an audio select system 2220, a first ASR system 2210a, a second ASR system 2210b, a third ASR system 2210c, referred to collectively as the ASR systems 2210, and a transcription select system 2230.

The environment 2200 may be configured to obtain audio. The audio may be part of a communication session as illustrated in FIG. 1 or obtained from any other source. The audio may be provided to the audio select system 2220. The audio select system 2220 may be configured to route the audio to one or more of the ASR systems 2210. The ASR systems 2210 may be examples of the ASR systems described with respect to FIG. 1, thus no further explanation is provided with respect to FIG. 22. The ASR systems 2210 may generate transcriptions based on the audio and provide transcriptions to the transcription select system 2230.

The audio select system 2220 may select the one or more of the ASR systems 2210 to receive the audio based on one or more factors, such as an accuracy of the transcriptions generated by the ASR systems 2210, amongst other factors. Alternately or additionally, the audio select system 2220 may select an additional one of the ASR systems 2210 to obtain the audio based on one or more factors.

For example, in response to the first ASR system 2210a generating transcriptions with an accuracy below a threshold, the audio select system 2220 may route the audio to the second ASR system 2210b as well as the first ASR system 2210a. In these and other embodiments, the first ASR system 2210a may be a non-revoicing ASR system and the second ASR system 2210b may be a revoicing ASR system. In these and other embodiments, a CA associated with the second ASR system 2210b may listen to the audio and monitor the transcription generated by the first ASR system 2210a to make a determination regarding how the first ASR system 2210a is performing. In these and other embodiments, the second ASR system 2210b may or may not generate transcriptions. In response to the CA determining that the performance of the first ASR system 2210a is not acceptable, the CA may begin revoicing the audio such that the second ASR system 2210b generates transcriptions that may be used in place of the transcriptions from the first ASR system 2210a. Alternately or additionally, the CA may direct the audio select system 2220 to send the audio to another one of the ASR systems 2210. Alternately or additionally, the CA may create a log entry indicating that the audio is silent/unintelligible/etc., transfer the call to an ASR system 2210 that better understands the language spoken in the audio, send a message to the user of the device obtaining transcriptions that the audio cannot be transcribed, terminate a communication session resulting in the audio, etc.

In some embodiments, a CA may monitor the transcription generated by multiple of the ASR systems 2210. In these and other embodiments, in response to monitoring the CA may direct the audio select system 2220 to transfer the audio from one of the ASR systems 2210 to another ASR systems 2210. The CA may direct the transfer in response to the ASR systems 2210 performing inadequately or above performance such that another ASR system 2210 may perform adequately. In these and other embodiments, the CA may select the other one of the ASR systems 2210 based on topic, language, or skills that may be useful for the audio.

Alternately or additionally, the first ASR system 2210a may be a revoicing ASR system and the second ASR system 2210b may be a non-revoicing ASR system. In these and other embodiments, the transcriptions from the second ASR system 2210b may be used to evaluate the first ASR system 2210a, including a CA associated with the first ASR system 2210a. In response to a determination that the first ASR system 2210a performance is not adequate, the audio may be routed to another one of the ASR systems 2210 and/or the audio may be routed away from the first ASR system 2210a.

In some embodiments, the audio of a communication session may be retained for a duration of the communication session. As a result, in response to performance being inadequate, audio and transcriptions of the entire communication session may be reviewed. In these and other embodiments, the audio previously transcribed by the low performance ASR system may be re-transcribed. For example, during some communication sessions between participants, only words spoken by one of the participants may be transcribed. Thus, when the other participate is speaking, there may not be audio to transcribe which may be determined by an audio energy detector. During these time periods the recorded audio may be transcribed. In these and other embodiments, to assist in transcribing the recorded audio, silence gaps may be removed and/or the recorded audio may be presented at a faster rate.

Alternately or additionally, during periods when another participate is speaking the audio may not be provided by the audio select system 2220 to one of the ASR systems 2210. In response to the one of the participants speaking, such that words may be transcribed, the audio select system 2220 may direct the audio to one of the ASR systems 2210 for transcription. In these and other embodiments, some of the words spoken by the one of the participants may be missed during directing of the audio. As such, the recorded audio may be presented at a faster rate until the recorded audio is transcribed.

In some embodiments, one of the ASR systems 2210 may direct the audio select system 2220 to temporarily direct audio to another one of the ASR systems 2210. For example, the first ASR system 2210a may be associated with a CA that may be revoicing audio, but for a portion of the audio may be unavailable to revoice the audio. In these and other embodiments, the audio select system 2220 may direct the audio to the second ASR system 2210b. The second ASR system 2210b may generate transcriptions for the portion of the audio. After the end of the portion of the audio, the CA may cause the audio select system 2220 to redirect the audio to the first ASR system 2210a or stop redirecting the audio to the second ASR system 2210b. In some embodiments, the end of the portion of audio may correspond to a period of silence in the audio. In these and other embodiments, a record may be generated indicating information regarding the portion of the audio not revoiced by the CA.

Modifications, additions, or omissions may be made to the environment 2200 without departing from the scope of the present disclosure. For example, in some embodiments, for a communication session the audio select system 2220 may determine a geographic location of participants of the communication. The audio select system 2220 may select particular ones of the ASR systems 2210 based on the geographic locations.

Figure 23:
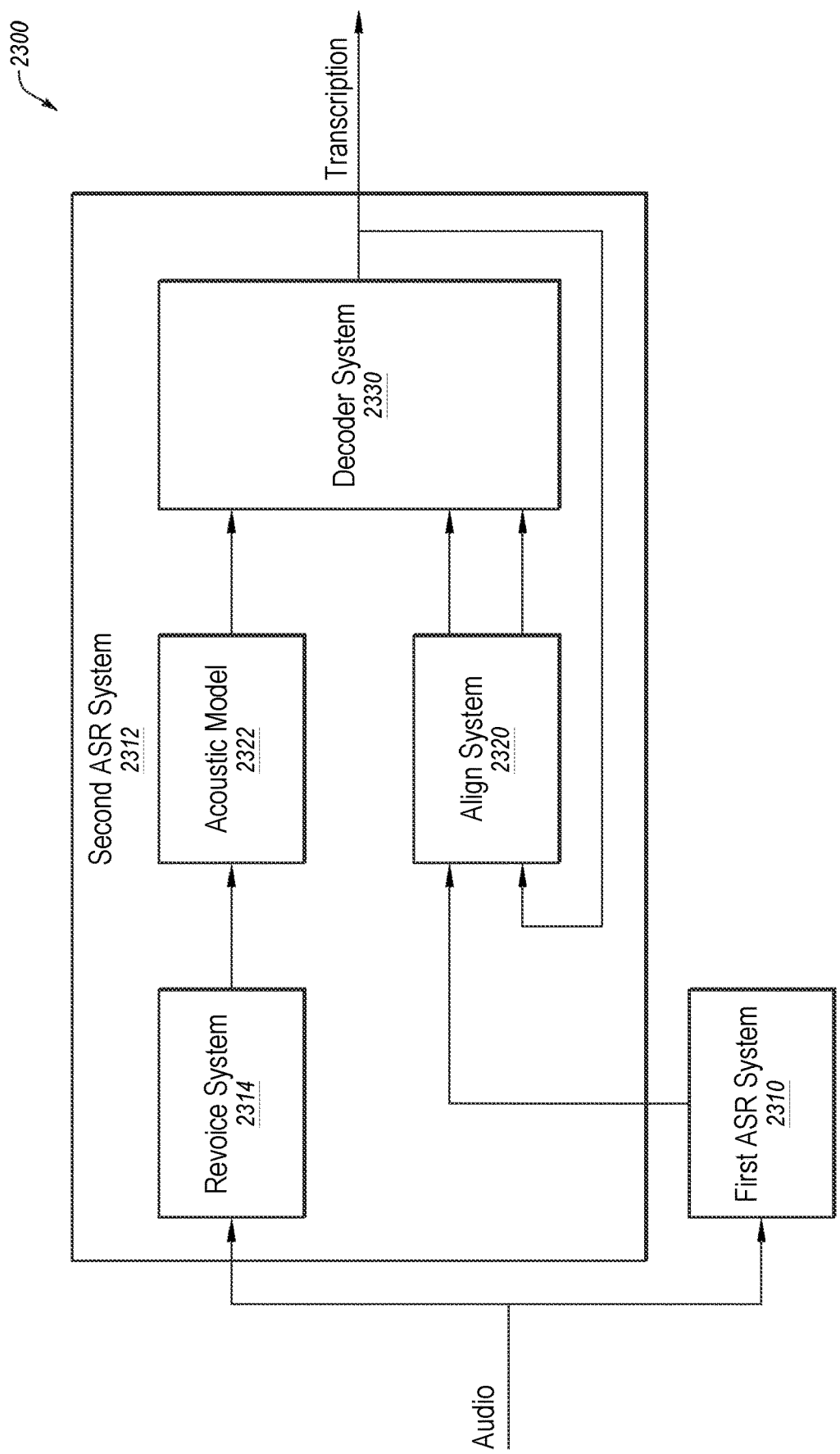
FIG. 23 illustrates another example environment for transcription of communications.

FIG. 23 illustrates another example environment 2300 for transcription of communications. The environment 2300 may be arranged in accordance with at least one embodiment described in the present disclosure. The environment 2300 may include a first ASR system 2310 and a second ASR system 2312 that includes a revoice system 2314, an align system 2320, an acoustic model 2322, and a decoder system 2330.

The environment 2300 may be configured to obtain audio. The audio may be part of a communication session as illustrated in FIG. 1 or obtained from any other source. The audio may be provided to the first ASR system 2310 and the second ASR system 2312. The first ASR system 2310 and the second ASR system 2312 may be examples of an ASR system described with respect to FIG. 1. In the environment 2300, the second ASR system 2312 may be a revoicing ASR system and the first ASR system 2310 may be a non-revoicing ASR system. In some embodiments, the second ASR system 2312 may have more latency than the first ASR system 2310 as a result of revoicing the audio.

In some embodiments, the first ASR system 2310 may generate a first text string and provide the first text string to the align system 2320.

In the second ASR system 2312, the revoice system 2314 may generate revoiced audio based on the audio and provide the revoiced audio to the acoustic model 2322. The acoustic model 2322 may generate probabilities of phonemes and/or words of the revoiced audio and provide the probabilities to the decoder system 2330.

The decoder system 2330 may use a language model built using statistics derived from previously analyzed text and/or input from language and acoustic models, and other information to determine the probability of a particular word given the context of words output from the decoder system 2330 and/or the first ASR system 2310. The language model of the decoder system 2330 may use statistics derived from n-grams to determine word probabilities. In these and other embodiments, the decoder system 2330 may be configured to determine a second text string.

The decoder system 2330 may be configured to determine the second text string based on previous words in the second text string, words from the first text string, and information from the acoustic model 2322. Other information may also be used by the decoder system 2330 to determine the second text string including confidence scores, partial and final and rescored results from the first ASR system 2310 and the second ASR system 2312, n-best lists, lattices, word confusion networks from the first ASR system 2310, and information from the acoustic model 2322 of the second ASR system 2312. In these and other embodiments, the first text string from the first ASR system 2310 may include more words than the second text string from the second ASR system 2312 due to the increased latency of the second ASR system 2312 due to the revoice system 2314.

The align system 2320 may be configured to align the words of the first and second text strings. The align system 2320 may align the words of the first and second text strings using a method of text alignment, such as those discussed in this disclosure, among others. The align system 2320 may provide the first text string and the second text string after alignment to the decoder system 2330.

In these and other embodiments, the decoder system 2330 may be configured to determine a next word in the second text string based on the words in the second text string. For example, the decoder system 2330 may generate the second text string in intervals, generating one or more words of the second text string at each of the intervals.

Note that the next one or more words to be determined by the decoder system 2330 may be included in the first text string because of the latency of the second ASR system 2312 as compared to the latency of first ASR system 2310. As such, the first text string may allow the language model used by the decoder system 2330 to use future words, from the perspective of the second ASR system 2312 because the future words have not yet been determined by the second ASR system 2312, to select the next word. By including the first text string, which may contain words with a future context, the decoder system 2330 may be able to yield increased accuracy, more rapidly determine the next word, and reduce an amount of time for a transcription to be generated based on the revoiced audio.

For example, the audio may include the phrase "Now is the time for all good men to come to the aid of their party." The first ASR system 2310 may have output a first text string of "Now is the time for all good men." The second ASR system 2312 may have output a second text string of "Now is the time for all," such that the second ASR system 2312 is two words behind the first ASR system 2310. The second ASR system 2312, in particular, the decoder system 2330, may be considering whether the next word in the audio is "good." The first and second text strings may be aligned so that the first six words of each of the first and second text strings align. The decoder system 2330 may use a language model to compute the probability that the next word is "good" given the first text string and the second text string. The computed probability may be combined with evidence from the acoustic model 2322 to determine to output and add the word "good" to the second text string. The decoder system 2330 may use the language model to compute the probability of the next word being "men" based on the second text string that may now include the word "good" as follows "Now it the time for all good," and the first text string that may include an additional word "Now it the time for all good men to." In this manner, the second ASR system 2312 may generate a transcription of the audio. In some embodiments, the first ASR system 2310 transcription and the second ASR system 2312 may be fused to create a fused transcription.

Modifications, additions, or omissions may be made to the environment 2300 without departing from the scope of the present disclosure. For example, in some embodiments, the environment 2300 may not include the align system 2320. Alternately or additionally, the second ASR system 2312 may include a DNN such as a recurrent neural network language model (RNNLM) instead of or in addition to an n-gram based language model.

Alternately or additionally, the environment 2300 may include one or more additional ASR systems. In these and other embodiments, the outputs of the additional ASR systems may be provided to the second ASR system 2312 or fused together and provided to the second ASR system 2312, among other configurations.

Figure 24:
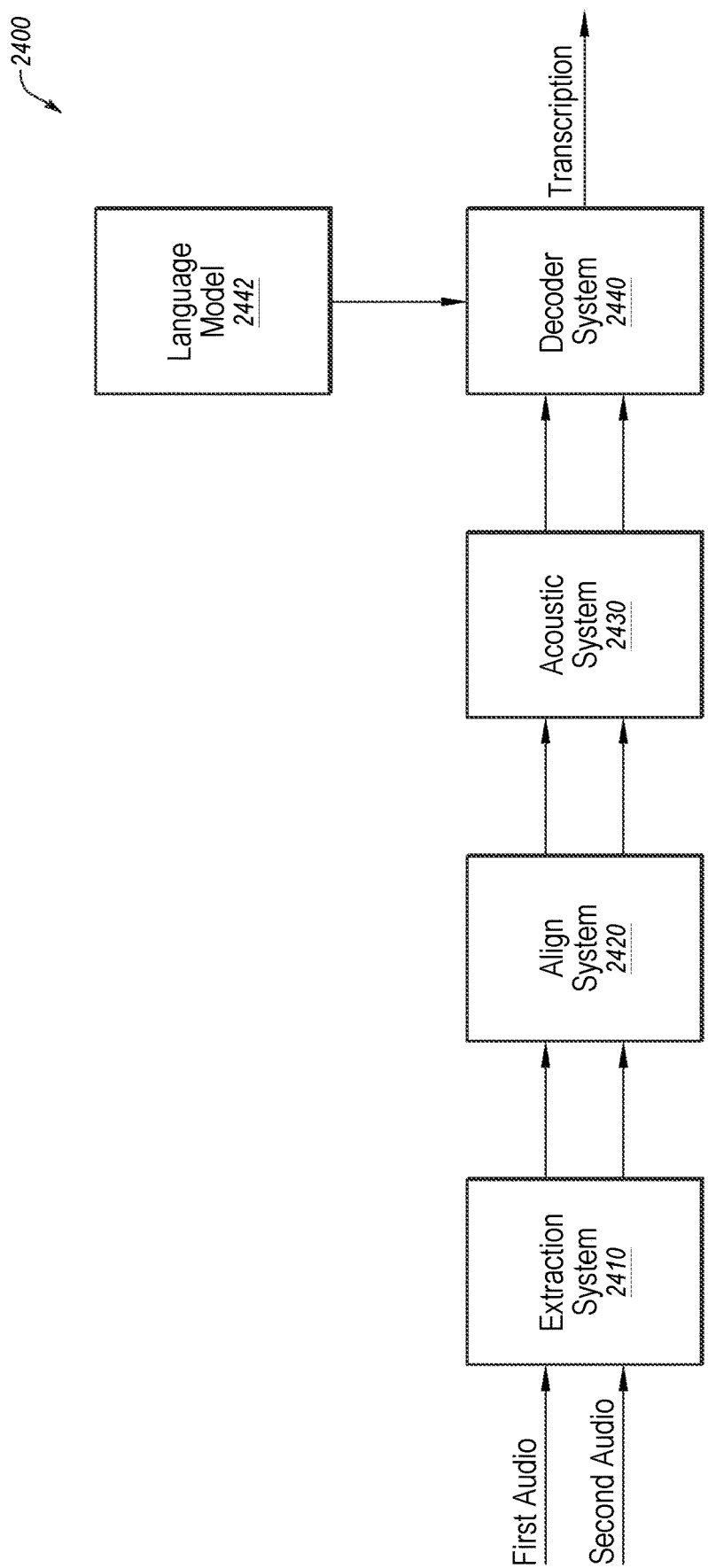
FIG. 24 illustrates an example environment for generating transcriptions.

FIG. 24 illustrates an example environment 2400 for generating transcriptions. The environment 2400 may be arranged in accordance with at least one embodiment described in the present disclosure. The environment 2400 may include an extraction system 2410, an align system 2420, an acoustic system 2430, a decoder system 2440, and a language model 2442.

The environment 2400 may be configured to obtain first audio and second audio and generate a transcription of the first audio and the second audio. The first audio may be part of a communication session as illustrated in FIG. 1 or obtained from any other source. The second audio may be revoicing of the first audio. As such, words in the second audio may not be aligned in time with the same words in the first audio. The first audio and the second audio may be provided to the extraction system 2410.

The extraction system 2410 may be configured to extract first audio features from the first audio and second audio features from the second audio. The first and second audio features may represent different aspects of the first and second audio. The aspects of the first and second audio may include aspects regarding frequency, power, and amplitude, among other aspects of the first and second audio. In these and other embodiments, the features may include Mel-frequency cepstral coefficients (MFCC) and/or MFCC with one or more modifications. The extraction system 2410 may be configured to provide the first audio features and the second audio features to the align system 2420. In some embodiments, a neural network or some other software may be configured to extract the first audio features from the first audio and the second audio features from the second audio. In some embodiments, the extraction system 2410 may be omitted so that subsequent systems (the align system 2420, the acoustic system, etc.) may use either audio or features as input. In the description below, where audio is described as an input, features may be used instead and vice versa.

The align system 2420 may receive the first audio features and the second audio features. The align system 2420 may be configured to align the first audio features and the second audio features in time. For example, the first audio features from the first audio may be ahead in time of the second audio features from the second audio. For example, the first audio and the second audio may include the words "this is a big pig." However, the first audio and the second audio may be misaligned in time such that at a first time the first audio would include the word "a" and the second audio may include the word "this." Based on the misalignment of the first audio and the second audio, the first audio features and the second audio features may include a similar misalignment. The align system 2420 may be configured to shift one or more of the first audio features and the second audio features in time to better align the first audio features and the second audio features in time.

In some embodiments, the align system 2420 may be configured to better align the first audio features and the second audio features based on a set time difference between the first audio and the second audio. For the set time difference, a set time misalignment between the first audio and the second audio may be determined. For example, based on a magnitude spectrum analysis at a first time, it may be determined that the first audio and the second audio are misaligned in time by two seconds. The set time difference may be used to align the first audio features and the second audio features for the entirety of the first audio and the second audio. In some embodiments, the set time difference may be determined based on an average time difference between first and second audio from multiple different unique audio streams, such as from multiple different communication sessions.

Alternately or additionally, the align system 2420 may better align the first audio features and the second audio features based on a variable time difference between the first audio and the second audio. For example, at each interval, such as a random, pseudo-random, or set interval of time, a time misalignment of the first audio and the second audio may be determined. The align system 2420 may align first audio features and second audio features for each interval based on the time misalignment for the corresponding interval.

The align system 2420 may be configured to better align the first audio features and the second audio features in time using any of the methods described in this disclosure. Alternately or additionally, the first audio features and the second audio features may be divided into time frames. Using one or more of the first audio features and the second audio features, the times frames for the first audio features and the second audio features may be compared and shifted with respect to each other to better time align the first audio features and the second audio features. As an example, a magnitude of the first and second audio may be used to compare and shift the time frames of the first audio features and the second audio features. For example, a spectral analysis may include determining a time shift that minimizes the total squared difference in magnitude spectra between the first audio and second audio.

In some embodiments, the environment 2400 may not include the align system 2420. In these and other embodiments, one or more of the functions performed by the align system 2420 may be performed by a neural network. In these and other embodiments, the features in the neural network may be trained based on a time shift between the first audio and the second audio such that the neural network may align or better align the first and second audio features in time based on the configuration of the neural network.

Alternately or additionally, the first and second audio may be routed to input nodes of the neural network that correspond to different points in time. The difference in time between the input nodes of the neural network may correspond to the time misalignment and may be used to better align the first audio features and the second audio features in time. For example, one or more of the layers of a neural network that is part of the environment 2400 may include a convolutional neural network (CNN) layer, which may include a pooling layer. Nodes in the CNN layer may include multiple inputs from a previous layer in each direction. For example, a node in a CNN layer may include 10, 20, 50, 100, 500, 1000, 2000, 3000, or more inputs in each direction. Each of the inputs may represent a different time interval. Thus, to shift a particular amount of time, a particular input that represents that particular amount of time may be selected.

Alternately or additionally, inputs to a CNN layer of a neural network in the environment 2400 may include multipliers that may be used to better align the first and second audio features. For example, a CNN layer may include multiple CNN nodes. Each of the CNN nodes may obtain data from multiple nodes of a previous layer. A multiplier may be placed along the paths between each CNN node and the multiple nodes of the previous layer. The multipliers may be used to select one or more time shifts to better time align the first and second audio features. For example, in some embodiments, all of the multipliers on the paths to a first CNN node except for one of the multipliers may have a value of zero. The remaining multiplier may have a value of one. As a result, the only input obtained by the first CNN node may be the input that passes through the multiplier with the value of one. The location of the previous node with the input that is multiplied by one may determine a time shift. An amount of time shift may be determined based on a time interval assigned between the previous nodes and the previous node with the input that is multiplied by one. The values of the multipliers may vary based on a time shift determined to be applied. Multiple CNN nodes may have the same values in corresponding multipliers or different values. The align system 2420 may provide the aligned first and second audio features to the acoustic system 2430.

The acoustic system 2430 may obtain the first and second audio features. The acoustic system 2430 may be configured to determine a probability of a phoneme of speech based on the first and second audio features.

In some embodiments, the first and second audio features may be organized based on time frames. In these and other embodiments, a time frame may be 2, 5, 10, 15, 20, 30, or 40 milliseconds in length, or some other amount of time, such as any amount of time between 2 and 40 milliseconds, or above 40 milliseconds, such as between 2 and 100 milliseconds. In these and other embodiments, the first and second audio features may be determined for a time frame. For example, the first audio features may include a first vector of scalar values that may represent an energy of the first audio in multiple different bands of the magnitude spectrum for a first time frame. The first audio features may include a second vector for a second time frame, a third vector for a third time frame, etc. Thus, the first and second features may each include a vector for each time frame.

In some embodiments, the acoustic system 2430 may be configured to concatenate the vectors from each time frame from the first and second audio features. In these and other embodiments, the acoustic system 2430 may determine the probability of a phoneme of speech based on the concatenated vectors. As such, the acoustic system 2430 may be configured to determine a probability of a phoneme given the first audio features and the second audio features. Alternately or additionally, the acoustic system 2430 may be configured to determine a first probability of a phoneme of speech for the first audio features and to determine a second probability of a phoneme of speech for the second audio features.

In some embodiments, the acoustic system 2430 may determine the probability of a phoneme based on the vectors individually or combined for a given time frame. Alternately or additionally, the acoustic system 2430 may determine the probability of a phoneme based on the vectors individually or combined for multiple time frames. Alternately or additionally, the acoustic system 2430 may determine the probability of a phoneme based on the vectors for a given time frame and based on previously determined phonemes. Alternately or additionally, the acoustic system 2430 may wait to output a probability of a phoneme until a next phoneme is determined. In these and other embodiments, the acoustic system 2430 may determine the probability of a phoneme based on previous and/or subsequent phonemes in additional to one or more time frames of the first and second audio features. The acoustic system 2430 may provide the probability of the phonemes to the decoder system 2440.

The decoder system 2440 may be configured to obtain the probability of the phonemes from the acoustic system 2430. In some embodiments, based on the probability of the phonemes, the decoder system 2440 may be configured to determine one or more words for the transcription of the first audio.

In some embodiments, the decoder system 2440 may obtain the probability of the phonemes that are based on the combined first audio features and the second audio features. In these and other embodiments, the decoder system 2440 may use the language model 2442 to determine one or more words that correspond to the phoneme probabilities. In some embodiments, the decoder system 2440 may determine a sequence of words from the language model 2442 that maximizes or attempts to maximize the probability of a word given the probabilities of the combined first audio features and the second audio features. The sequence of words may be used as part of the transcription of the audio output by the decoder system 2440.

In some embodiments, the decoder system 2440 may obtain the probability of the phonemes that is based on the first audio features and the probability of the phonemes that is based on the second audio features. In these and other embodiments, the decoder system 2440 may use the language model 2442 to determine one or more words that correspond to the phoneme probabilities.

In some embodiments, the decoder system 2440 may use an exhaustive search to determine one or more words that correspond to the phoneme probabilities. An example follows that illustrates how an exhaustive search may be performed.

Assume a three-word sentence is spoken and represented by the first audio and the second audio based on the revoicing of the first audio. To simplify the description, assume the vocabulary known to the speech recognizer is three words and includes "apples," "beat," and "oranges." Possible sentences that may be recognized include:

Apples beat pears
Pears beat apples
Apples pears beat
Beat beat beat
. . . .

For each of the possible sentences, the decoder system 2440 may evaluate the probability of the words in the sentence based on the probabilities of the phonemes from the first audio features and the probabilities of the phonemes from the second audio features. In these and other embodiments, the decoder system 2440 may evaluate the probability of the words in the sentence based on the probabilities of the phonemes over multiple time frames that cover the time in which the sentence may be spoken. As an example, a variable f1 may represent the probabilities of the phonemes based on the first audio features over the multiple time frames that cover the time in which the sentence may be spoken. In these and other embodiments, f1 may be series of vectors, f1(1), f1(2), f1(3), . . . , where each vector in the series represents a vector of probabilities for different phonemes for a given time frame as output by the acoustic system 2430. The variable f2 may represent the probabilities of the phonemes based on the second audio features over the multiple time frames that cover the time in which the sentence may be spoken.

In some embodiments, the sentence may be expanded into the phonemes of the sentence. For example, the sentence may be expanded using a set of phonetic transcription codes, such as ARPABET phonetic transcription codes. In this example, the sentence "Apples beat pears" may be expanded to "@plZ bit pErZ."

After expanding the sentence, the probability for each sequence of phoneme may be determined based on f1 and f2. For example, the P("@plZ bit pErZ"|f1, f2) may be determined. Alternately or additionally, the P(|f1, f2|"@plZ bit pErZ") may be determined.

The probability for each sequence of phonemes given f1 and f2 may be determined using a three-dimensional search grid. The search grid may include a first axis that corresponds to the different phonemes, a second axis for the probabilities of the different phonemes from f1, where each point on the second axis corresponds to a vector for a time frame, and a third axis for the probabilities of the different phonemes from f2, where each point on the third axis corresponds to a vector for a time frame. A best-fit path may be determined through the search grid that best or adequately aligns the phonemes with both f1 and f2. The best-fit path may include multiple points in the three-dimensional search grid. Each point in the three-dimensional search grid may correspond to one phoneme, one vector of f1, and one vector of f2.

In some embodiments, the best-fit path may be determined using a three-dimensional dynamic programming search. In these and other embodiments, the best-fit path may be based on obtaining a highest probability, highest likelihood, lowest cost, or some other feature, or combination of features.

After obtaining the best-fit path, the probability for each sequence of phonemes given f1 and f2 may be determined by multiplying the probability estimate for each point in the best-fit path. For example, for a path that includes five points (@, f1(1), f2(1)); (p, f1(2), f2(2)); (p, f1(3), f2(3)); (1, f1(4), f2(4)); (z, f1(5), f2(5)), the probability may be $$P(f1,f2|\text{``@plZ''}) \approx P(f1(1),f2(1),\text{``@''})*P(f1(2),f2(2),\text{``p''})*P(f1(3),f2(3),\text{``p''})*P(f1(4),f2(4),\text{``l''})*P(f1(5),f2(5),\text{``Z''}).$$

In some embodiments, the probability for each sequence of phonemes given f1 and f2 may be adjusted using the language model 2442. For example, using the language model 2442, probabilities for sequences of words based on usage may be obtained. In these and other embodiments, the probability of a sequence of phonemes that results in a sequence of words may be adjusted based on the probability of the sequence of words as obtained from the language model 2442. For example, the probability of a sequence of phonemes that results in a sequence of words that has a lower probability based on the language model 2442 may be adjusted lower.

Alternately or additionally, the probability for each sequence of phoneme may be determined based on a product of two separate probability functions. For example, the P(phonemes|f1, f2) may be determined based on P(phonemes|f1) multiplied by P(phonemes|f2). In these and other embodiments, a first path may be determined to align the phonemes to f1. A second path may be determined to align the phonemes to f2. In these and other embodiments, the first path and the second path may be aligned to select the best-fit path. For example, the probabilities of the first path for each point may be multiplied by the probability of the second path for the corresponding point. As an example, P(f1(1)|"@") may be multiplied by P(f2(1)|"@") to determine a value for P(f1(1), f2(1)|"@"). The probability for the entire combined path may be determined as explained above.

After determining the probabilities for each of the sequence of words, a sequence of words may be selected as the transcription of the first and second audio. In some embodiments, the sequence of words selected may be the sequence of words with the highest probability. In some embodiments, other algorithms may be used to determine the probabilities for each of the sequence of words. For example, dynamic programming, beam searches, and search tree pruning, among other algorithms may be used to determine the probabilities for each of the sequence of words.

Modifications, additions, or omissions may be made to the environment 2400 without departing from the scope of the present disclosure. For example, in some embodiments, the environment 2400 may determine probabilities for phonemes, words, word sequences etc. However, instead of a probability, the example environment 2400 may determine a likelihood, log likelihood, or probability density function, among other types of probability type functions for phonemes, words, and/or word sequences.

As another example, in some embodiments, one or more of the systems described in environment 2400 may be implemented using a neural network. For example, a neural network may be configured to obtain the first audio and the second audio, and the output of the neural network may be the transcription. Alternately or additionally, the environment 2400 may be implemented using multiple neural networks. For example, a first neural network may be used in place of the extraction system 2410 and the align system 2420. A second neural network may be used in place of the acoustic system 2430 and a third neural network may be used in place of the decoder system 2440. Alternately or additionally, other configurations of neural networks may be implemented.

As another example, the environment 2400 may not include the align system 2420. In these and other embodiments, the other systems in the environment 2400 may compensate for any misalignment.

Figure 25:
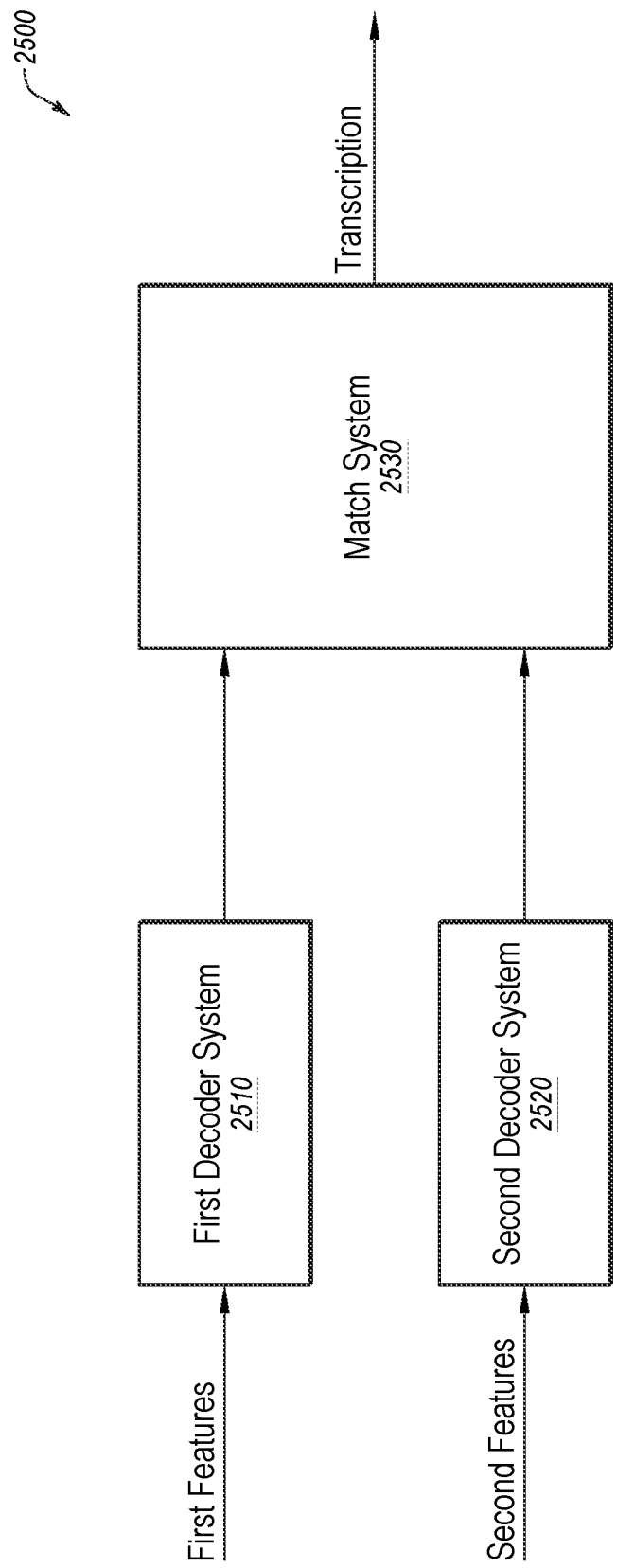
FIG. 25 illustrates another example environment for generating transcriptions.

FIG. 25 illustrates another example environment 2500 for transcription of communications. The environment 2500 may be arranged in accordance with at least one embodiment described in the present disclosure. The environment 2500 may include a first decoder system 2510, a second decoder system 2520, and a match system 2530.

The environment 2500 may be configured to obtain first audio features and second audio features. The first audio features and the second audio features may be obtained from an acoustic system, such as the acoustic system 2430 of FIG. 23. The first audio features may be obtained from first audio that may include spoken words. The first audio may be part of a communication session as illustrated in FIG. 1 or obtained from any other source. The second audio may be revoicing of the first audio. As such, words in the second audio may not be aligned in time with the same words in the first audio. The first features may be provided to the first decoder system 2510. The second features may be provided to the second decoder system 2520. Alternately or additionally, the first and second features may be provided to the first decoder system 2510 and to the second decoder system 2520.

The first decoder system 2510 may be configured to generate and output multiple first word sequences. The first decoder system 2510 may also generate and output a first score for each of the first word sequences. The first scores may indicate how well the first word sequences relate to the spoken words in the first audio. For example, a score of a word sequence may indicate a probability that the word sequence is the words spoken in the first audio. As other examples, the first scores may be a confidence, a likelihood, or an accuracy, among other types of scores that may be output by a decoder. The first decoder system 2510 may generate the first word sequences using any technique as discussed in this disclosure, in U.S. patent application Ser. No. 16/209,524, or otherwise known. The first decoder system 2510 may provide the first scores and the first word sequences to the match system 2530.

The second decoder system 2520 may be configured to generate and output multiple second word sequences. The second decoder system 2520 may also generate and output a second score for each of the second word sequences. The second scores may indicate how well the second word sequences relate to the spoken words in the second audio. The second decoder system 2520 may generate the second word sequences using any technique as discussed in this disclosure, in U.S. patent application Ser. No. 16/209,524, or otherwise known. The second decoder system 2520 may provide the second scores and the second word sequences to the match system 2530.

The match system 2530 may be configured to obtain the first scores, the first word sequences, the second scores, and the second word sequences. The match system 2530 may be configured to generate a transcription of the words spoken in the first audio based on and/or using the first scores, the first word sequences, the second scores, and the second word sequences. For example, the match system 2530 may determine matching word sequences between the first word sequences and the second sequences.

After determining matching word sequences, the match system 2530 may determine a combined score for each of the matching word sequences based on the first scores and the second scores of the matching word sequences. For example, the match system 2530 may mathematically combine the first and second scores to determine the combined score. As an example, for a first word sequence with a first score that matches a second word sequence with a second score, the match system 2530 may determine a combined score of the matching word sequence by averaging the first score and the second score. In these and other embodiments, the match system 2530 may use the matching word sequence with the highest combined score in the transcription output by the match system 2530. In some embodiments, the match system 2530 may ignore word sequences from the first and second word sequences that have matching word sequences.

In some embodiments, the first decoder system 2510 may be configured to generate and output a first word lattice. The first word lattice may be a directed acyclic graph with a single start point and edges labeled with a word and a score. The first word lattice may include multiple words. The score on each edge may be a probability, a confidence, a likelihood, or an accuracy, among other types of scores that may be output by a decoder. The first decoder system 2510 may generate the first word lattice using any technique as discussed in this disclosure, in U.S. patent application Ser. No.

16/209,524, or otherwise known. The first decoder system 2510 may provide the first word lattice to the match system 2530.

The second decoder system 2520 may be configured to generate and output a second word lattice. The second word lattice may include multiple words. The second decoder system 2520 may generate the second word lattice using any technique as discussed in this disclosure, in U.S. patent application Ser. No. 16/209,524, or otherwise known. The second decoder system 2520 may provide the second word lattice to the match system 2530.

The match system 2530 may be configured to obtain the first word lattice and the second word lattice. The match system 2530 may be configured to generate a transcription of the words spoken in the first audio based on and/or using the first word lattice and the second word lattice. For example, the match system 2530 may combine the first word lattice with the second word lattice by composing the first word lattice with the second word lattice to create a single combined word lattice. The match system 2530 may search the combined word lattice to determine a word sequence to use in the transcription output by the match system 2530. In these and other embodiments, the match system 2530 may determine the word sequence based on comparing scores of word sequences that may be generated using the combined word lattice. The scores of the word sequences may be based on a mathematical combination of the scores of the words in the word sequences. In these and other embodiments, the word sequence with the highest score may be the word sequence that is used in the transcription output by the match system 2530.

Modifications, additions, or omissions may be made to the environment 2500 without departing from the scope of the present disclosure. For example, in some embodiments, the output of the first decoder system 2510 and the second decoder system 2520 may be phoneme lattices. In these and other embodiments, the match system 2530 may determine a phoneme sequence from a combined phoneme lattice. The match system 2530 may convert the determined phoneme sequence to a word sequence to be used in the transcription output by the match system 2530.

As another example, the environment 2500 may include additional decoders. In these and other embodiments, additional audio or the same audio may be provided to the additional decoders. In these and other embodiments, the match system 2530 may determine the transcriptions using the word or phoneme lattices from each of the decoders.

Figure 26:
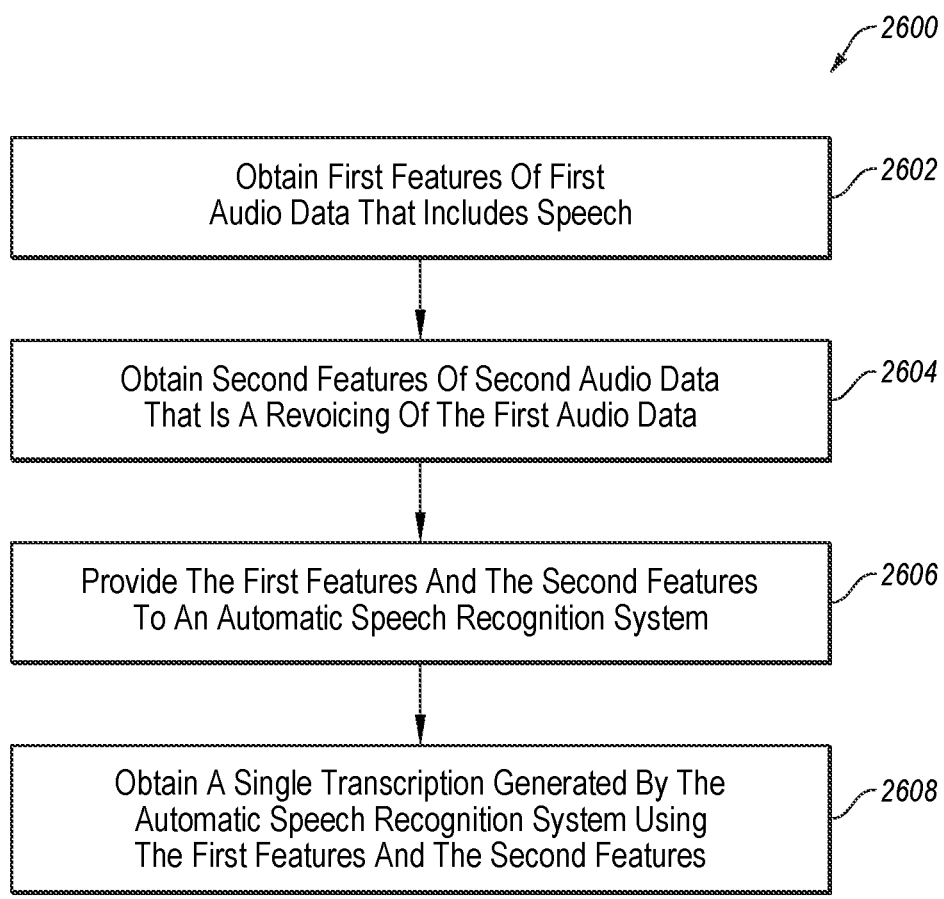
FIG. 26 illustrates a flowchart of example method to generate transcriptions.

FIG. 26 illustrates a flowchart of an example method 2600 to select a transcription generation technique. The method 2600 may be arranged in accordance with at least one embodiment described in the present disclosure. One or more operations of the method 2600 may be performed, in some embodiments, by a device or system, such as the transcription system 120, the environment 2400, and/or the environment 2500 of FIGS. 1, 24, and 25 or another system, device, or combination of systems/devices. In these and other embodiments, the method 2600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 2600 may begin at block 2602, where first features of first audio data that includes speech may be obtained. In some embodiments, the first audio data may be from a communication session between a first device and a second device.

At block 2604, second features of second audio data that is a revoicing of the first audio data may be obtained. At block 2606, the first features and the second features may be provided to an automatic speech recognition system. At block 2608, a single transcription generated by the automatic speech recognition system using the first features and the second features may be obtained.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 2600 may further include directing the transcription to the first device during the communication session. As another example, the method 2600 may further include aligning the first features and the second features in time. In some embodiments, time aligning the first audio data and the second audio data may include time shifting the second audio data, the first audio data, or both the first audio data and the second audio data. In some embodiments, aligning the first features and the second features in time may include providing the first features and the second features to a convolutional neural network that includes a multiplier on each input path to each node of a convolutional layer of the convolutional neural network. In these and other embodiments, the method 2600 may further include adjusting a value of each multiplier based on a time difference between the first audio data and the second audio data.

As another example, the method 2600 may further include generating, using the automatic speech recognition system, phoneme probabilities for words in the first audio data using the aligned first features and the aligned second features.

As another example, the method 2600 may further include generating, using a first decoder of the automatic speech recognition system, multiple first words and generating, using a second decoder of the automatic speech recognition system, multiple second words. In these and other embodiments, the method 2600 may further include compare the multiple first words and the multiple second words and generate the single transcription based on the comparison of the multiple first words and the multiple second words. In some embodiments, the multiple first words may be organized in a word graph, a word lattice, or multiple text strings, such as word sequences.

Figure 27:
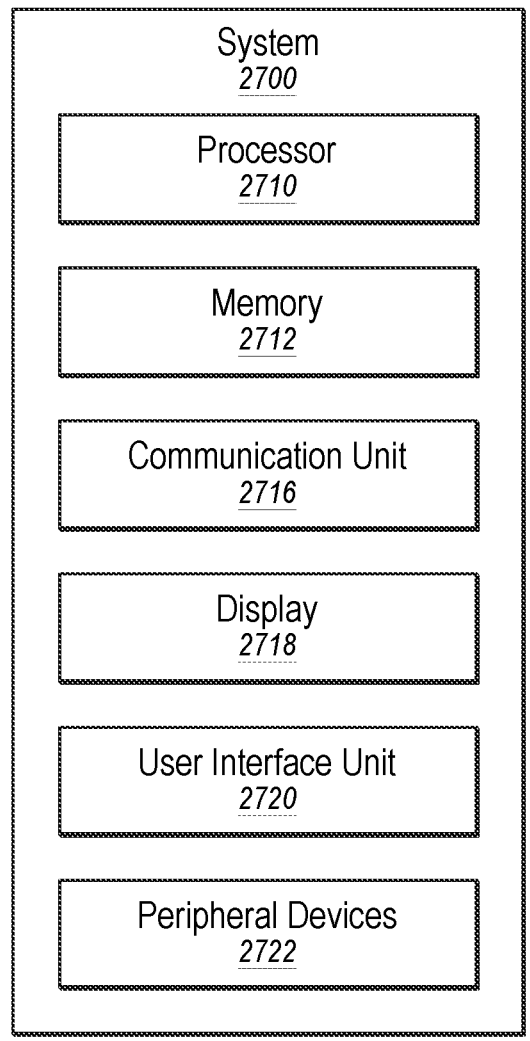
FIG. 27 illustrates an example computing system that may be configured to perform operations and method disclosed herein, all arranged in accordance with one or more embodiments of the present disclosure.

FIG. 27 illustrates an example system 2700 that may be used during transcription of communications. The system 2700 may be arranged in accordance with at least one embodiment described in the present disclosure. The system 2700 may include a processor 2710, memory 2712, a communication unit 2716, a display 2718, a user interface unit 2720, and a peripheral device 2722, which all may be communicatively coupled. In some embodiments, the system 2700 may be part of any of the systems or devices described in this disclosure.

For example, the system 2700 may be part of the first device 104 of FIG. 1 and may be configured to perform one or more of the tasks described above with respect to the first device 104. As another example, the system 2700 may be part of the second device 106 of FIG. 1 and may be configured to perform one or more of the tasks described above with respect to the second device 106. As another example, the system 2700 may be part of the transcription system 130 of FIG. 1 and may be configured to perform one or more of the tasks described above with respect to the transcription system 120. Alternately or additionally, the system 2700 may be part of any system, device, or environment described in this disclosure.

Generally, the processor 2710 may include any suitable special-purpose or general-purpose computer, computing entity, or processing device including various computer hardware or software modules and may be configured to execute instructions stored on any applicable computer-readable storage media. For example, the processor 2710 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), quantum computer, or any other digital or analog circuitry configured to interpret and/or to execute program instructions and/or to process data.

Although illustrated as a single processor in FIG. 27, it is understood that the processor 2710 may include any number of processors distributed across any number of networks or physical locations that are configured to perform individually or collectively any number of operations described herein. In some embodiments, the processor 2710 may interpret and/or execute program instructions and/or process data stored in the memory 2712. In some embodiments, the processor 2710 may execute the program instructions stored in the memory 2712.

For example, in some embodiments, the processor 2710 may execute program instructions stored in the memory 2712 that are related to selecting a transcription generation technique for a communication session such that the system 2700 may perform or direct the performance of the operations associated therewith as directed by the instructions. In these and other embodiments, the instructions may be used to perform one or more operations of the methods described in this disclosure.

The memory 2712 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 2710.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 2710 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re *Nuijten,* 500 F.3d 1346 (Fed. Cir. 2007). Combinations of the above may also be included within the scope of computer-readable media.

The communication unit 2716 may include any component, device, system, or combination thereof that is configured to transmit or receive information over a network. In some embodiments, the communication unit 2716 may communicate with other devices at other locations, the same location, or even other components within the same system. For example, the communication unit 2716 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 2716 may permit data to be exchanged with a network and/or any other devices or systems described in the present disclosure. For example, when the system 2700 is included in the first device 104 of FIG. 1, the communication unit 2716 may allow the first device 104 to communicate with the transcription system 120.

The display 2718 may be configured as one or more displays, like an LCD, LED, OLED, Braille terminal, or other type of display. The display 2718 may be configured to present video, text captions, user interfaces, and other data as directed by the processor 2710. For example, when the system 2700 is included in the first device 104 of FIG. 1, the display 2718 may be configured to present second video from a second device, a transcript of second audio from the second device, and/or a report.

The user interface unit 2720 may include any device to allow a user to interface with the system 2700. For example, the user interface unit 2720 may include a mouse, a track pad, a keyboard, buttons, camera, and/or a touchscreen, among other devices. The user interface unit 2720 may receive input from a user and provide the input to the processor 2710. In some embodiments, the user interface unit 2720 and the display 2718 may be combined.

The peripheral devices 2722 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 2700 or otherwise generated by the system 2700.

Modifications, additions, or omissions may be made to the system 2700 without departing from the scope of the present disclosure. For example, in some embodiments, the system 2700 may include any number of other components that may not be explicitly illustrated or described. Further, depending on certain implementations, the system 2700 may not include one or more of the components illustrated and described.

As indicated above, the embodiments described herein may include the use of a special purpose or general purpose computer (e.g., the processor 2710 of FIG. 27) including various computer hardware or software modules, as discussed in greater detail below. Further, as indicated above, embodiments described herein may be implemented using computer-readable media (e.g., the memory 2712 of FIG. 27) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1 is a method that may include obtaining first audio data of a communication session between a first device and a second device; obtaining, during the communication session, a first text string that is a transcription of the first audio data, the first text string including a first word in a first location of the transcription; directing the first text string to the first device for presentation of the first text string during the communication session; obtaining, during the communication session, a second text string that is a transcription of the first audio data, the second text string including a second word in the first location of the transcription that is different from the first word; comparing a first accuracy score of the first word to a second accuracy score of the second word; and in response to a difference between the first accuracy score and the second accuracy score satisfying a threshold, directing the second word to the first device to replace the first word in the first location as displayed by the first device.

Example 2 may include example 1 and further includes obtaining an indication of a time lapse from when a second previous word is directed to the first device to replace a first previous word, wherein the second word is directed to the first device to replace the first word in the first location in further response to the time lapse satisfying a time threshold.

Example 3 may include examples 1 and/or 2 and further includes obtaining, during the communication session, a third text string that is a transcription of the first audio data, the third text string including a third word in a second location of the transcription; directing the third text string to the first device for presentation of the third text string during the communication session; obtaining, during the communication session, a fourth text string that is a transcription of the first audio data, the fourth text string including a fourth word in the second location of the transcription that is different from the third word; comparing a third accuracy score of the third word to a fourth accuracy score of the fourth word; and in response to the fourth accuracy score being greater than the third accuracy score and a difference between the third accuracy score and the fourth accuracy score not satisfying the threshold, determining to maintain the third word in the second location as displayed by the first device instead of directing the fourth word to the first device to replace the third word in the second location as displayed by the first device in response to the fourth accuracy score being greater than the third accuracy score and a difference between the third accuracy score and the fourth accuracy score satisfying the threshold.

Example 4 may include examples 1, 2, and/or 3 and further includes obtaining a first content score of the first word, the first content score indicating an effect of the first word on a meaning of the transcription; and obtaining a second content score of the second word, the second content score indicating an effect of the second word on the meaning of the transcription, wherein the second word is directed to the first device to replace the first word in the first location in further response to a sum of the first content score and the second content score satisfying a content threshold.

Example 5 may include examples 1, 2, 3, and/or 4 and further includes in response to the difference between the first accuracy score and the second accuracy score satisfying the threshold, directing a third word to the first device to replace a fourth word in a second location in the transcription as displayed by the first device.

Example 6 may include example 5, wherein a difference between a fourth accuracy score of the fourth word and a third accuracy score of the third word does not satisfy the threshold.

Example 7 may include example 5, wherein the second location is before the first location in the transcription.

Example 8 may include any one of examples 1 through 7, wherein the threshold is adjusted in response to the second word being generated by a second automatic transcription system that is different than a first automatic transcription system that generates the first word.

Example 9 may include any one of examples 1 through 8, wherein the first text string is obtained from a first automatic transcription system and the second text string is obtained from a second automatic transcription system that is different than the first automatic transcription system.

Example 10 may include any one of examples 1 through 9, wherein both the first text string and the second text string are partial text strings that are not finalized text strings as generated by automatic transcription systems.

Example 11 may include any one of examples 1 through 10, wherein in response to the difference between the first accuracy score and the second accuracy score not satisfying the threshold, one or more words of the first text string are not replaced by one or more words of the second text string.

Example 12 may include a non-transitory computer-readable medium configured to store instructions that when executed by a computer system perform the examples of 1 through 11.

Example 13 is a method that may include obtaining first audio data of a communication session between a first device and a second device; obtaining, during the communication session, a first text string that is a transcription of the first audio data, the first text string including a plurality of words; directing the first text string to the first device for presentation of the first text string during the communication session; determining, during the communication session, a plurality of replacement words to replace a subset of the plurality of words displayed by the first device; determining a number of the plurality of replacement words; and in response to the number of the plurality of replacement words satisfying a threshold, directing the plurality of replacement words to the first device to replace the subset of the plurality of words as displayed by the first device.

Example 14 may include example 13 and may further include obtaining an indication of a time lapse, wherein the plurality of replacement words are directed to the first device to replace the subset of the plurality of words as displayed by the first device in further response to the time lapse satisfying a time threshold.

Example 15 may include example 13 and/or 14, wherein a first accuracy score of one of the plurality of replacement words is greater than a second accuracy score of one of the subset of the plurality of words that corresponds to the one of the plurality of replacement words.

Example 16 may include a method that includes obtaining first audio data of a communication session between a first device and a second device; obtaining, during the communication session, a first text string that is a transcription of the first audio data, the first text string including a first word in a first location of the transcription; directing the first text string to the first device for presentation of the first text string during the communication session; obtaining, during the communication session, a second text string that is a transcription of the first audio data, the second text string including a second word in the first location of the transcription that is different from the first word; obtaining a score of the second word, the score indicating an effect of the second word on the meaning of the transcription; and in response to the score satisfying a threshold, directing the second word to the first device to replace the first word in the first location as displayed by the first device.

Example 17 may include example 16 and may further include obtaining a first accuracy score of the first word; and obtaining a second accuracy score of the second word, wherein the second word is directed to the first device to replace the first word in the first location in further response to a difference between the first accuracy score and the second accuracy score satisfying an accuracy threshold.

Example 18 may include example 16 and/or 17 and may further include obtaining an indication of a time lapse from when a second previous word is directed to the first device to replace a first previous word, wherein the second word is directed to the first device to replace the first word in the first location in further response to the time lapse satisfying a time threshold.

Example 19 may include example 16, 17, and/or 18, wherein the first text string is obtained from a first automatic transcription system and the second text string is obtained from a second automatic transcription system that is different than the first automatic transcription system.

Example 20 may include any of examples 16 through 19, and may further include in response to the score satisfying a threshold, directing a third word to the first device to replace a fourth word in a second location in the transcription as displayed by the first device, wherein a score of the fourth word, which indicates an effect of the fourth word on a meaning of the transcription, does not satisfy the threshold.

Example 21 may include a method that includes obtaining a text string that is a transcription of audio data; selecting a sequence of words from the text string as a first word sequence; encrypting the first word sequence; comparing the encrypted first word sequence to a plurality of encrypted word sequences, each of the plurality of encrypted word sequences associated with a corresponding one of a plurality of counters; in response to the encrypted first word sequence corresponding to one of the plurality of encrypted word sequences based on the comparison, incrementing a counter of the plurality of counters associated with the one of the plurality of encrypted word sequences; and adapting a language model of an automatic transcription system using the plurality of encrypted word sequences and the plurality of counters.

Example 22 may include example 21, wherein the plurality of counters are encrypted and the counter associated with the one of the plurality of encrypted word sequences is incremented while being encrypted.

Example 23 may include examples 21 and/or 22, wherein a first encryption key for the plurality of encrypted word sequences is different from a second encryption key for the plurality of encrypted counters.

Example 24 may include examples 21, 22, and/or 23, wherein the plurality of counters are initialized with random numbers.

Example 25 may include examples 21, 22, 23, and/or 24, wherein before obtaining the text string, the plurality of encrypted word sequences are generated from random text strings generated from another plurality of word sequences or a second language model.

Example 26 may include examples 21, 22, 23, 24, and/or 25 and may further include obtaining second audio data originating at a plurality of first devices; obtaining a plurality of second text strings that are transcriptions of the second audio data; and before obtaining the text string, generating the plurality of encrypted word sequences from the plurality of second text strings, wherein the audio data originates at a plurality of second devices and the plurality of second devices do not include the plurality of first devices.

Example 27 may include examples 21, 22, 23, 24, 25 and/or 26 and may further include after incrementing the counter of the plurality of counters, removing a second word sequence of the plurality of encrypted word sequences from the plurality of encrypted word sequences based on a second counter of the plurality of counters associated with the second word sequence satisfying a threshold.

Example 28 may include example 27, wherein before obtaining the text string, the first word sequence is generated from random text strings generated from another plurality of word sequences or a second language model.

Example 29 may include example 28 and may further include after removing the first word sequence, generating a second word sequence to include in the plurality of encrypted word sequences using the plurality of encrypted word sequences.

Example 30 may include any one of examples 21-29 and may further include decrypting the plurality of encrypted word sequences, wherein the language model is adapted using the decrypted plurality of word sequence and the plurality of counters.

Example 31 may include any one of examples 21-30, wherein each one of the plurality of counters indicates a number of occurrences that a corresponding one of the plurality of encrypted words sequences is included in a plurality of transcriptions of a plurality of communication sessions that occur between a plurality of devices.

Example 32 may include a non-transitory computer-readable medium configured to store instructions that when executed by a computer system perform any one of the examples of 21 through 31.

Example 33 may include a system including at least one computer-readable media configured to store instructions; and at least one processor coupled to the one computer-readable media, the processor configured to execute the instructions to cause the system to perform operations, the operations configured to perform any one of the examples 21 through 31.

Example 34 may include a method that includes generating a plurality of word sequences from random text strings generated from another plurality of word sequences or language model; obtaining a text string that is a transcription of audio data; selecting a sequence of words from the text string as a first word sequence; comparing the first word sequence to the plurality of word sequences, each of the plurality of word sequences associated with a corresponding one of a plurality of counters; in response to the first word sequence corresponding to one of the plurality of word sequences based on the comparison, incrementing a counter of the plurality of counters associated with the one of the plurality of word sequences; removing a second word sequence of the plurality of word sequences from the plurality of word sequences based on a second counter of the plurality of counters associated with the second word sequence satisfying a threshold; and after removing the second word sequence, adapting a language model of an automatic transcription system using the plurality of word sequences and the plurality of counters.

Example 35 may include example 34, the method further including encrypting the first word sequence; and encrypting the plurality of word sequences, wherein the first word sequence and the plurality of word sequences are both encrypted when compared.

Example 36 may include examples 34 and/or 35 and may further include encrypting the first word sequence using a first encryption key; encrypting the plurality of word sequences using the first encryption key, wherein the first word sequence and the plurality of word sequences are both encrypted when compared; and encrypting the plurality of counters using a second encryption key that is different from the first encryption key, wherein the counter is incremented while being encrypted.

Example 37 may include examples 34, 35, and/or 36, wherein the plurality of counters are encrypted and the counter associated with the one of the plurality of encrypted word sequences is incremented while being encrypted.

Example 38 may include examples 34, 35, 36, and/or 37, wherein the plurality of counters are initialized with random numbers.

Example 39 may include examples 34, 35, 36, 37, and/or 38, and may further include after removing the second word sequence, generating a third word sequence to include in the plurality of word sequences using the plurality of word sequences.

Example 40 may include a non-transitory computer-readable medium configured to store instructions that when executed by a computer system perform any one of examples 34 through 39.

Example 41 may include a method that includes obtaining first features of first audio data that includes speech; obtaining second features of second audio data that is a revoicing of the first audio data; providing the first features and the second features to an automatic speech recognition system; and obtaining a single transcription generated by the automatic speech recognition system using the first features and the second features.

Example 42 may include example 41, wherein the first audio data is from a communication session between a first device and a second device.

Example 43 may include examples 41 and/or 42, and may further include directing the transcription to the first device during the communication session.

Example 44 may include examples 41, 42, and/or 43, and may further include aligning the first features and the second features in time.

Example 45 may include example 44, wherein aligning the first features and the second features in time comprises providing the first features and the second features to a convolutional neural network.

Example 46 may include examples 41, 42, 43, 44, and/or 45, wherein the convolutional neural network includes a multiplier on each input path to each node of a convolutional layer of the convolutional neural network and the method further includes adjusting a value of each multiplier based on time difference between the first audio data and the second audio data.

Example 47 may include examples 41, 42, 43, 44, 45, and/or 46, and may further include generating, using the automatic speech recognition system, phoneme probabilities for words in the first audio data using the aligned first features and the aligned second features.

Example 48 may include examples 41, 42, 43, 44, 45, 46, and/or 47, and may further include generating, using a first decoder of the automatic speech recognition system, a plurality of first words; generating, using a second decoder of the automatic speech recognition system, a plurality of second words; comparing the plurality of first words and the plurality of second words; and generating the single transcription based on the comparison of the plurality of first words and the plurality of second words.

Example 49 may include examples 41, 42, 43, 44, 45, 46, 47, and/or 48 wherein the plurality of first words is organized in a word graph, a word lattice, or a plurality of text strings.

Example 51 may include a non-transitory computer-readable medium configured to store instructions that when executed by a computer system perform any one of examples 41 through 50.

Example 52 may include a system including at least one computer-readable media configured to store instructions; and at least one processor coupled to the one computer-readable media, the processor configured to execute the instructions to cause the system to perform operations, the operations configured to perform any one of the examples 41 through 50.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more."

Furthermore, terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method comprising:
obtaining real-time audio data that includes speech;
obtaining, in real-time as the audio data is obtained, a first transcription of the audio data, the first transcription including a plurality of first words and being generated by a first automatic speech recognition technology using the audio data;
obtaining, in real-time as the audio data is obtained, a second transcription of the audio data, the second transcription including a plurality of second words and being generated by a second automatic speech recognition technology using the audio data;
aligning, in real-time, words from the first transcription that are similar to words from the second transcription by generating in real-time a plurality of word alignment paths that each include a plurality of nodes within a coordinate system based on the first transcription and the second transcription, one or more of the nodes of each of the plurality of word alignment paths corresponding to one word from the first transcription and/or one word from the second transcription that are considered to be aligned for a respective ward alignment path, generating the plurality of word alignment paths including:
setting a window in the coordinate system that includes one or more of the plurality of nodes of the plurality of word alignment paths;
dynamically increasing in real-time a size of the window as additional words are added to the plurality of word alignment paths in response to words being added to the first transcription and/or the second transcription;
dynamically decreasing in real-time the size of the window by adjusting a location of a second face of the window in the coordinate system to be further from an origin of the coordinate system in response to one or more word alignment paths satisfying a criteria; and
adapting, in real-time, only portions of the plurality of word alignment paths within the window in response to words being added to the first transcription and/or the second transcription such that other portions of the plurality of word alignment paths outside the window are stable and not subject to change; and
generating a real-time output text string as a transcription of the speech using words from one of the plurality of word alignment paths.

2. The method of claim 1, wherein one or more of the plurality of nodes of the plurality of word alignment paths includes one of the plurality of first words and a blank space in response to the first transcription including more words than the second transcription.

3. The method of claim 1, wherein the criteria includes: words in one or more nodes of the one or more word alignment paths matching, a time difference between words in the window where the time difference is based on when the words are output in one of the first transcription and the second transcription, a number of words in the window along an axis of the coordinate system satisfying a threshold, a number of the plurality of word alignment paths that pass through the second face satisfying a threshold, a number of the plurality of word alignment paths that intersect a point within the window satisfying a threshold, the one or more word alignment paths having a lowest cost and including a node with matching words, or the one or more word alignment paths being stable for a time period that satisfies a threshold.

4. The method of claim 1, wherein dynamically increasing the size of the window includes adjusting a location of a first face of the window in the coordinate system in response to obtaining a new word in the first transcription.

5. The method of claim 4, wherein dynamically increasing the size of the window includes adjusting a location of a third face of the window in the coordinate system in response to obtaining a new word in the second transcription.

6. The method of claim 4, wherein generating the plurality of word alignment paths further includes dynamically decreasing the size of the window by adjusting a location of a fourth face of the window in the coordinate system in response to the one or more word alignment paths satisfying a second criteria.

7. The method of claim 1, wherein generating the output text string includes:
selecting one of the plurality of word alignment paths;
selecting words from the selected word alignment path to include in the output text string; and
generating the output text string using the selected words.

8. The method of claim 1, wherein the selected word alignment path is selected based on the selected word alignment path including one or more nodes within the window.

9. The method of claim 1, wherein generating the plurality of word alignment paths includes in response to obtaining one or more words in the first transcription and/or the second transcription, extending only word alignment paths that pass through a particular face or vertex of the window.

10. The method of claim 1, further comprising obtaining a third transcription of the audio data, the third transcription including a plurality of third words and being generated by a third automatic speech recognition technology using the audio data, wherein the coordinate system is based on the first transcription, the second transcription, and the third transcription, and one or more of the nodes of each of the plurality of word alignment paths including one of the plurality of first words, one of the plurality of second words, and one of the plurality of third words.

11. One or more non-transitory computer-readable medias configured to store instructions that when executed by a system are configured to perform the method of claim 1.

12. A system comprising:
at least one computer-readable media configured to store instructions; and
at least one processor coupled to the at least one computer-readable media, the processor configured to execute the instructions to cause the system to perform operations, the operations comprising:
obtaining real-time audio data that includes speech;
obtaining, in real-time as the audio data is obtained, a first transcription of the audio data, the first transcription including a plurality of first words and being generated by a first automatic speech recognition technology using the audio data;
obtaining, in real-time as the audio data is obtained, a second transcription of the audio data, the second transcription including a plurality of second words and being generated by a second automatic speech recognition technology using the audio data;
aligning, in real-time, words from the first transcription that are similar to words from the second transcription by generating in real-time a plurality of word alignment paths that each include a plurality of nodes within a coordinate system based on the first transcription and the second transcription, one or more of the nodes of each of the plurality of word alignment paths corresponding to one word from the first transcription and/or one word from the second transcription that are considered to be aligned for a respective ward alignment path, generating the plurality of word alignment paths including:
setting a window in the coordinate system that includes one or more of the plurality of nodes of the plurality of word alignment paths;
dynamically increasing in real-time a size of the window as additional words are added to the plurality of word alignment paths in response to words being added to the first transcription and/or the second transcription;
dynamically decreasing in real-time the size of the window by adjusting a location of a second face of the window in the coordinate system to be further from an origin of the coordinate system in response to one or more word alignment paths satisfying a criteria; and
adapting, in real-time, only portions of the plurality of word alignment paths within the window in response to words being added to the first transcription and/or the second transcription such that other portions of the plurality of word alignment paths outside the window are stable and not subject to change; and
generating a real-time output text string as a transcription of the speech using words from one of the plurality of word alignment paths.

13. The system of claim 12, wherein one or more of the plurality of nodes of the plurality of word alignment paths includes one of the plurality of first words and a blank space in response to the first transcription including more words than the second transcription.

14. The system of claim 12, wherein the criteria includes: words in one or more nodes of the one or more word alignment paths matching, a time difference between words in the window where the time difference is based on when the words are output in one of the first transcription and the second transcription, a number of words in the window along an axis of the coordinate system satisfying a threshold, a number of the plurality of word alignment paths that pass through the second face satisfying a threshold, a number of the plurality of word alignment paths that intersect a point within the window satisfying a threshold, the one or more word alignment paths having a lowest cost and including a node with matching words, or the one or more word alignment paths being stable for a time period that satisfies a threshold.

15. The system of claim 12, wherein dynamically increasing the size of the window includes adjusting a location of a first face of the window in the coordinate system in response to obtaining a new word in the first transcription.

16. The system of claim 12, wherein dynamically decreasing the size of the window includes adjusting a location of a fourth face of the window in the coordinate system in response to the one or more word alignment paths satisfying a second criteria.

17. The system of claim 12, wherein generating the plurality of word alignment paths includes in response to obtaining one or more words in the first transcription and/or the second transcription, extending only word alignment paths that pass through a particular face or vertex of the window.

18. The system of claim 12, wherein the operations further comprise obtaining a third transcription of the audio data, the third transcription including a plurality of third words and being generated by a third automatic speech recognition technology using the audio data, wherein the coordinate system is based on the first transcription, the second transcription, and the third transcription, and one or more of the nodes of each of the plurality of word alignment paths including one of the plurality of first words, one of the plurality of second words, and one of the plurality of third words.

* * * * *